（12）United States Patent
Ikeda et al.

(10) Patent No.: US 11,386,584 B2
(45) Date of Patent: Jul. 12, 2022

(54) INFORMATION PROCESSING SYSTEM AND INFORMATION PROCESSING METHOD

(71) Applicant: SONY CORPORATION, Tokyo (JP)

(72) Inventors: Tetsuo Ikeda, Tokyo (JP); Haruo Oba, Kanagawa (JP); Makoto Niijima, Saitama (JP); Rei Fukuda, Tokyo (JP); Dickinson Forrest JR. Matthew, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 53 days.

(21) Appl. No.: 16/769,581

(22) PCT Filed: Nov. 5, 2018

(86) PCT No.: PCT/JP2018/041017
§ 371 (c)(1),
(2) Date: Jun. 3, 2020

(87) PCT Pub. No.: WO2019/116780
PCT Pub. Date: Jun. 20, 2019

(65) Prior Publication Data
US 2021/0166439 A1    Jun. 3, 2021

(30) Foreign Application Priority Data
Dec. 14, 2017    (JP) .............. JP2017-239447

(51) Int. Cl.
*G06T 11/00*    (2006.01)
*G06F 3/01*    (2006.01)
(Continued)

(52) U.S. Cl.
CPC .............. *G06T 11/00* (2013.01); *G06F 3/017* (2013.01); *G06F 3/167* (2013.01); *G06K 9/6267* (2013.01); *G10L 15/22* (2013.01)

(58) Field of Classification Search
CPC .......... G06T 11/00; G06F 3/017; G06F 3/167; G06K 9/6267; G10L 15/22
(Continued)

(56) References Cited

U.S. PATENT DOCUMENTS

2003/0227470 A1* 12/2003 Gene ...................... G06F 3/012
345/633
2011/0239129 A1    9/2011 Kummerfeld et al.
(Continued)

FOREIGN PATENT DOCUMENTS

AU    2009250329 A1    11/2009
EP    2304520 A1    4/2011
(Continued)

OTHER PUBLICATIONS

International Search Report and Written Opinion of PCT Application No. PCT/JP2018/041017, dated Jan. 22, 2019, 10 pages of ISRWO.

*Primary Examiner* — Jin Ge
(74) *Attorney, Agent, or Firm* — Chip Law Group

(57) ABSTRACT

An information processing system includes a processing unit that detects a pointing action for a first user in a real space to specify a first object and an evaluation action on the first object by the first user based on a signal output from a sensor that senses actions in the real space and updates evaluation information of the first object specified by a detection result of the pointing action based on a detection result of the evaluation action.

18 Claims, 40 Drawing Sheets

(51) Int. Cl.
*G06F 3/16* (2006.01)
*G06K 9/62* (2022.01)
*G10L 15/22* (2006.01)

(58) Field of Classification Search
USPC .......................................................... 345/633
See application file for complete search history.

(56) References Cited

U.S. PATENT DOCUMENTS

| | | | |
|---|---|---|---|
| 2013/0054357 A1* | 2/2013 | Mager ..................... | G06Q 30/02 705/14.49 |
| 2013/0339271 A1* | 12/2013 | Kasuya .............. | G06Q 30/0282 705/347 |
| 2018/0314337 A1 | 11/2018 | Iwanami | |
| 2019/0025586 A1* | 1/2019 | Sawaki .............. | H04N 21/6581 |

FOREIGN PATENT DOCUMENTS

| | | |
|---|---|---|
| JP | 2011-523739 A | 8/2011 |
| JP | 2015-090524 A | 5/2015 |
| JP | 2016-085284 A | 5/2016 |
| WO | 2009/140723 A1 | 11/2009 |
| WO | 2017/081896 A1 | 5/2017 |

* cited by examiner

FIG.6
| GESTURE | SCHEMATIC DIAGRAM | TARGET |
|---|---|---|
| TOUCH | 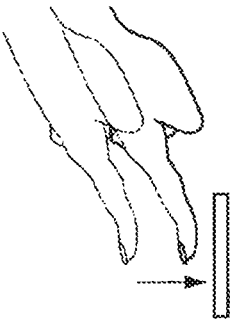 | SET TOUCHED ONE AS TARGET |
| POINTING | 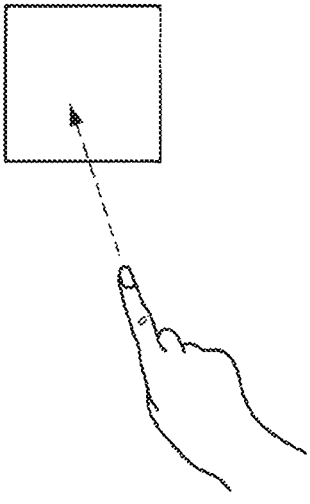 | SET ONE WITH WHICH POINTED LINE FIRST INTERSECTS AS TARGET |
| ARRANGE | 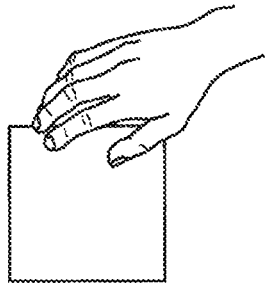 | SET ARRANGED ONE AS TARGET |

| SENTENCE | TARGET |
|---|---|
| THIS | SHORT DISTANCE |
| THAT | LONG DISTANC |
| IT | SHORT DISTANCE OF OTHER PARTICIPANTS |
| JUST BEFORE | PAST |
| FIRST | PAST |

FIG.11
| TYPE OF GESTURE | SCHEMATIC DIAGRAM | EVALUATION POINT |
|---|---|---|
| thumb up |  | +10 |
| OK |  | +10 |
| thumb down |  | -10 |
| MAKE X WITH FINGER | 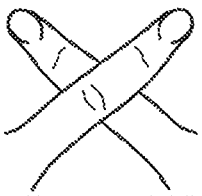 | -10 |
FIG.12
| SENTENCE | EVALUATION POINT |
|---|---|
| GOOD | +10 |
| NICE | +10 |
| IMPORTANT | +20 |
| MOST IMPORTANT | +30 |
| BAD | -10 |
| NOT GOOD | -5 |

| SENTENCE | EVALUATION POINT |
|---|---|
| VERY | x2.0 |
| EXTREMELY | x3.0 |
| NOT MUCH | x0.5 |
| VERY MUCH | x2.0 |
| SLIGHT | x0.5 |

| VOLUME | EVALUATION POINT |
|---|---|
| NORMAL | x1.0 |
| LOUD VOICE | x2.0 |
| SMALL VOICE | x0.5 |

I / think / this / is / a / so / much / nice / idea .

I / think / this / is / a / so / much / nice / idea .
                               (x 2.0)  (x 2.0)  "nice" (+ 10)
                                                 (x 2.0)

| TARGET | EVALUATOR | TIME | EVALUATION POINT |
|---|---|---|---|
| TAG 1 | A | 00'10" | 10 |

| TARGET | EVALUATION POINT |
|---|---|
| TAG 1 | 15 |

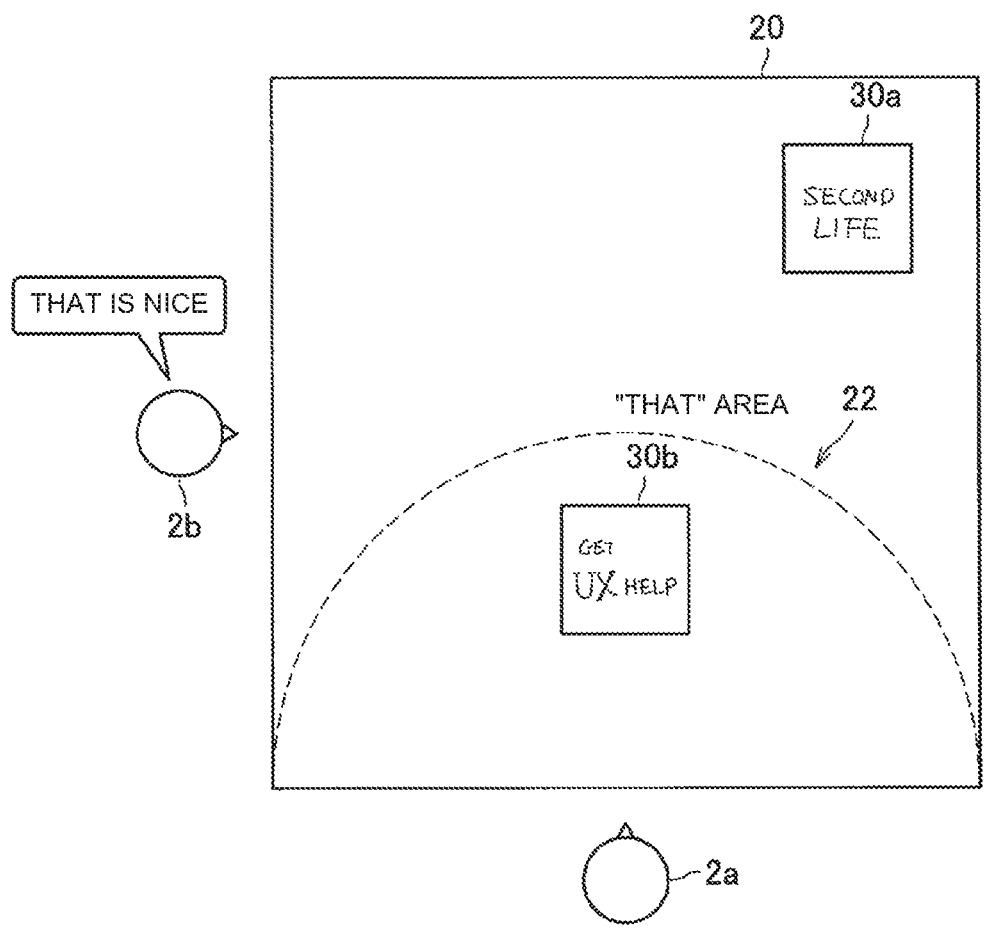

FIG.19E
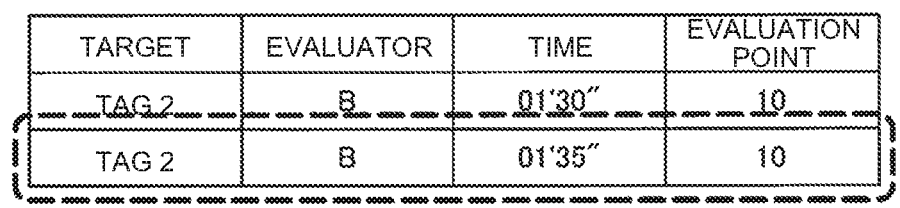
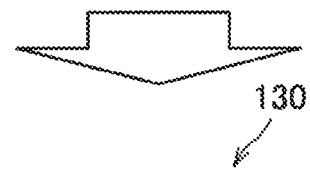
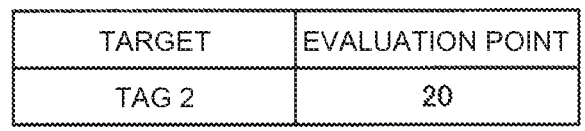

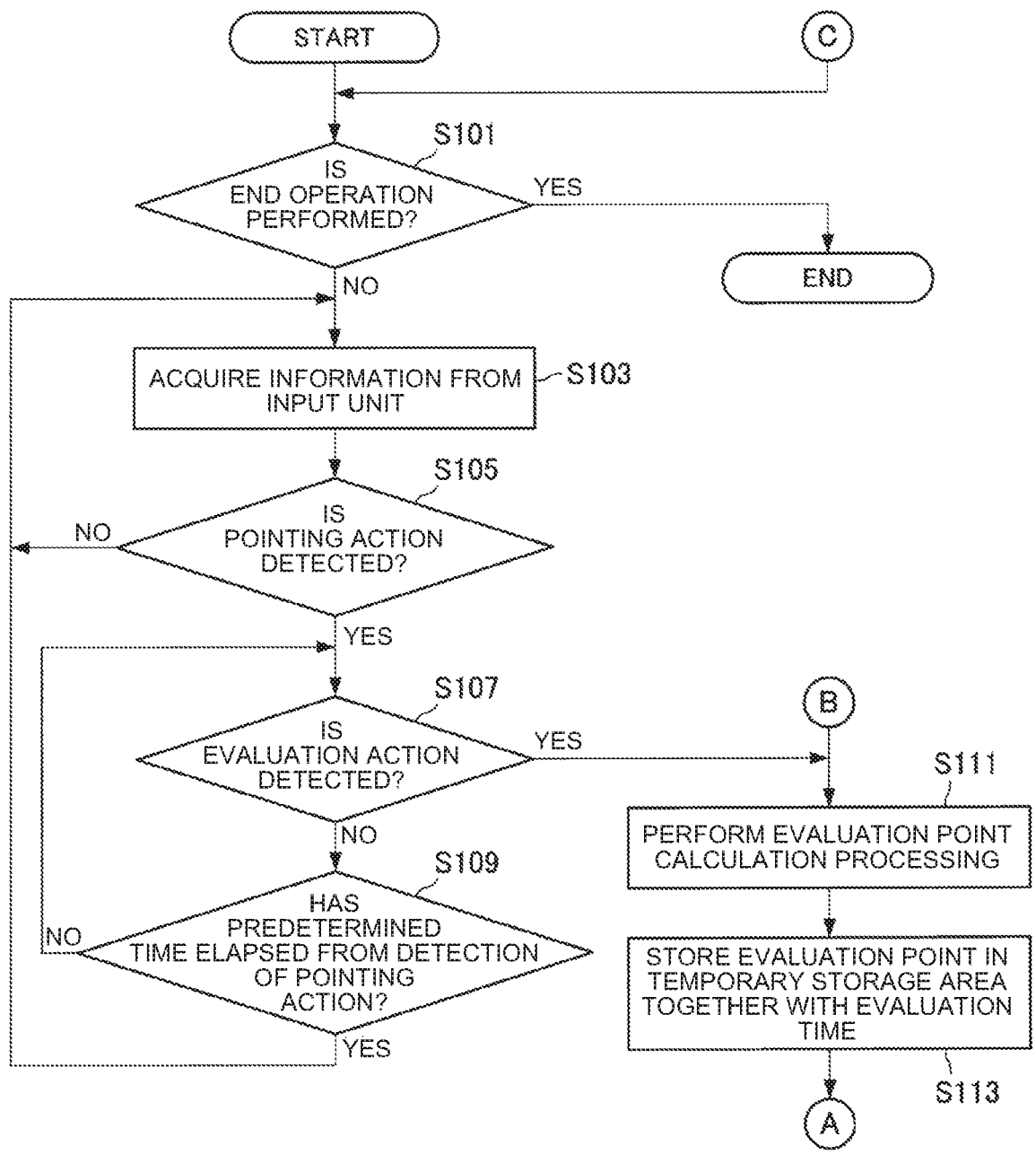

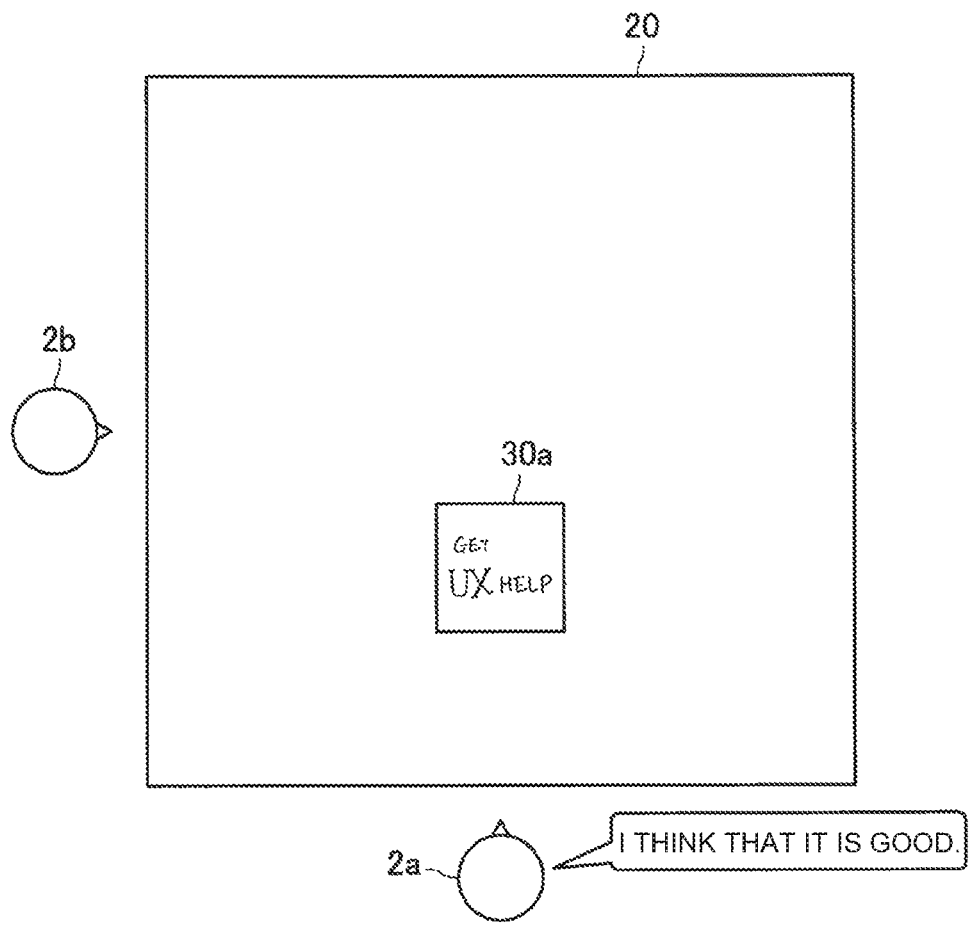

| TARGET | EVALUATOR | TIME | EVALUATION POINT |
|---|---|---|---|
| TAG 1 | A | 02'30" | 20 |

| TARGET | EVALUATOR | TIME | EVALUATION POINT |
|---|---|---|---|
| TAG 1 | A | 02'30" | 20 |
| TAG 1 | A | 02'45" | 40 |
| TAG 1 | A | 03'00" | 40 |

FIG.23G

| TARGET | EVALUATION POINT |
|---|---|
| TAG 1 | 100 |

130

| TARGET | EVALUATION POINT |
|---|---|
| TAG 1 | 50 |

| TARGET | EVALUATOR | TIME | EVALUATION POINT |
|---|---|---|---|
| TAG 1 | A | 00'10" | 10 |

FIG.24G
| TARGET | EVALUATION POINT |
|--------|------------------|
| TAG 1  | 30               |
| TAG 2  | 10               |
130
| TARGET | EVALUATION POINT |
|--------|------------------|
| TAG 1  | 30               |
| TAG 2  | 50               |

COMPETITION  MEET WITH PEOPLE  BUDGET
GET UX HELP  REALITY CHECK
SECOND LIFE
MAKE IT SIMPLE  ORDER PIZZA!
NEED FUNDING

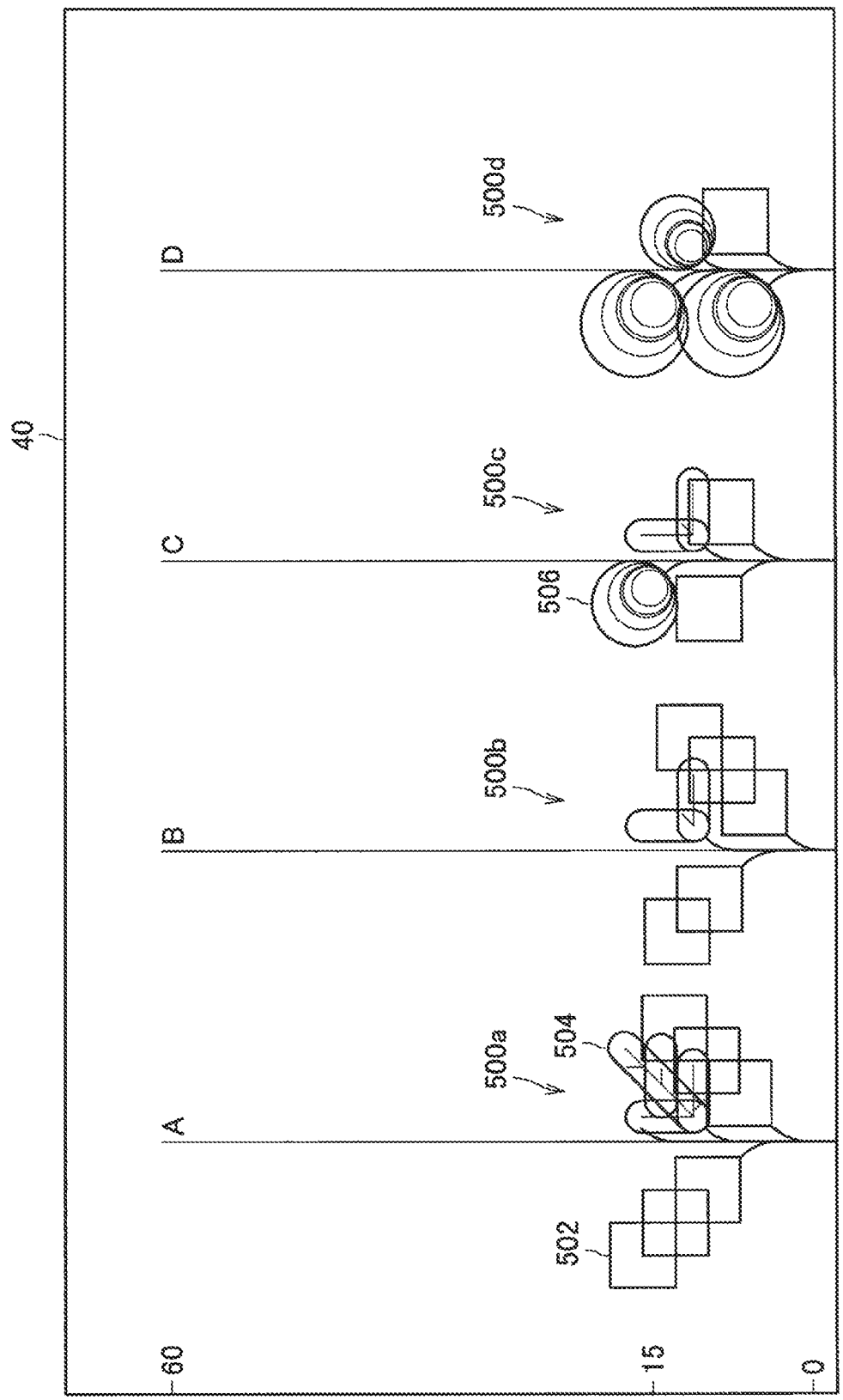

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2018/041017 filed on Nov. 5, 2018, which claims priority benefit of Japanese Patent Application No. JP 2017-239447 filed in the Japan Patent Office on Dec. 14, 2017. Each of the above-referenced applications is hereby incorporated herein by reference in its entirety.

FIELD

The present disclosure relates to an information processing system, an information processing method, and a program.

BACKGROUND

Conventionally, various technologies related to augmented reality (AR) have been developed. In the AR, additional information related to an object in an environment where a user is located can be presented to the user.

For example, Patent Literature 1 below describes a technology of detecting a marker by analyzing a captured image and calling a function associated with the detected marker.

CITATION LIST

Patent Literature

Patent Literature 1: JP 2015-90524 A

SUMMARY

Technical Problem

However, it is assumed that the user performs an evaluation action on a certain object in a real space. However, the technology described in Patent Literature 1 does not consider appropriately detecting such an evaluation action.

The present disclosure proposes a novel and improved information processing system, an information processing method, and a program that can appropriately detect an evaluation action on an object by a user in a real space.

Solution to Problem

According to the present disclosure, an information processing system is provided that includes: a processing unit that detects a pointing action for a first user in a real space to specify a first object and an evaluation action on the first object by the first user based on a signal output from a sensor that senses an action in the real space, and updates evaluation information of the first object specified by a detection result of the pointing action based on a detection result of the evaluation action.

Moreover, according to the present disclosure, an information processing method is provided that includes: detecting a pointing action for a first user in a real space to specify a first object and an evaluation action on the first object by the first user based on a signal output from a sensor that senses an action in the real space; and updating, by a processor, evaluation information of the first object specified by a detection result of the pointing action based on a detection result of the evaluation action.

Moreover, according to the present disclosure, a program is provided that makes a computer function as a processing unit performing the following operations: detecting a pointing action for a first user in a real space to specify a first object and an evaluation action on the first object by the first user based on a signal output from a sensor that senses an action in the real space, and updating evaluation information of the first object specified by a detection result of the pointing action based on a detection result of the evaluation action.

Advantageous Effects of Invention

As described above, according to the present disclosure, it is possible to appropriately detect the evaluation action on the object by the user in the real space. Note that the effects described herein are not necessarily limited and may be either of the effects described in this disclosure.

BRIEF DESCRIPTION OF DRAWINGS

FIG. 6 is a diagram illustrating an example of types of gestures that can be detected as a pointing action.

FIG. 11 is a diagram illustrating an example of the types of gestures that can be detected as the pointing action.

FIG. 12 is a definition table illustrating an example of evaluative adjectives included in the utterance that can be detected as the evaluation action.

FIG. 19B is a diagram illustrating a part of the application example according to the present embodiment.

FIG. 19C is a diagram illustrating a part of the application example according to the present embodiment.

FIG. 19E is a diagram illustrating a part of the application example according to the present embodiment.

FIG. 20 is a flowchart illustrating a part of a flow of processing according to the present embodiment.

FIG. 22B is a diagram illustrating a part of the specific example according to the first application example of the present embodiment.

FIG. 22C is a diagram illustrating a part of the specific example according to the first application example of the present embodiment.

FIG. 23F is a diagram illustrating a part of the specific example according to the second application example of the present embodiment.

FIG. 23G is a diagram illustrating a part of the specific example according to the second application example of the present embodiment.

FIG. 24G is a diagram illustrating a part of the specific example according to the third application example of the present embodiment.

FIG. 29 is a diagram illustrating an example in which character strings described in each tag 30 are displayed on the screen 40 in association with evaluation information of each tag 30 according to a fifth application example of the present embodiment.

FIG. 31A is a diagram illustrating a display example of a state of progress of active learning performed by each group according to a sixth application example of the present embodiment.

DESCRIPTION OF EMBODIMENTS

Figure 1:
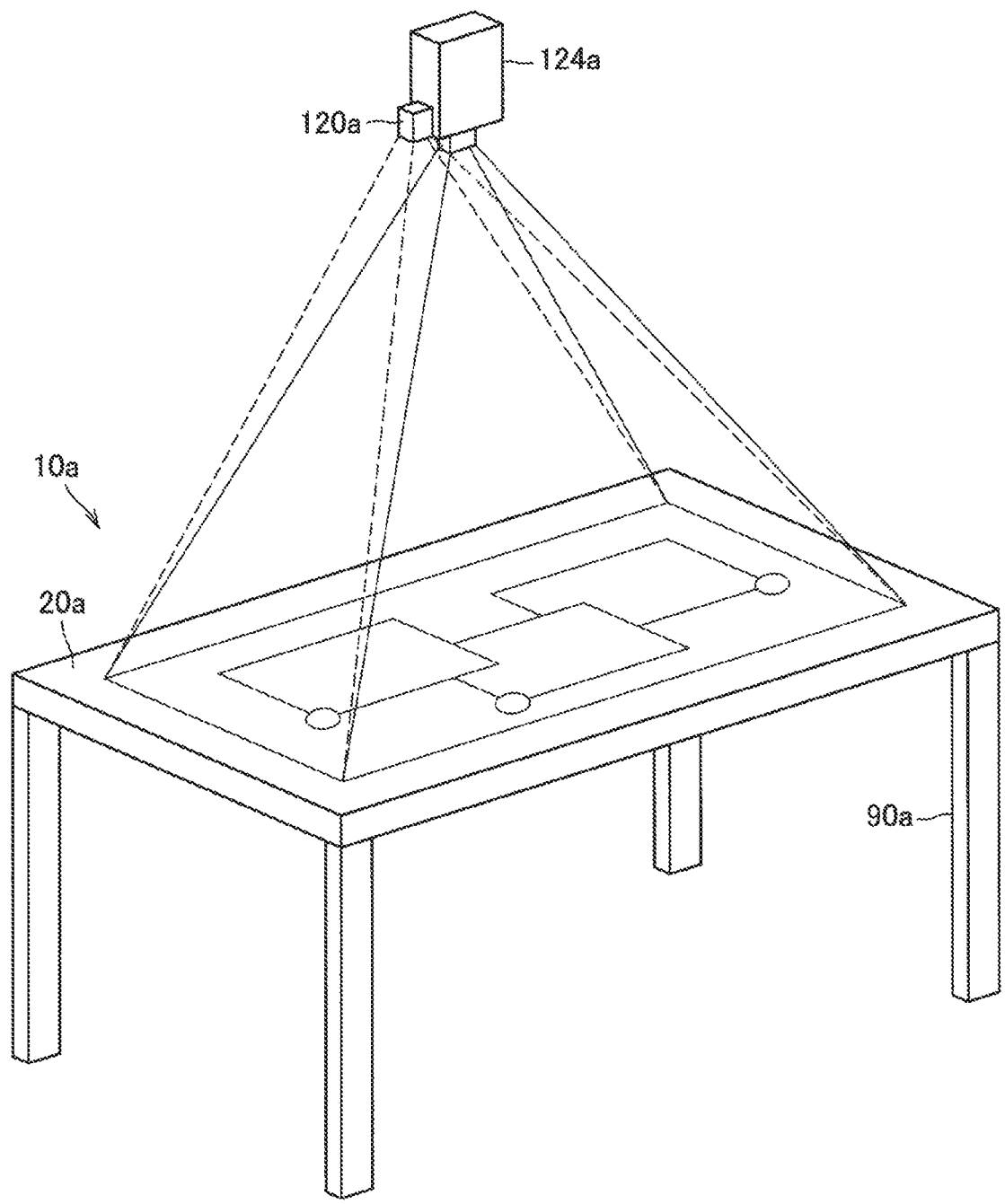
FIG. 1 is a diagram illustrating a configuration example of an information processing system 10 according to an embodiment of the present disclosure.

Hereinafter, preferred embodiments of the present disclosure will be described in detail with reference to the accompanying drawings. Note that in this specification and the drawings, components having substantially the same functional configuration are denoted by the same reference numerals, and a redundant description thereof is omitted.

In this specification and the drawings, a plurality of components having substantially the same functional configuration may be distinguished from each other by adding different alphabets after the same reference numeral. For example, a plurality of configurations having substantially the same functional configuration is distinguished like a table 90a and a table 90b, if necessary. However, when it is not necessary to particularly distinguish each of a plurality of components having substantially the same functional configuration, the plurality of components is denoted by only the same reference numerals. For example, when there is no need to particularly distinguish the table 90a and the table 90b, the table 90a and the table 90b are simply referred to as a table 90.

Further, the "mode for carrying out the invention" will be described in the order of the items shown below.
1. Configuration of information processing system
2. Detailed description of embodiment
3. Application example
4. Hardware configuration
5. Modified example 1. Configuration of Information Processing System First, a configuration example of an information processing system according to an embodiment of the present disclosure will be described with reference to FIG. 1. Note that in this specification, a system may mean a configuration for executing predetermined processing. The system may be constituted by one device or a plurality of devices. In addition, the information processing system 10 according to the present embodiment may also be configured so that the predetermined processing can be executed as the information processing system 10 as a whole, and it may be optional which configuration in an information processing system 10 is to be regarded as one device.

FIG. 1 is a diagram illustrating a configuration example of the information processing system 10. Referring to FIG. 1, an information processing system 10a according to the present embodiment includes an input unit 120a and an output unit 124a.

1-1. Output Unit 124

An output unit 124a can be configured to include an output device 162 described below. The output unit 124a displays various types of information on the table 90a. The output unit 124a can be a projection unit (projector). For example, as illustrated in FIG. 1, the output unit 124a can be arranged above the table 90a at a predetermined distance from the table 90a while being suspended from a ceiling. In this case, the output unit 124a can project information on a top surface of the table 90a. For example, the output unit 124a may be a pendant light or a desk stand light. Such a method of displaying information on the top surface of the table 90a from above is also referred to as a "projection type". Hereinafter, the top surface of the table 90 may be referred to as a screen 20. The screen 20 includes a surface (display surface) to be projected by an output unit 124. Note that the screen 20 is an example of a first operation surface according to the present disclosure.

For example, the output unit 124a displays a virtual display object under the control of a display processing unit 122 described below. The display object is, for example, a window, a user interface (UI) object, or the like. The UI object is a predetermined image (still image or moving image) that accepts various operations (selection, input, or the like) by a user. For example, the UI object is an image including a graphical user interface (GUI) component (for example, a button, a slider, a check box, a text box, a software keyboard, and the like). In addition, the UI object can be arranged in a window.

1-2. Input Unit 120

An input unit 120a can be configured to include an input device 160 described below. The input unit 120a includes, for example, a camera that captures the table 90a with one lens. Alternatively, the input unit 120a may include a stereo camera capable of recording information in a depth direction by capturing the table 90a with two lenses. As the stereo camera, for example, a visible light camera, an invisible light camera capable of detecting invisible light such as infrared light, or the like can be used. In addition, the input unit 120a may further include a speech input device such as a microphone that collects sounds from a user and environmental sounds of the surrounding environment.

When the camera is used as the input unit 120a, the information processing system 10a analyzes an image (captured image) captured by the camera, and as a result, a location of an object (for example, a user's hand or the like) located on the screen 20 can be detected. Note that in this specification and the drawings, the term "hand" can be mainly used as an expression meaning a hand itself. However, the present invention is not limited to such an example, and this description may be used as an expression meaning a finger, an arm, or two or more (for example, an upper limb or the like) of these sites.

In addition, when the stereo camera is used as the input unit 120a, the information processing system 10a analyzes the image captured by the stereo camera, and as a result, depth information of the object in addition to location information of the object located on the screen 20 can be acquired. The information processing system 10a can detect touch or approach of the user's hand to the screen 20 and separation of the hand from the screen 20 based on the depth information. Note that the input unit 120a may have another type of depth sensor (for example, a time of flight type sensor or a structured light type sensor) instead of the stereo camera. In this case, the depth sensor can acquire the depth information of the object located on the screen 20.

In the present embodiment, a location of an operating tool (for example, a user's hand, various operating members such as a stylus, and the like) on the screen 20 is detected based on the image captured by the input unit 120a, and various types of information can be input based on the detected location of the operating tool. That is, the user can perform various operation inputs by moving the operating tool on the screen 20. For example, the touch of the user's hand to the window or the UI object is detected, and as a result, the operation input to the window or the UI object is performed.

In addition, the camera included in the input unit 120a can not only photograph the top surface of the table 90a, but also photograph a user existing around the table 90a. In this case, the information processing system 10a can detect the position of the user around the table 90a based on the image captured by the input unit 120a. In addition, the information processing system 10a may perform personal recognition of the user by detecting physical characteristics (size or the like of a face or a body) of each user based on the captured image.

Note that the operation input of the user is not limited to the example described above, and may be executed by another method. For example, the input unit 120a may be arranged as a touch panel on the top surface (screen 20a) of the table 90a, and the operation input of the user may be detected by touching the touch panel with the user's finger or the like. Alternatively, a gesture operation of the user may be photographed by the camera included in the input unit 120a, and the operation input of the user may be detected based on the photographed image.

1-3. Modified Example

Figure 3:
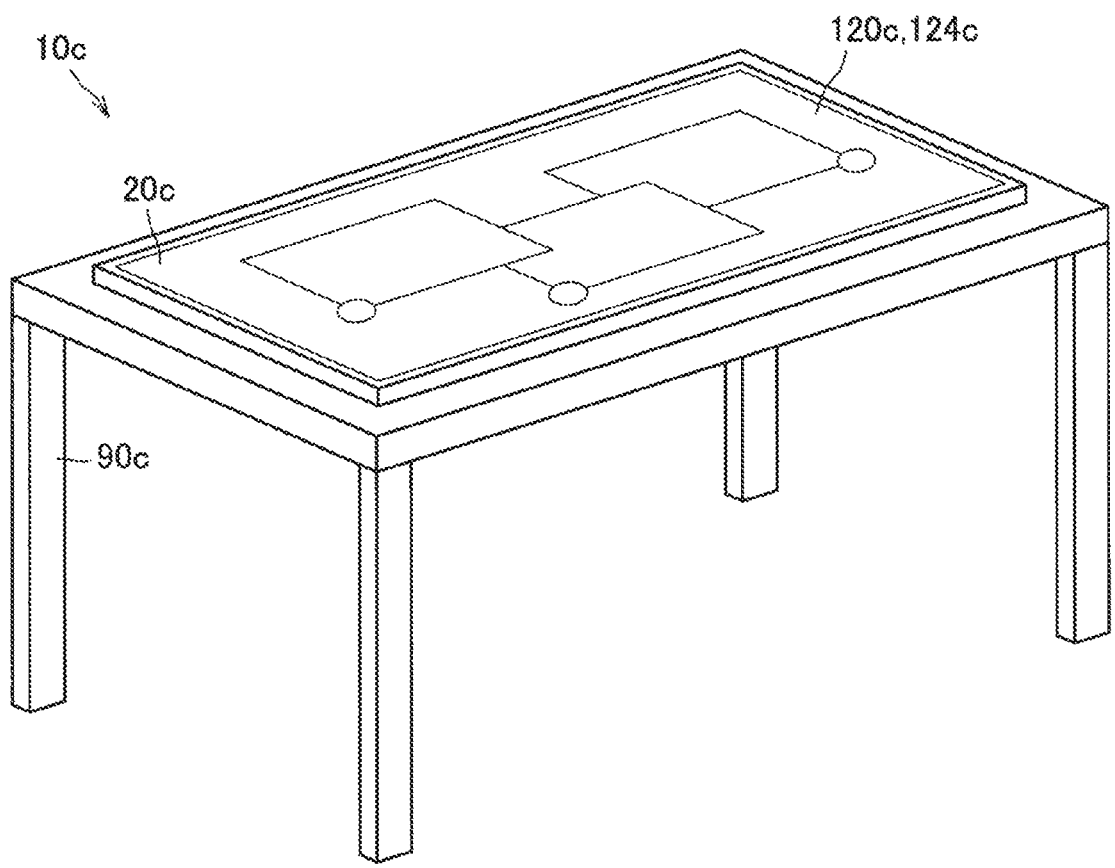
FIG. 3 is a diagram illustrating another configuration example of the information processing system 10 according to the present embodiment.
Figure 4:
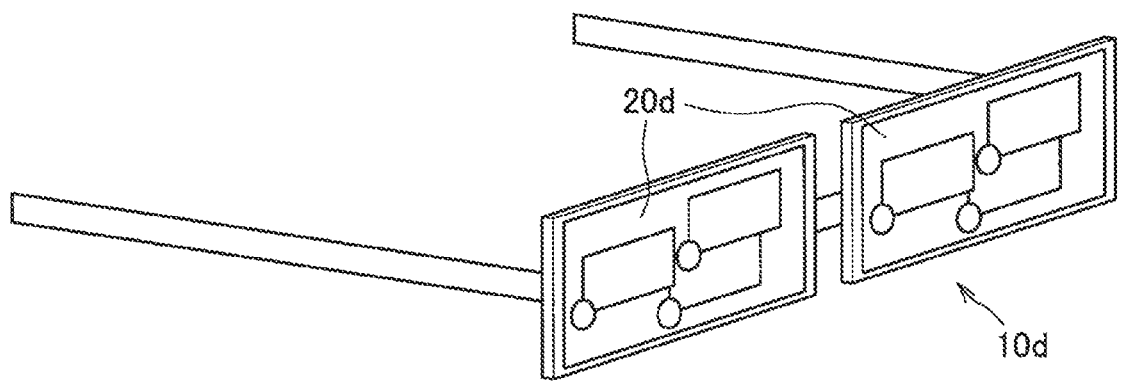
FIG. 4 is a diagram illustrating another configuration example of the information processing system 10 according to the present embodiment.

The configuration of the information processing system 10a according to the present embodiment has been described above. Note that the configuration of the information processing system 10 according to the present embodiment is not limited to the example illustrated in FIG. 1. The configuration of the information processing system 10 may be another configuration as illustrated in FIGS. 2 to 4, for example.

1-3-1. First Modified Example

Figure 2:
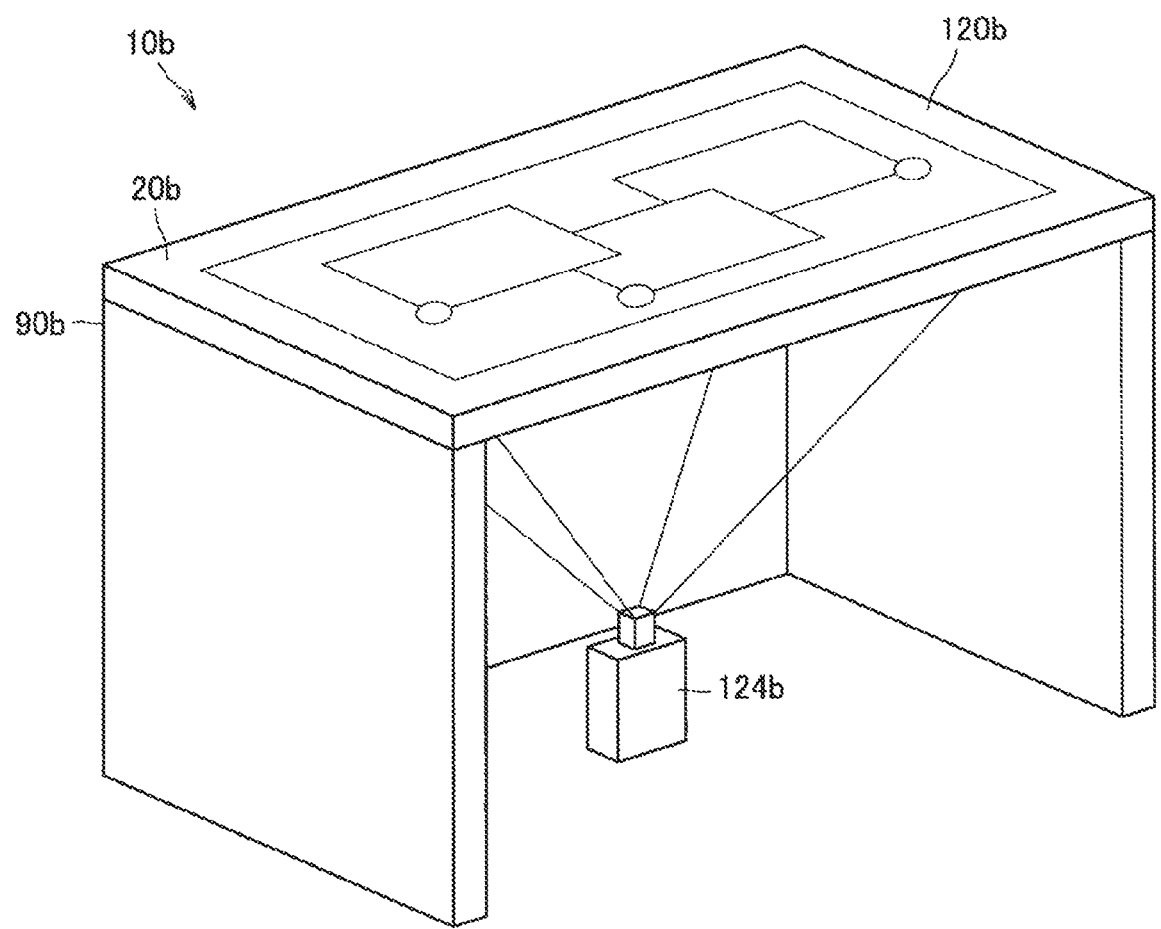
FIG. 2 is a diagram illustrating another configuration example of the information processing system 10 according to the present embodiment.

FIG. 2 is a diagram illustrating another configuration example (information processing system 10b) of the information processing system 10 according to the present embodiment. As illustrated in FIG. 2, in the information processing system 10b, an output unit 124b is arranged below the table 90b. The output unit 124b is, for example, a projector and projects information toward a top plate of the table 90b from below the table 90b. For example, the top plate of the table 90b is formed of a transparent material such as a glass plate or a transparent plastic plate. The information projected by the output unit 124b is displayed on the top surface (screen 20b) of the table 90b (through the top plate). Such a method of displaying information on the screen 20b by allowing the output unit 124b to project the information from below the table 90b is also referred to as a "rear projection type".

In addition, in the example illustrated in FIG. 2, an input unit 120b is provided on the screen 20b (display surface). For example, the input unit 120b is constituted by the touch panel. In this case, the touch of the operating tool on the screen 20b is detected by the touch panel, and as a result, the operation input of the user can be received. However, the present invention is not limited to such an example, and similarly to the information processing system 10a illustrated in FIG. 2, the input unit 120b may be arranged below the table 90b while being separated from the table 90b. In this case, the input unit 120b includes the camera, and the camera can photograph the operating tool located on the screen 20b over the top plate of the table 90b. The location of the operating tool can be detected based on the photographed image.

1-3-2. Second Modified Example

FIG. 3 is a diagram illustrating yet another configuration example (information processing system 10c) of the information processing system 10 according to the present embodiment. As illustrated in FIG. 3, in the information processing system 10c, a touch panel type display is arranged on a table 90c in a state in which a display surface of the touch panel type display faces upward. In the information processing system 10c, an input unit 120c and an output unit 124c can be integrally configured as the touch panel type display. That is, various types of information is displayed on the display screen (screen 20c) of the display, and the touch of the operating tool to the display screen of the display is detected by the touch panel, and as a result, the operation input of the user can be received.

Note that even in the information processing system 10c, the camera (an example of the input unit 120c) may be arranged above the output unit 124c, as in the information processing system 10a illustrated in FIG. 1. In this case, individual users located around the table 90c can be detected based on the image photographed by the camera.

1-3-3. Third Modified Example

FIG. 4 is a diagram illustrating yet another configuration example (information processing system 10d) of the information processing system 10 according to the present embodiment. As illustrated in FIG. 4, the information processing system 10d can be configured as a head-mounted type device (for example, glasses type device or the like) such as a head mounted display (HMD). The head-mounted type device may include an input unit 120d (not shown) and an output unit 124d (not shown). The output unit 124d may be configured as a transmissive display device. In this case, the output unit 124d can project an image using, as a projection plane (screen 20d), at least some area of a right-eye lens and a left-eye lens (or goggle type lens), respectively, included in the head-mounted type device.

Alternatively, the output unit 124d may be configured as a non-transmissive display device. For example, the output unit 124d may be configured to include a liquid crystal display (LCD) or an organic light emitting diode (OLED). In addition, the input unit 120d may include the camera. In this case, the camera may photograph video ahead of the user wearing the head-mounted type device, and the output unit 124d may sequentially display the photographed video. As a result, the user can see a landscape ahead of the user via the video displayed on the output unit 124d.

1-4. Arrangement of Problem

The configuration of the information processing system 10 according to the present embodiment has been described above. However, it is assumed that when a plurality of users performs communication, for example, in a class or a meeting, each user specifies a target by, for example, utterance, gesture, or the like, or each user performs an evaluation action on the target by, for example, the utterance, the gesture, or the like. It is assumed that for example, when a plurality of users perform some communication via the table 90a illustrated in FIG. 1, a certain user specifies, as a target, one of one or more real objects arranged on the screen 20a or one of one or more display objects displayed on the screen 20a.

This is desirable because if these evaluation actions can be automatically detected and aggregated, the contents of communication between the plurality of users can be confirmed, for example, after the communication. However, the existing technologies did not consider automatically detecting these evaluation actions.

The information processing system 10 according to the present embodiment was created by considering the above circumstances. The information processing system 10 according to the present embodiment can detect a pointing action for a certain user in a real space to specify a certain object and an evaluation action on the object by the user based on a signal output from one or more sensor included in the input unit 120, and update evaluation information (also referred to as object evaluation information) of the object specified by a detection result of the pointing action based on the detection result of the evaluation action. As a result, it is possible to appropriately detect the evaluation action on a certain object by a certain user in a real space and automatically aggregate the detection result.

Note that in this specification and the drawings, real objects arranged on the screen 20 and display objects displayed on the screen 20 may be collectively referred to as "objects located on the screen 20". Hereinafter, the contents of the present embodiment will be sequentially described in detail.

2. Detailed Description of Embodiment 2-1. Configuration

Figure 5:
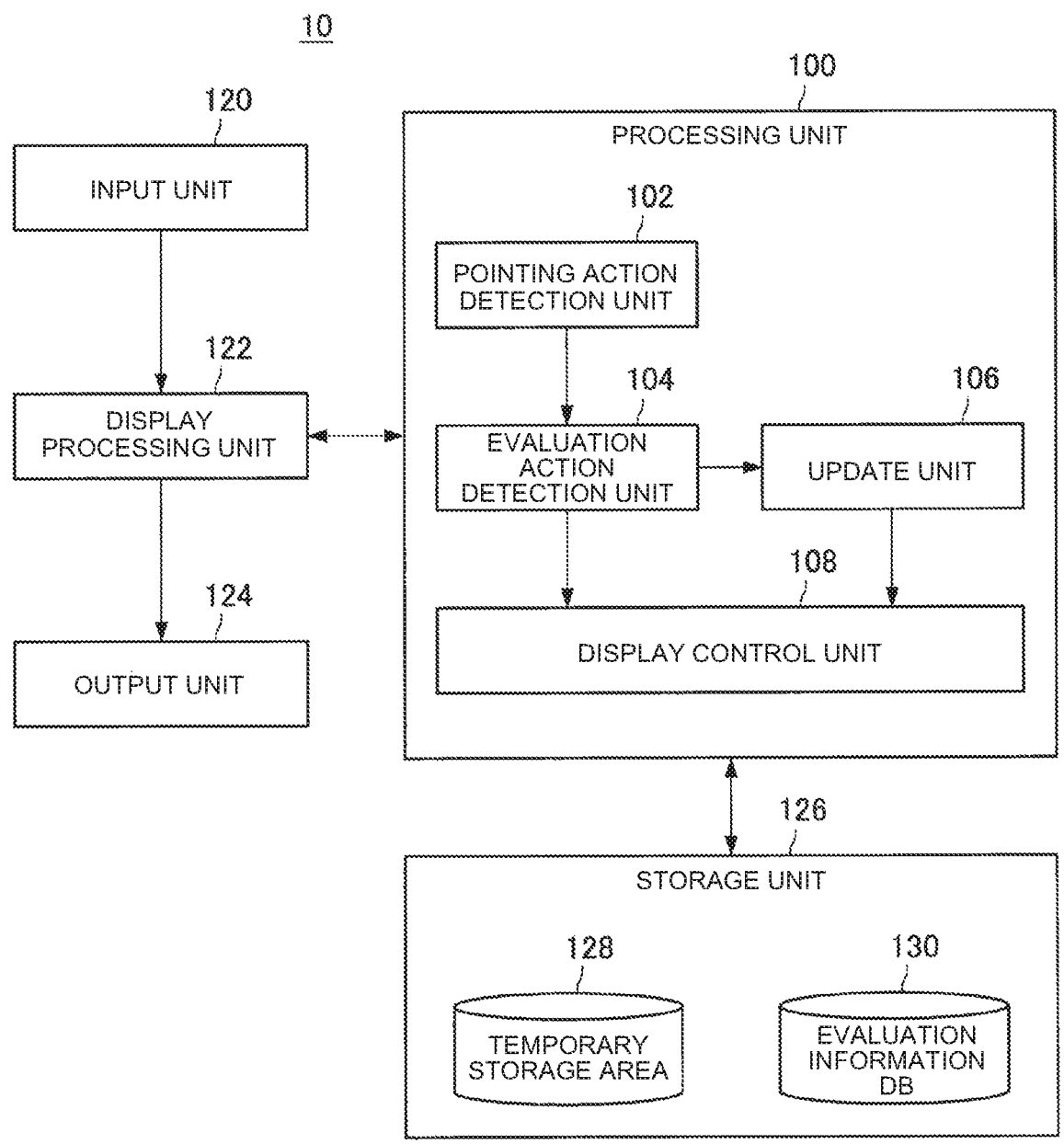
FIG. 5 is a block diagram illustrating an example of a functional configuration of the information processing system 10 according to the present embodiment.

Next, the functional configuration according to the present embodiment will be described in detail. FIG. 5 is a block diagram illustrating a functional configuration of the information processing system 10 according to the present embodiment. As illustrated in FIG. 5, the information processing system 10 includes a processing unit 100, the input unit 120, the display processing unit 122, the output unit 124, and a storage unit 126. Note that in the following, the description of the same contents as those described above will be omitted.

2-1-1. Display Processing Unit 122

The display processing unit 122 may be configured to include one or a plurality of processing circuits (for example, central processing unit (CPU) or graphics processing unit (GPU) or the like). The display processing unit 122 performs processing related to graphics that can be displayed by the output unit 124 based on the input information acquired by the input unit 120. For example, the display processing unit 122 performs drawing processing of a display object such as a window, and outputs the processed result to the output unit 124. As an example, the display processing unit 122 performs the drawing processing on these display objects in accordance with a user operation on the individual display objects.

In addition, the display processing unit 122 can acquire the input information (for example, captured image or the like), which is acquired by the input unit 120, from the input unit 120, and output the input information to the processing unit 100. Further, the display processing unit 122 can also receive the information, which is processed by the processing unit 100, from the processing unit 100, and perform the drawing processing based on the information.

2-1-2. Processing Unit 100

The processing unit 100 may be configured to include one or a plurality of processing circuits (for example, a CPU 150, a GPU, or the like described below). The processing unit 100 performs various processing based on the input information acquired by the input unit 120.

Further, as illustrated in FIG. 5, the processing unit 100 includes a pointing action detection unit 102, an evaluation action detection unit 104, an update unit 106, and a display control unit 108.

2-1-3. Pointing Action Detection Unit 102

The pointing action detection unit 102 detects the pointing action for a certain user in a real space in which the information processing system 10 is located to specify the certain object in the real space based on a signal output from one or more sensors included in the input unit 120. For example, the pointing action detection unit 102 detects movement of a hand, movement of a line of sight, presence or absence of an utterance, or the like of each user in the real space based on the signal, and detects the pointing actions of each user based on the detection result. Note that the information processing system 10 can be configured so that a speaker in the real space can be specified. For example, each user in the real space may use (for example, wear or the like) a different microphone. Alternatively, the input unit 120 includes a microphone array (that is, a microphone array is arranged in the real space), and the processing unit 100 can use, for example, the known method such as sound source separation processing using the microphone array to specify the speaker in the real space.

2-1-3-1. Gesture

Hereinafter, the method of detecting a pointing action described above will be described in more detail. For example, as illustrated in FIG. 6, when it is detected that the user has performed any specific gesture (hereinafter, may be referred to as "instructive gesture"), the evaluation action detection unit 104 detects the gesture as the pointing action of the user. FIG. 6 is a diagram illustrating an example of types of "instructive gesture" (that is, a gesture that can be detected as the pointing action). As illustrated in FIG. 6, for example, the touching of the object located on the screen 20 by the user, the pointing to the object located on the screen 20 by the user, and the arranging of the real object on the screen 20 by the user may be defined as the "instructive gesture".

For example, when a gesture for a user to touch a certain object located on the screen 20 is detected, the pointing action detection unit 102 can detect the gesture as the pointing action, and detect the object that the user touches as the target object of the pointing action. Alternatively, when a gesture for a user to point to a certain object located on the screen 20 is detected, the pointing action detection unit 102 can detect the gesture as the pointing action, and detect, as the target object of the pointing action, an object closest to a user's finger among one or more objects that intersect a straight line corresponding to the pointing direction. Alternatively, when a gesture for a user to arrange one real object on the screen 20 is detected, the pointing action detection unit 102 can detect the gesture as the pointing action, and detect the real object that the user arranges as the target object of the pointing action.

Figure 7A:
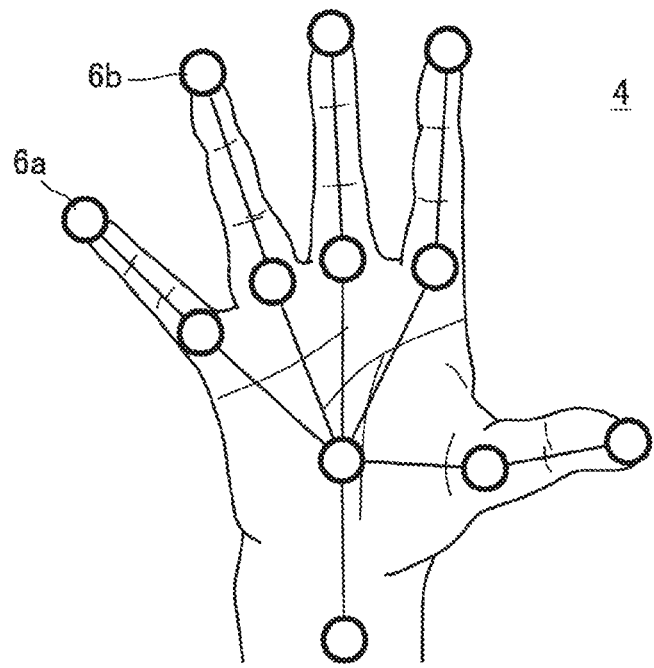
FIG. 7A is a diagram for explaining an example of a gesture specifying method.
Figure 7B:
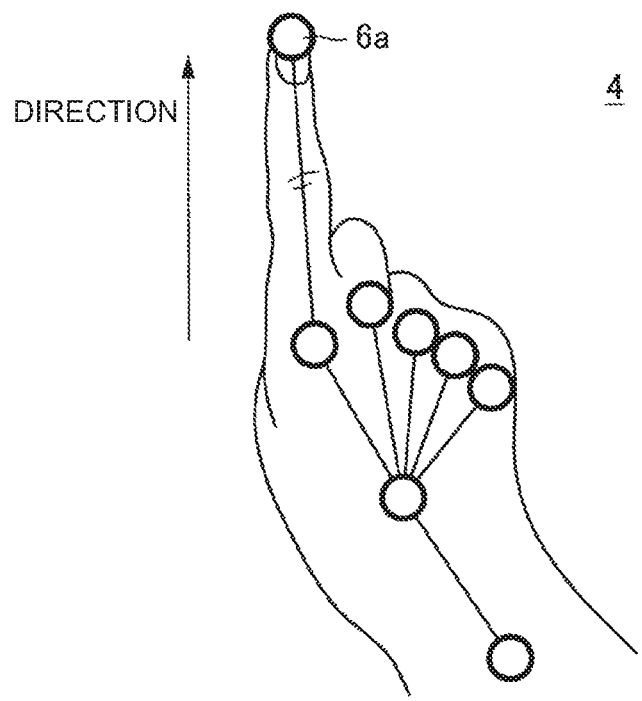
FIG. 7B is a diagram for explaining an example of the gesture specifying method.
Figures 7C, 8:
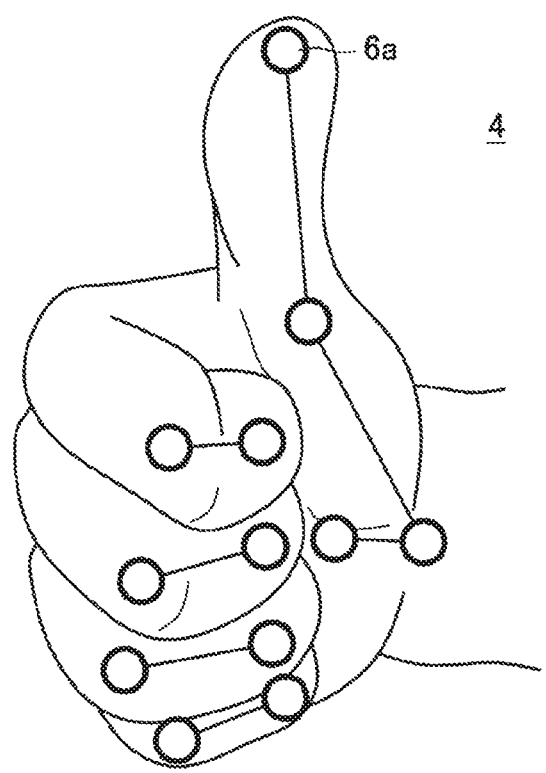
FIG. 7C is a diagram for explaining an example of the gesture specifying method.
FIG. 8 is a definition table illustrating examples of types of words included in an utterance that can be detected as the pointing action.

FIGS. 7A, 7B, and 7C are diagrams for explaining an example of a gesture specifying method using a hand. For example, the processing unit 100 (pointing action detection unit 102 and the like) first specifies a total of 12 points of a location of a wrist of the hand, a center location of the hand, locations of bases of each finger of the hand, and locations of tips of each finger as illustrated in FIG. 7A based on a sensing result (bone data and the like) of one hand of the user acquired by the input unit 120. The processing unit 100 recognizes types of gestures of the hand based on the positional relation of these 12 points. For example, when it is specified that the positional relation of these 12 points is the positional relation as illustrated in FIG. 7B, the processing unit 100 may recognize the gesture of the hand as a "pointing gesture" and recognize a direction of an index finger of the hand as the pointing direction. In addition, when it is specified that the positional relation of these 12 points is the positional relation as illustrated in FIG. 7C, the processing unit 100 may recognize the gesture of the hand as a "thumb up gesture".

2-1-3-2. Utterance

Alternatively, when a certain user's utterance is detected, the pointing action detection unit 102 may detect the utterance as the pointing action of the user based on a speech recognition result of the utterance. Further, the pointing action detection unit 102 can specify the target object of the pointing action (that is, the utterance) based on the speech recognition result of the utterance. For example, when the speech recognition result of the detected user's utterance includes a word specifying any object in the real space, for example, as illustrated in FIG. 8, the pointing action detection unit 102 detects the utterance as the pointing action, and specifies the object specified by the word as the target object of the utterance. As an example, when the speech recognition result of the detected user's utterance is "idea you just came up with . . . ", the pointing action detection unit 102 may specify, as the target object of the utterance, an object (for example, an object or the like that the another user arranges on the screen 20 just before) that corresponds to a previous action of another user that the user is speaking to.

FIG. 8 is a definition table illustrating an example of a plurality of predetermined words (hereinafter, also referred to as "instructive words") that can be recognized as the pointing action. For example, when the user's utterance is detected and the speech recognition result of the utterance includes any of the words illustrated in FIG. 8, the pointing action detection unit 102 can detect the utterance as the pointing action.

Figure 9:
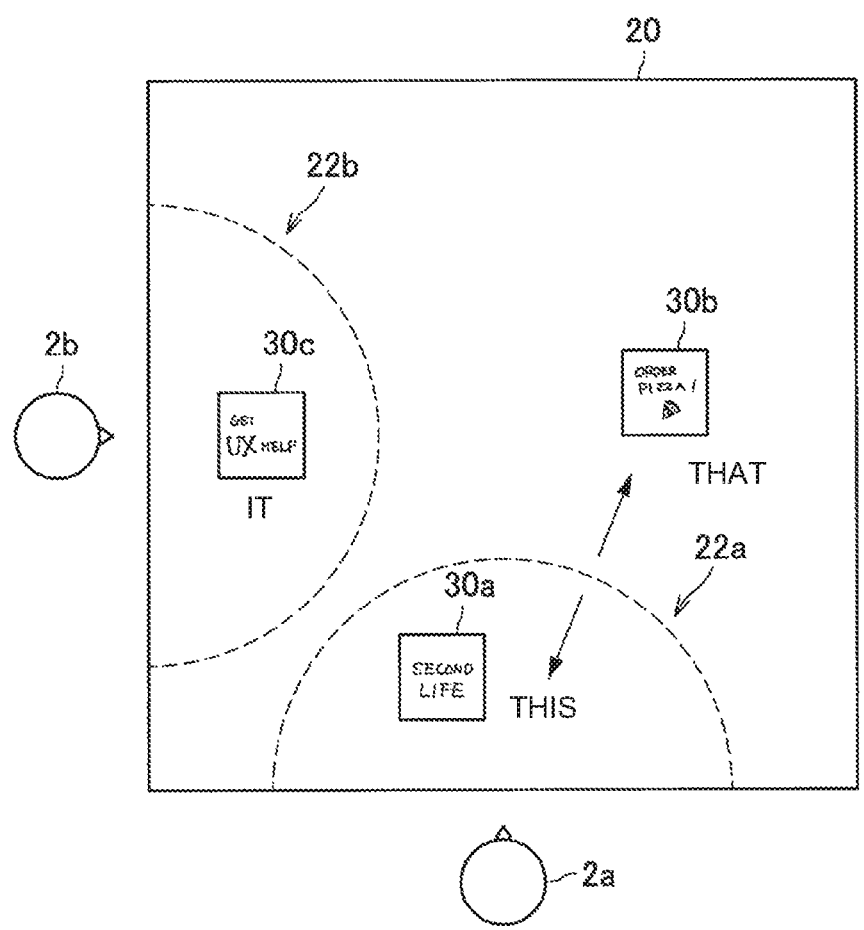
FIG. 9 is a diagram illustrating a specific example of an object to be uttered when the utterance is detected as the pointing action.

Here, the above functions will be described in more detail with reference to FIGS. 9 and 10. FIG. 9 is a diagram illustrating an example in which three tags 30 are located on the screen 20 and two users 2 are located around the screen 20. In the example illustrated in FIG. 9, when it is detected that a user 2a has uttered, the pointing action detection unit 102 uses the speech recognition result of the utterance and the definition table illustrated in FIG. 8 to specify the target object of the utterance from the three tags 30.

In the example illustrated in FIG. 9, when it is detected that the user 2a has uttered "this", the pointing action detection unit 102 specifies a tag 30a located in an area 22a within a predetermined distance from the location of the user 2a as the target object of the utterance. In addition, when it is detected that the user 2a has uttered "that", the pointing action detection unit 102 specifies a tag 30b located outside the area 22a as the target object of the utterance. In addition, when it is detected that a user 2c has uttered "it", the pointing action detection unit 102 specifies a tag 30c located in an area 22b within a predetermined distance from another user (another participant) 2b as the target object of the utterance.

Figure 10:
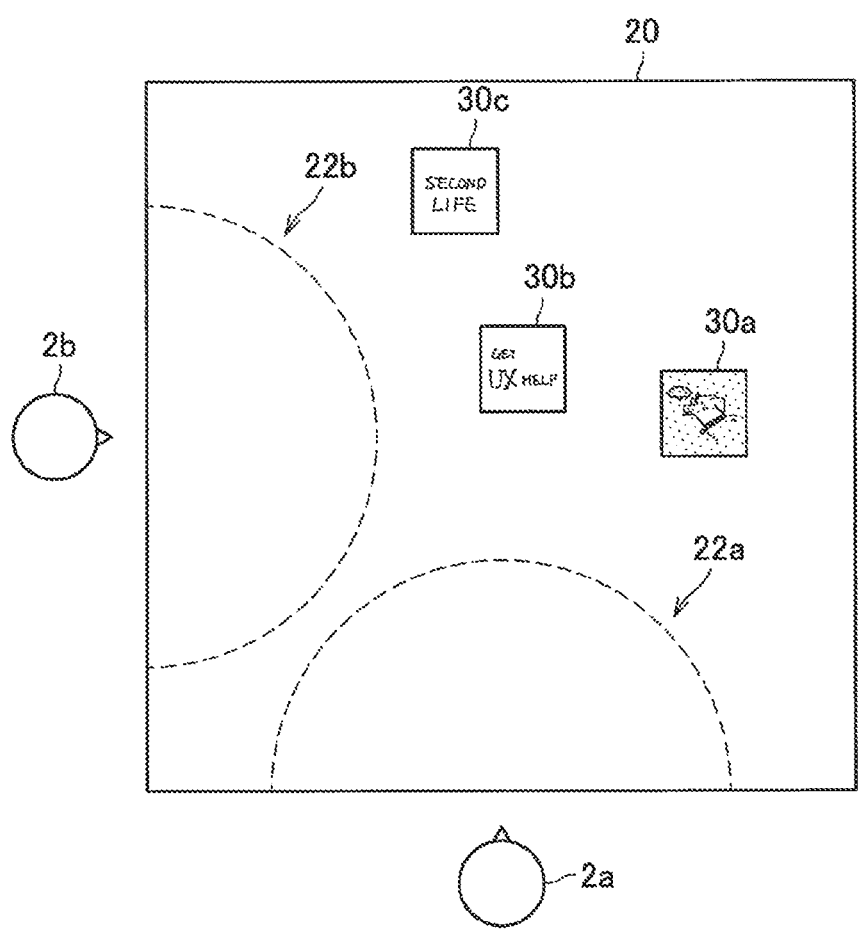
FIG. 10 is a diagram illustrating another specific example of the object to be uttered when the utterance is detected as the pointing action.

FIG. 10 is a diagram illustrating an example in which all three tags 30 are located outside the area 22a and the area 22b (unlike the example illustrated in FIG. 9). In the example illustrated in FIG. 10, when it is recognized that the user 2a has made an utterance including a word indicating the information described in the tag 30 such as "that picture of the dog", the pointing action detection unit 102 may specify the tag 30a on which the "picture of the dog" is drawn as the target object of the utterance based on the recognition result. Alternatively, when it is recognized that the user 2a has made an utterance including a word indicating a relative direction such as "idea on the right side", the pointing action detection unit 102 may specify, as the target object of the utterance, the tag 30a located at the rightmost side of the three tags 30 with respect to the direction of the user 2a based on the recognition result and the location and posture of the user 2a.

Alternatively, when it is recognized that the user 2a has made an utterance including a word indicating attributes (color and the like) of an object such as "that pink picture", the pointing action detection unit 102 may specify the tag 30a whose color is "pink" as the target object of the utterance based on the recognition result.

2-1-3-3. Combination

As a modified example, the pointing action detection unit 102 may detect the utterance as the user's pointing action based on a combination of the speech recognition result of the utterance and the recognition result of the gesture performed by the user, and specify the target object of the utterance based on the combination. For example, when it is detected that the user arranges a certain object on the screen 20 and then makes some utterance, the pointing action detection unit 102 may detect the utterance as the user's pointing action, and specify the object that the user arranges as the target object of the utterance. Alternatively, when it is detected that the user makes some utterance while directly touching a certain object or pointing to a certain object, the pointing action detection unit 102 may detect the utterance as the pointing action of the user and specify the target object of the gesture that the user performs as the target object of the utterance.

Alternatively, only when there are a plurality of objects corresponding to the speech recognition result of the user's utterance (that is, when the object corresponding to the speech recognition result cannot be uniquely specified), the pointing action detection unit 102 may specify one of the plurality of objects as the target object of the utterance based on the combination of the speech recognition result of the utterance and the gesture recognition result that the user performs. For example, the pointing action detection unit 102 gives priority to the recognition result of the user's gesture over the speech recognition result of the user's utterance (in other words, the speech recognition result of the utterance is used as a supplement), and as a result, may specify the target object of the utterance from the plurality of objects.

2-1-4. Evaluation Action Detection Unit 104

The evaluation action detection unit 104 detects an evaluation action for a user in the real space to evaluate an object in the real space based on a signal output from one or more sensors included in the input unit 120 and a detection result by the pointing action detection unit 102. Further, the evaluation action detection unit 104 can specify the evaluation information corresponding to the detected evaluation action, and store the specified evaluation information in a temporary storage area 128 described below which is, for example, stored in the storage unit 126.

For example, the evaluation action detection unit 104 detects an evaluation action of a certain user on a target object of a pointing action detected by the pointing action detection unit 102 based on a signal output from one or more sensors included in the input unit 120. As an example, the evaluation action detection unit 104 detects movement of a hand, movement of a line of sight, or presence or absence of an utterance of each user in the real space based on the signal, and detects the evaluation actions of each user based on the detection result.

For example, the evaluation action detection unit 104 may detect the same object as the target object of the pointing action detected by the pointing action detection unit 102 as the target object of the detected evaluation action. Alternatively, the evaluation action detection unit 104 may detect, as the target object of the evaluation action, an object (for example, object or the like that is specified based on the sensing information acquired by the input unit 120 when the evaluation action is detected) different from the target object of the pointing action.

2-1-4-1. Gesture

Hereinafter, the method of detecting an evaluation action will be described in more detail. For example, as illustrated in FIG. 11, when it is detected that the user has performed any specific gesture (hereinafter, may be referred to as "evaluative gesture"), the evaluation action detection unit 104 can detect the gesture as the evaluation action of the user. FIG. 11 is a diagram illustrating an example of a type of "evaluative gestures" (that is, gestures that can be detected as the evaluation action). As illustrated in FIG. 11, for example, a "thumb up" gesture, an "OK" gesture, a "thumb down" gesture, a "make x with finger" gesture, and the like can be defined as the "evaluative gestures". As illustrated in FIG. 11, for example, when the "thumb up" gesture is detected, the evaluation action detection unit 104 specifies an evaluation point corresponding to the gesture as "+10 points". In addition, when the "thumb down" gesture is detected, the evaluation action detection unit 104 specifies an evaluation point corresponding to the gesture as "−10 points".

Note that for the evaluation points of each gesture illustrated in FIG. 11, appropriate values can be determined according to, for example, a culture or socially accepted idea of a region where the screen 20 is located. For example, when a certain gesture is regarded as a positive gesture in the area, a positive value can be determined as an evaluation point of the gesture. In addition, when a certain gesture is regarded as a negative gesture in the area, a negative value can be determined as an evaluation point of the gesture.

2-1-4-2. Utterance

Figures 13, 14, 15:
FIG. 13 is a definition table illustrating examples of adjectives/adverbs indicating a degree of evaluation included in the utterance that can be detected as the evaluation action.
FIG. 14 is a diagram illustrating a definition example of coefficients for evaluation points of the utterance for each volume level of the utterance that can be detected as the evaluation action.
FIG. 15 is a diagram for explaining a determination example of the evaluation points of the utterance detected as the evaluation action.

Alternatively, the evaluation action detection unit 104 can detect the utterance as the evaluation action of the user based on a character string included in the speech recognition result of a certain user's utterance and predetermined definition tables (hereinafter, referred to as an "utterance definition table") as illustrated in FIGS. 12 to 14, for example. FIG. 12 is a diagram illustrating an example of a definition table of "evaluative adjective" included in an utterance that can be detected as an evaluation action. That is, when any of the adjectives illustrated in FIG. 12 is included in the speech recognition result of the user's utterance, the utterance can be recognized as the evaluation action. FIG. 13 is a diagram illustrating a definition table of adjectives/adverbs (hereinafter, sometimes referred to as an "adjective/adverb indicating a degree") indicating the degree of "evaluative adjective" that is included in an utterance that can be detected as an evaluation action and is illustrated in, for example, FIG. 12. FIG. 14 is a diagram illustrating an example of a definition table of coefficients for evaluation points of the utterance for each volume level at the time of the utterances of the "evaluative adjective" and the "adjective/adverb indicating a degree".

For example, the evaluation action detection unit 104 determines an evaluation point corresponding to the speech recognition result of the utterance using the speech recognition result of the user's utterance and the definition tables illustrated in FIGS. 12 to 14. As an example, it is assumed that the speech recognition result of the utterance includes the word "good", the word "good" is modified by the word "great" in the speech recognition result, and the word "great" is uttered "loudly". In this case, the evaluation action detection unit 104 may determine the evaluation point of the utterance as a "+40" points (="+10"×"2.0"×"2.0").

Specific Example

Here, a specific analysis example of the speech recognition result of the utterance that can be detected as the evaluation action will be described with reference to FIG. 15. As illustrated in FIG. 15, it is assumed that a user has uttered, for example, "I think this is a so much nice idea"

In this case, the input unit 120*a* first acquires a voice data of the utterance. The voice data can include information indicating the volume of the utterance along a time axis. Next, the processing unit 100 performs speech recognition on the voice data, and specifies a character string corresponding to the result of the speech recognition, for example, as illustrated in FIG. 15 Next, the processing unit 100 analyzes a part of speech and a relation of each word included in the character string. For example, since "this" is defined as an "instructive word", the pointing action detection unit 102 detects the utterance as a pointing action. Further, since the "nice" is defined as "evaluative adjective", the evaluation action detection unit 104 detects the utterance as an evaluation action. In addition, the evaluation action detection unit 104 analyzes that the "so" and the "much" are "adverbs indicating a degree" and each word modifies the "nice". Next, the evaluation action detection unit 104 specifies, based on the voice data, that the volume at the time of the utterance of the "nice" is higher than the standard volume.

The evaluation action detection unit 104 calculates evaluation points for the utterance using each word analyzed from the speech recognition result and an utterance definition table (for example, a definition table of the "evaluative adjective", a definition table of the adjective/adverb indicating a degree", a definition table of coefficients for a volume level at the time of an utterance, and the like). For example, as illustrated in FIG. 15, it is assumed to be defined such that "so" is "×2.0", "much" is "×2.0", "nice" is "+10 points", and "nice" is "×2.0" when the "nice" is uttered loudly. In this case, the evaluation action detection unit 104 may determine the evaluation point of the utterance as a "+80 points" (="+10"×"2.0"×"2.0"×"2.0").

Modified Example

Although FIG. 15 shows an example in which a language of an utterance is English, for example, when the language is Japanese or Chinese, the processing unit 100 may determine an evaluation point of the utterance using the following method. Specifically, the processing unit 100 first performs a morphological analysis on the character string corresponding to the speech recognition result of the voice data of the utterance, thereby separating the character string into a clause. The evaluation action detection unit 104 may detect the utterance as the evaluation action based on a part of speech of each clause and a predetermined utterance definition table, and determine the evaluation point of the utterance.

As another modified example, when it is recognized that the user is making a gesture during or immediately before the utterance, the evaluation action detection unit 104 may add the evaluation point corresponding to the recognition result of the gesture to the evaluation point (for example, "+80 points") of the utterance to determine the evaluation point of the evaluation action (specifically, the combination of the utterance and the gesture) related to the utterance.

2-1-5. Update Unit 106

The update unit 106 updates the evaluation information of one or more objects based on the detection result by the pointing action detection unit 102 and the detection result of the evaluation action by the evaluation action detection unit 104. For example, the update unit 106 updates the evaluation information of the target object of the pointing action detected by the pointing action detection unit 102 based on the detection result of the evaluation action. Here, the evaluation information of each object may be stored in evaluation information DB 130 described below. The evaluation information DB 130 is, for example, a database in which IDs of individual objects are associated with evaluation information of the objects.

For example, when the gesture of the user is detected as the evaluation action by the evaluation action detection unit 104, the update unit 106 adds an evaluation value corresponding to the gesture to an evaluation value corresponding to the evaluation information of the target object of the pointing action detected by the pointing action detection unit 102 to update the evaluation information of the object. Alternatively, when the utterance of the user is detected as the evaluation action by the evaluation action detection unit 104, the update unit 106 adds an evaluation value corresponding to the utterance to the evaluation value corresponding to the evaluation information of the target object of the pointing action detected by the pointing action detection unit 102 to update the evaluation information of the object. Here, the "evaluation value" may be basically the same as the above "evaluation point", but is not limited to such an example, and may be a value different from the "evaluation point".

2-1-5-1. Modified Example

As a modified example, the update unit 106 may determine whether the evaluation target of the detected evaluation action is a predetermined group including the target object of the detected pointing action or is a single object based on the detection result of the pointing action.

When it is determined that the evaluation target of the evaluation action is the predetermined group, the update unit 106 may update evaluation information of each of all objects included in the predetermined group based on the detection result of the evaluation action. In addition, when it is determined that the evaluation target of the evaluation action is the single object, the update unit 106 may update only the evaluation information of the object based on the detection result of the evaluation action.

2-1-6. Display Control Unit 108

The display control unit 108 performs display control according to the evaluation information of one or more objects in the real space. For example, the display control unit 108 displays a display (predetermined image or the like) indicating the evaluation information of each object stored in the temporary storage area 128 and/or the evaluation information DB 130 in association with each object located in the real space on, for example, the output unit 124 in real time in association with the object. Further, each time the evaluation information of each object in the real space is updated by the update unit 106, the display control unit 108 may change a display mode of a display indicating the evaluation information of the object according to the evaluation value corresponding to the updated evaluation information of the object. Alternatively, the display control unit 108 may perform the display control on each object so that the higher the evaluation value corresponding to the evaluation information of each object in the real space, the higher the visibility of the information described in the object.

Figures 16, 17, 18:
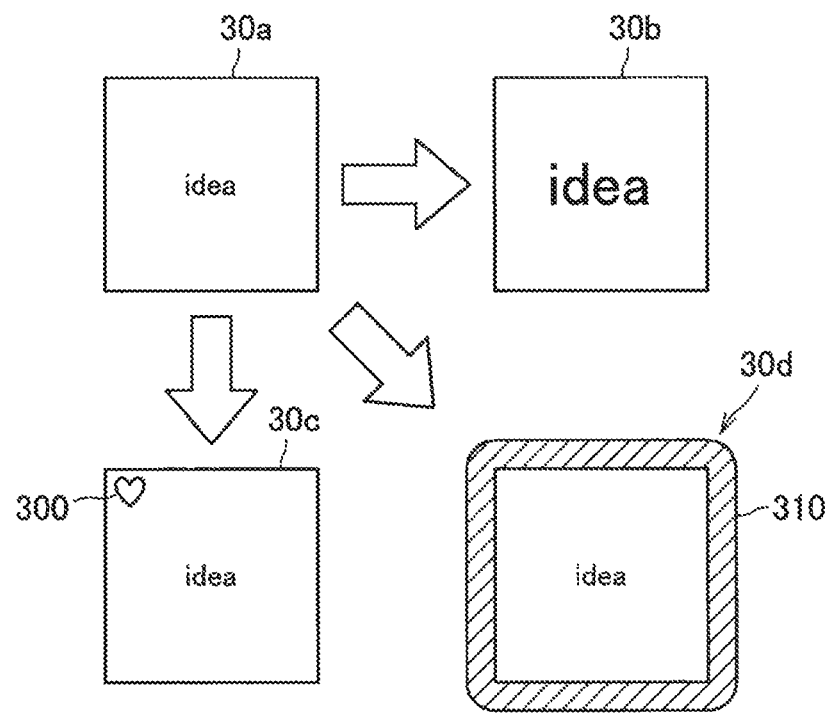
FIG. 16 is a diagram illustrating an example in which evaluation information corresponding to an object is displayed in association with the object.
FIG. 17 is a diagram illustrating a configuration example of a temporary storage area 128 according to the present embodiment.
FIG. 18 is a diagram illustrating a configuration example of evaluation information DB 130 according to the present embodiment.

Here, the above function will be described in more detail with reference to FIG. 16. FIG. 16 is a diagram illustrating a display example of evaluation information corresponding to a certain tag 30 (object). For example, when the evaluation point corresponding to the tag 30 is equal to or greater than a predetermined value, the display control unit 108 may display each character in the character string described in the tag 30 as a boldface in real time or may increase a size of each character in real time as in tag 30*b* illustrated in FIG. 16. Alternatively, the display control unit 108 may gradually increase the thickness and size of each character included in the character string described in the tag 30 in real time as the evaluation point corresponding to the tag 30 increases.

Alternatively, when the evaluation point corresponding to the tag 30 is equal to or greater than a predetermined value, the display control unit 108 displays, for example, a tag 300 indicating importance in the tag 30 in real time, as the tag 30*c* illustrated in FIG. 16. Alternatively, the display control unit 108 may increase the number of tags 300 displayed in the tag 30 as the evaluation point corresponding to the tag 30 increases. Alternatively, when the evaluation point corresponding to the tag 30 is equal to or greater than the predetermined value, as a tag 30*d* illustrated in FIG. 16, the display control unit 108 may display a predetermined effect 310 (for example, light up around the tag 30 or the like) in real time in association with the tag 30. Alternatively, the display control unit 108 may gradually increase the size and luminance of light 310 around the tag 30 in real time as the evaluation point corresponding to the tag 30 increases.

According to these display examples, each participant can know in real time which object on the screen 20 is determined (evaluated) to be more important in the ongoing communication.

2-1-7. Storage Unit 126

The storage unit 126 can be configured to include a storage device 164 described below. The storage unit 126 stores various data and various types of software. For example, the storage unit 126 stores the temporary storage area 128 and the evaluation information DB 130. The temporary storage area 128 and the evaluation information DB 130 can be realized in a form such as a relational database or a lookup table, for example.

2-1-8. Temporary Storage Area 128

The temporary storage area 128 is an area for temporarily storing evaluation information corresponding to each evaluation action detected by the evaluation action detection unit 104, for example. For example, each time the evaluation action detection unit 104 detects the evaluation action, the evaluation action detection unit 104 may sequentially store the evaluation information corresponding to the evaluation action in the temporary storage area 128. Further, each time each of evaluation information stored in the temporary storage area 128 is reflected (for example, added) to the evaluation information DB 130, the update unit 106 can delete the evaluation information from the temporary storage area 128.

FIG. 17 is a diagram illustrating a configuration example of the temporary storage area 128. As illustrated in FIG. 17, in the temporary storage area 128, for example, a target 1280, an evaluator 1282, a time 1284, an evaluation point 1286, and the like are associated. Here, the target 1280 may store identification information of the target object of the detected evaluation action. Further, the evaluator 1282 may store identification information of a user (evaluator) who has performed the evaluation action. In addition, the time 1284 can store the time when the evaluation action was detected. In addition, the evaluation point 1286 can store the evaluation point corresponding to the evaluation action. The example illustrated in FIG. 17 shows that user "A" has performed an evaluation action corresponding to "10 points" at time "00'10'"" for object "tag 1".

2-1-9. Evaluation Information DB 130

The evaluation information DB 130 is, for example, a database for storing the evaluation information of each object located in the real space. FIG. 18 is a diagram illustrating a configuration example of the evaluation information DB 130. As illustrated in FIG. 18, in the evaluation information DB 130, for example, a target 1300, an evaluation point 1302, and the like are associated. Here, the target 1300 may store identification information of each object. In addition, the evaluation point 1302 can store a total evaluation point corresponding to each evaluation action of one or more users for the object performed within a predetermined time. The example illustrated in FIG. 18 shows that the total evaluation point corresponding to the object "tag 1" as "15 points" is stored in the evaluation information DB 130.

As a modified example, in the evaluation information DB 130, a creator 1304 and an evaluator 1306 may be further associated. Here, the creator 1304 may store the identification information (in other words, the user who first focuses on the object as an evaluation target) of the user who first performed the evaluation action on the object. Further, the evaluator 1306 may store identification information of each user who has performed the evaluation action on the object. In this case, the evaluation points are aggregated in units of the evaluation target object and the evaluator, and these aggregated evaluation points can each be stored in the evaluation information DB 130.

2-2. Application Example

Figure 19A:
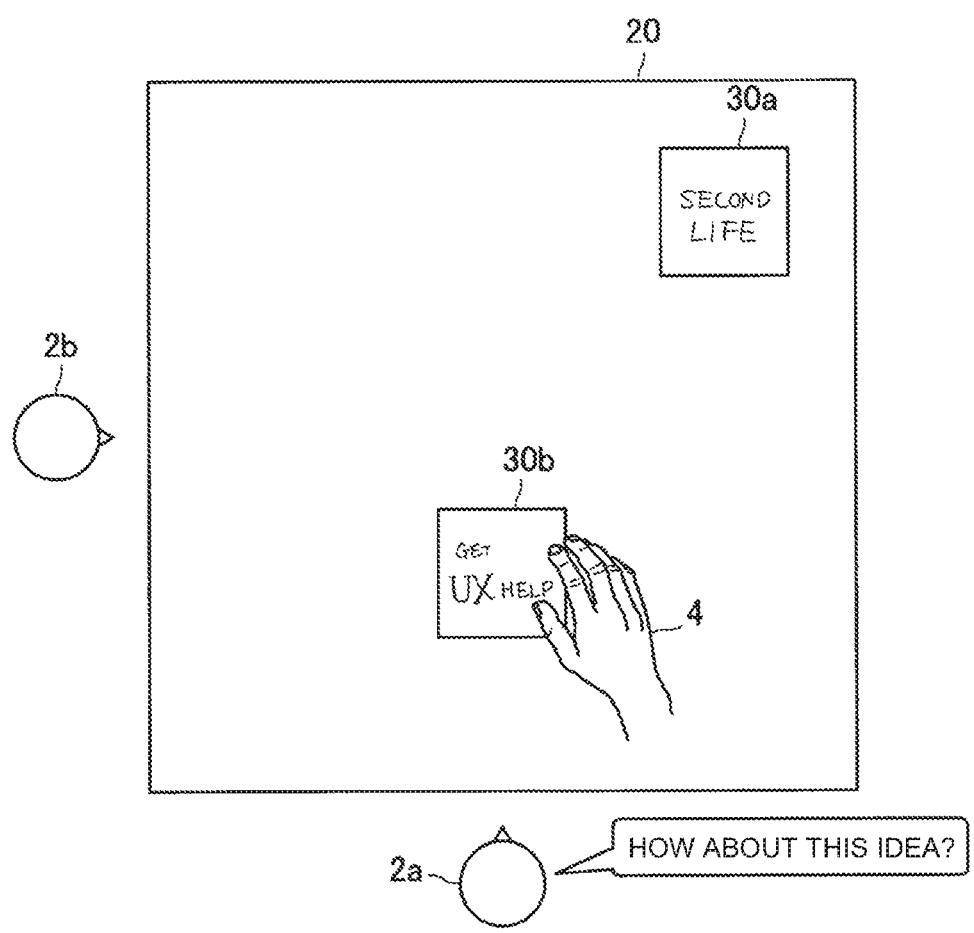
FIG. 19A is a diagram illustrating a part of an application example according to the present embodiment.

The functional configuration according to the present embodiment has been described above. Next, an application example according to the present embodiment will be described with reference to FIGS. 19A, 19B, 19C, 19D, and 19E. Here, as illustrated in FIG. 19A, a scene where two users 2 are located around the screen 20 and a discussion such as brainstorming is being performed is assumed. In the examples illustrated in FIGS. 19A, 19B, 19C, 19D, and 19E, it is assumed that no evaluation information is stored in the evaluation information DB 130 in the initial state.

As illustrated in FIG. 19A, first, it is assumed that the user 2a utters "how about this idea?" while arranging the tag 30b on the screen 20.

In this case, first, the pointing action detection unit 102 detects the utterance as the pointing action for the user 2a to specify the tag 30b. For example, the pointing action detection unit 102 specifies the target object of the utterance as the tag 30b, based on a word indicating that a distance between the user 2a and the target is short, such as "this" included in the speech recognition result of the utterance of the user 2a collected by the input unit 120, the recognition result of movement of a hand 4 operating the tag 30b, or the like. Thereafter, it is assumed that a predetermined time has elapsed without the user 2a performing the evaluation action. In this case, the detection result of the pointing action can be discarded.

Thereafter, as illustrated in FIG. 19B, it is assumed that the user 2b utters "That's good". In this case, the pointing action detection unit 102 detects the utterance as the pointing action for the user 2b to specify the tag 30b. Specifically, the pointing action detection unit 102 specifies the tag 30b located in an area 22 within a predetermined distance from the other user 2a as the target object of the utterance based on the word "that" included in the speech recognition result of the utterance.

Further, the evaluation action detection unit 104 first detects the utterance as the evaluation action on the object based on a predetermined utterance definition table and the word (evaluative adjective) "good" included in the speech recognition result of the utterance. Next, the evaluation action detection unit 104 specifies an evaluation point corresponding to the utterance as "+10 points" based on the word "good" and the predetermined utterance definition table. As illustrated in FIG. 19C, the evaluation action detection unit 104 stores the specified result (evaluation information) in the temporary storage area 128.

Figure 19D:
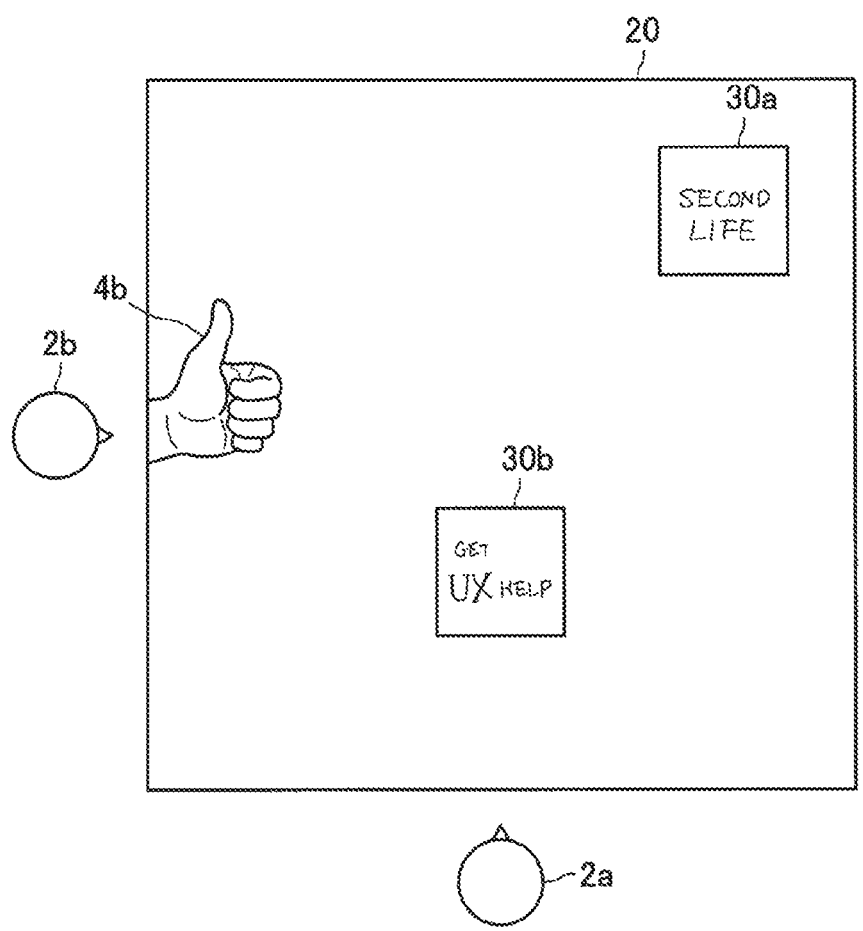
FIG. 19D is a diagram illustrating a part of the application example according to the present embodiment.

Thereafter, it is assumed that the user 2b has performed a "thumb up" gesture with a right hand of a user 2b as illustrated in FIG. 19D within the predetermined time from the timing illustrated in FIG. 19B. In this case, the evaluation action detection unit 104 detects the gesture as a new evaluation action of the user 2b on the tag 30b (which is the target of the pointing action detected just before) based on the recognition result of the "thumb up" gesture and the definition table of the "evaluative gesture" as illustrated in FIG. 11, for example. The evaluation action detection unit 104 specifies an evaluation point corresponding to the gesture as "+10 points" based on the recognition result of the gesture and the predetermined definition table. The evaluation action detection unit 104 adds the specified result (evaluation information) to the temporary storage area 128, as indicated by a dashed rounded rectangle in FIG. 19E.

Thereafter, it is assumed that the predetermined time has elapsed from the timing illustrated in FIG. 19B without the user 2b performing the evaluation action. In this case, first, the update unit 106 aggregates all information stored in the temporary storage area 128 for each object. For example, the update unit 106 calculates the total of the evaluation points corresponding to the tag 30b within the predetermined time as "+20 points". As illustrated in FIG. 19E, the update unit 106 adds the calculated evaluation point of the tag 30b to the evaluation information DB 130.

2-2-1. Modified Example

In the above description, an example has been described in which the detection result of the pointing action is discarded when a predetermined time elapses without one user 2 performing the evaluation action from the time when the pointing action by the same user 2 is detected, but the present embodiment is not limited to such an example. For example, when it is detected that another user 2b has performed some evaluation action within the predetermined time from the time when the pointing action by a certain user 2a is detected, the evaluation action detection unit 104 considers that another user 2b has performed the evaluation action on the target object of the pointing action by the user 2a and may add the evaluation point corresponding to the evaluation action of the user 2b to the evaluation information of the object.

2-3. Processing Flow

The application example according to the present embodiment has been described above. Next, a flow of processing according to the present embodiment will be described.

Figure 21:
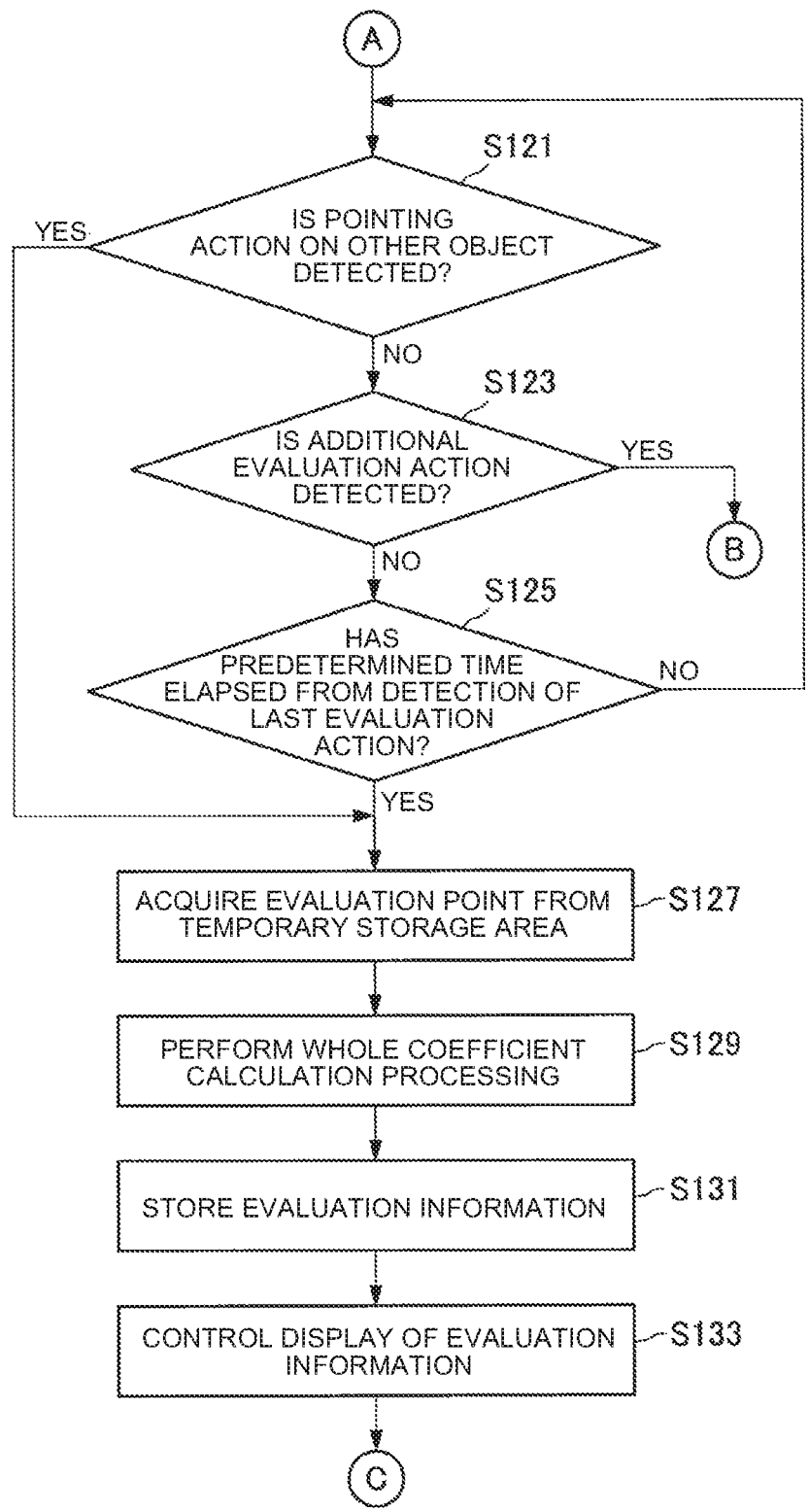
FIG. 21 is a flowchart illustrating a part of the flow of processing according to the present embodiment.

FIGS. 20 and 21 are flowcharts each illustrating a part of the flow of processing according to the present embodiment. As illustrated in FIG. 20, unless a user's end operation is detected (S101: No), the processing unit 100 repeats the processing of S103 to S133 described below. When it is detected that the user has performed the end operation (S101: Yes), the processing flow ends.

Specifically, first, the processing unit 100 acquires, from the input unit 120, the input information (various sensing results, and the like) acquired by the input unit 120 in the real space where the information processing system 10 is located (S103).

Subsequently, the pointing action detection unit 102 determines whether any user in the real space performs a pointing action for specifying a certain object based on the input information acquired by the input unit 120 (S105). While the pointing action is not detected (S105: No), the processing unit 100 repeats processing of S103 and after again.

On the other hand, when the pointing action is detected (S105: Yes), the evaluation action detection unit 104 determines whether there is the evaluation action by the user who has performed the pointing action detected in S105 based on, for example, the input information acquired by the input unit 120 in real time (S107). When the evaluation action has not been detected (S107: No), the processing unit 100 determines whether a predetermined time has elapsed from S105 (that is, when the corresponding pointing action is detected) (S109). When the predetermined time has elapsed from S105 (S109: Yes), the processing unit 100 regards that the evaluation action on the target object of the pointing action has not been performed. The processing unit 100 repeats the processing of S103 and after again.

On the other hand, while the predetermined time has not elapsed from S105 (S109: No), the processing unit 100 repeats processing of S107 and after again.

In S107, when the evaluation action by the user who has performed the pointing action is detected (S107: Yes), the evaluation action detection unit 104 calculates the evaluation point corresponding to the evaluation action using the input information acquired when the evaluation action is detected and the predetermined definition table (S111).

Thereafter, the evaluation action detection unit 104 stores, in the temporary storage area 128, the detection result of the evaluation action that includes the evaluation point calculated in S111 and the time when the evaluation action is detected (S113).

Here, the processing flow after S113 will be described with reference to FIG. 21. As illustrated in FIG. 21, after S113, the pointing action detection unit 102 determines whether or not there is a pointing action on another object based on, for example, the input information acquired by the input unit 120 in real time (S121). When the pointing action to another object is detected (S121: Yes), the processing unit 100 regards that the evaluation action on the target object of the pointing action detected in the latest S105 has not been performed or has been completed. The processing unit 100 performs processing of S127 described below.

On the other hand, while the pointing action on another object is not detected (S121: No), first, the evaluation action detection unit 104 determines whether additional evaluation actions by the same user is detected based on, for example, the input information acquired in real time by the input unit 120 (S123). When the additional evaluation action is detected (S123: Yes), the processing unit 100 repeats processing of S111 and after again.

On the other hand, when no extra evaluation action is detected (S123: No), the processing unit 100 determines whether or not a predetermined time has elapsed from the time when the latest evaluation action is detected (S125). When the predetermined time has not elapsed from the time when the latest evaluation action is detected (S125: No), the processing unit 100 repeats processing of S121 and after again.

On the other hand, if the predetermined time has elapsed from the time when the latest evaluation action is detected (S125: Yes), the processing unit 100 regards that the evaluation action on the target object of the pointing action detected in the latest S105 is completed.

Subsequently, the update unit 106 acquires, from the temporary storage area 128, all information stored in the temporary storage area 128 (S127).

Subsequently, the update unit 106 aggregates the evaluation points of each object stored in the temporary storage area 128 by applying, for example, a predetermined function to all the information acquired in S127 (S129). Note that, as described above, the predetermined function may simply aggregate the evaluation points for each object. Alternatively, the predetermined function may be another function as described below in "3-1. First Application Example" to "3-3. Third Application Example", for example.

Subsequently, the update unit 106 adds the result aggregated in S129 to the evaluation information DB 130 (S131).

Thereafter, the display control unit 108 displays, on the output unit 124, a display indicating the evaluation information of each object stored in the updated evaluation information DB 130 in S131 in association with the object. Note that, when the display indicating the evaluation information of each object is already output by the output unit 124, the display control unit 108 updates a display mode of the display indicating the evaluation information of each object according to the processed result of S131 (S133). Thereafter, the processing unit 100 repeats processing of S101 and after again.

2.4 Effect

2-4-1. First Effect

As described above, the processing unit 100 according to the present embodiment detects a pointing action for a certain user in a real space to specify a certain object and an evaluation action on the object by the user based on a signal output from one or more sensors that are included in the input unit 120, and updates evaluation information of the corresponding object specified by a detection result of the pointing action based on a detection result of the evaluation action. As a result, an evaluation action on a certain object by a certain user in a real space can be appropriately aggregated.

For example, when a plurality of users in a real space performs communication, for example, in a class, a meeting, or the like, the information processing system 10 allows each user to aggregate evaluation points corresponding to evaluation actions unconsciously performed on each of one or more objects in the real space by associating the evaluation points with the objects. For this reason, each evaluation action performed during communication can be appropriately recorded, and the amount of stored data can be suppressed. Further, for example, after the communication, the plurality of users can easily look back on contents of the communication by referring to registered contents of the evaluation information DB 130.

2-4-2. Second Effect

Generally, a person (for example, teacher or the like) needs to qualitatively evaluate indexes such as contribution to brainstorming and active participation in active learning, and therefore, it is very difficult to automatically evaluate the indexes. On the other hand, according to the present embodiment, it is possible to appropriately specify evaluation values corresponding to one or more evaluation actions detected in the real space. Further, the specified result (that is, evaluation information of each object) can be automatically provided, for example, to a teacher or the like as a hint (reference information) of the above indexes. Therefore, it becomes possible for a person to more easily evaluate the above indexes. For example, a teacher can evaluate the indexes by referring to the evaluation information of each object without being at a site in real time or evaluate the indexes in a shorter time.

3. Application Example

The present embodiment is not limited to the above-described example, and various application examples are applicable. Next, application examples of the present embodiment will be described in "3-1. First Application Example" to "3-6. Sixth Application Example". Note that each component included in the information processing system 10 according to each application example is the same as the example illustrated in FIG. 5. Hereinafter, only components having functions different from those of the above-described embodiment will be described, and description of the same contents will be omitted.

3-1. First Application Example

First, a first application example according to the present embodiment will be described. According to the first application example, for example, even when one user continuously performs the evaluation action, it is possible to suppress evaluation points of each object from being largely biased.

3-1-1. Update Unit 106

When an evaluation action on one object by a certain user is detected plural times within a predetermined time, the update unit 106 according to the first application example adds a value obtained by reducing the total of the evaluation values corresponding to each of the evaluation actions detected plural times based on the predetermined criterion to the evaluation information of the object to update the registered contents of the evaluation information DB 130. For example, the update unit 106 may add an average value of the total of the evaluation values corresponding to each of the evaluation actions detected plural times to the evaluation information of the object to update the registered contents of the evaluation information DB 130. Alternatively, the update unit 106 may add, to the evaluation information of the object, a result obtained by applying a predetermined logarithmic function to a square root of the total of the evaluation values corresponding to each of the evaluation actions detected plural times (instead of the average value) or the total of the evaluation value.

3-1-2. Specific Example

Figure 22A:
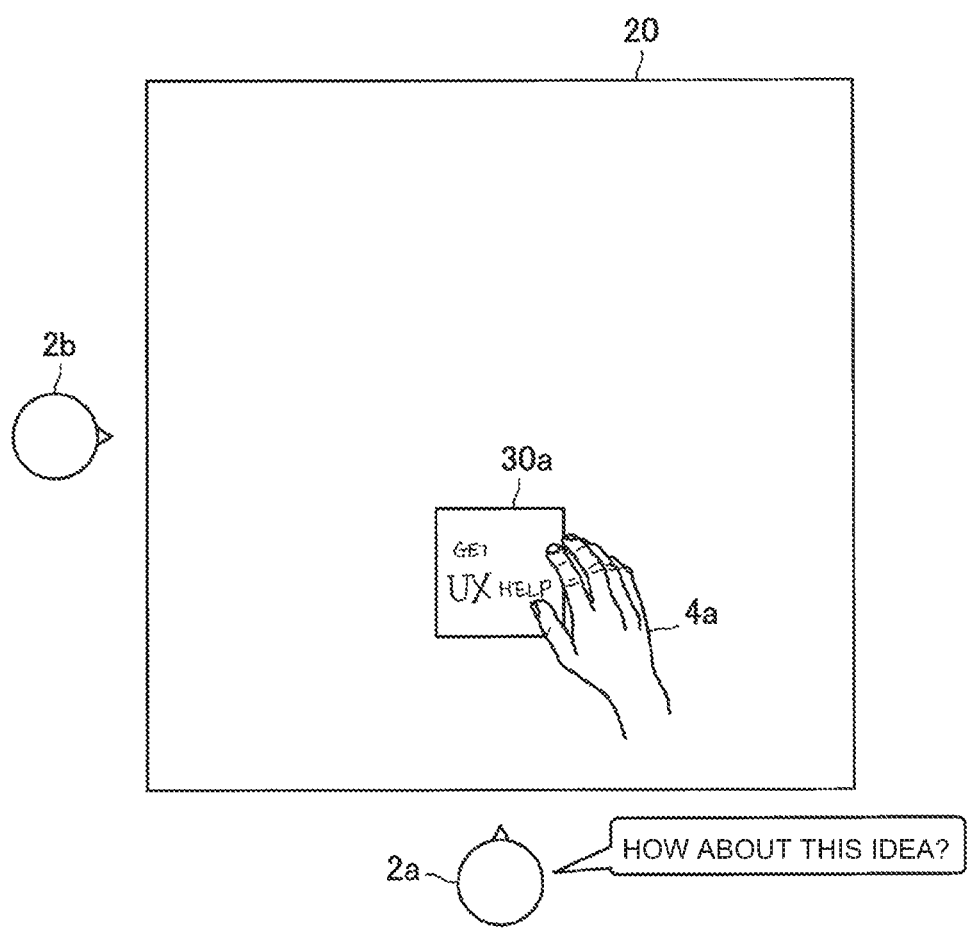
FIG. 22A is a diagram illustrating a part of a specific example according to a first application example of the present embodiment.

Next, a specific example of the first application example will be described with reference to FIGS. 22A, 22B, 22C, 22D, 22E, and 22F. Here, as illustrated in FIG. 22A, a scene where two users 2 are located around the screen 20 and a discussion such as brainstorming is being performed is assumed. Note that, in the examples illustrated in FIGS. 22A, 22B, 22C, 22D, 22E, and 22F, it is assumed that no evaluation information is stored in the evaluation information DB 130 in the initial state.

As illustrated in FIG. 22A, first, it is assumed that the user 2a utters "how about this idea?" while arranging the tag 30a on the screen 20. In this case, the pointing action detection unit 102 detects the utterance as the pointing action for specifying the tag 30a by the user 2a (substantially similarly to the example illustrated in FIG. 19A).

Thereafter, it is assumed that as illustrated in FIG. 22B, the same user 2a utters "I think it is good" within a predetermined time from the timing illustrated in FIG. 22A. In this case, the evaluation action detection unit 104 first specifies the utterance as the evaluation action on the target object of the detected pointing action based on a predetermined utterance definition table and the word (evaluative adjective) "good" included in the speech recognition result of the utterance. Next, the evaluation action detection unit 104 specifies the evaluation point corresponding to the utterance as "+10 points" based on a predetermined utterance definition table. Then, as illustrated in FIG. 22C, the evaluation action detection unit 104 stores the specified result (evaluation information) in the temporary storage area 128.

Figures 22D, 22E:
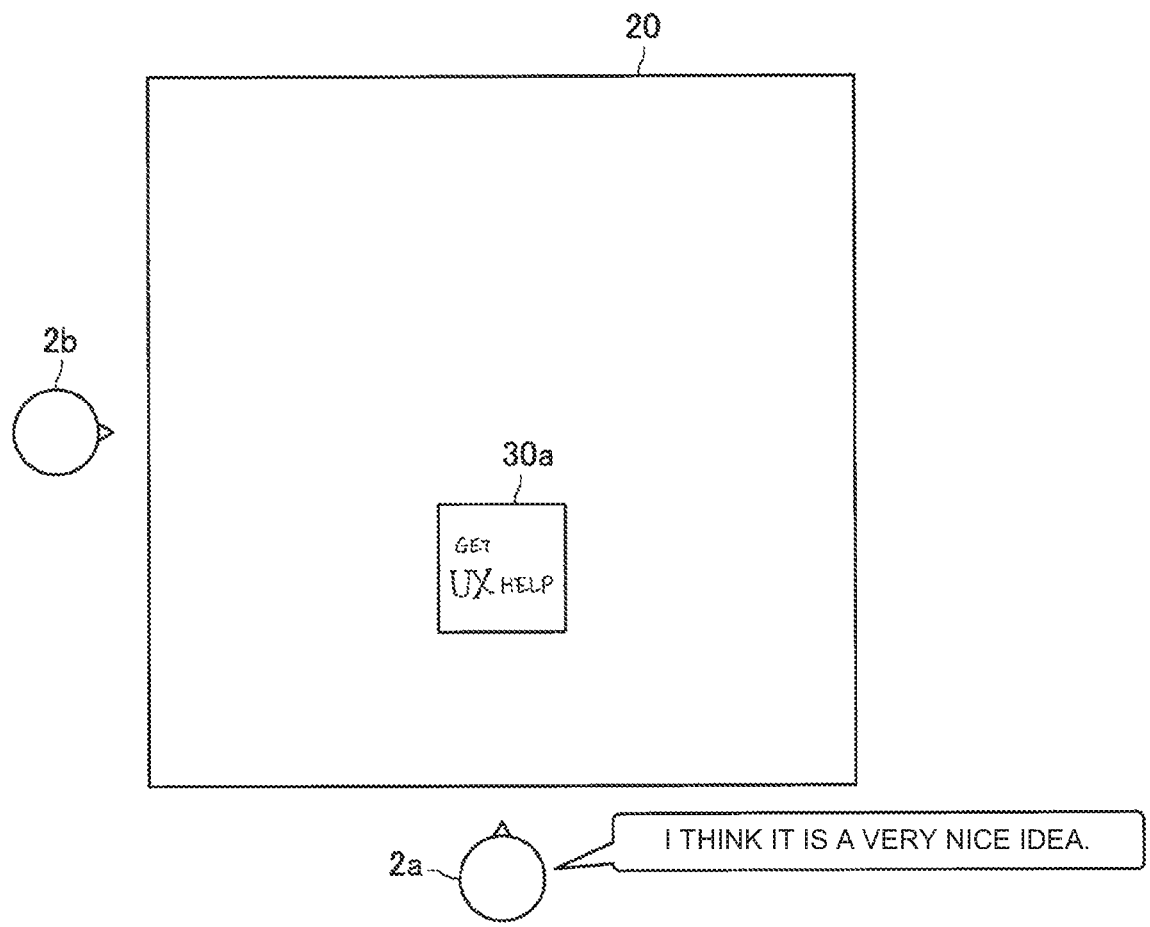
FIG. 22D is a diagram illustrating a part of the specific example according to the first application example of the present embodiment.
FIG. 22E is a diagram illustrating a part of the specific example according to the first application example of the present embodiment.
Figure 22F:
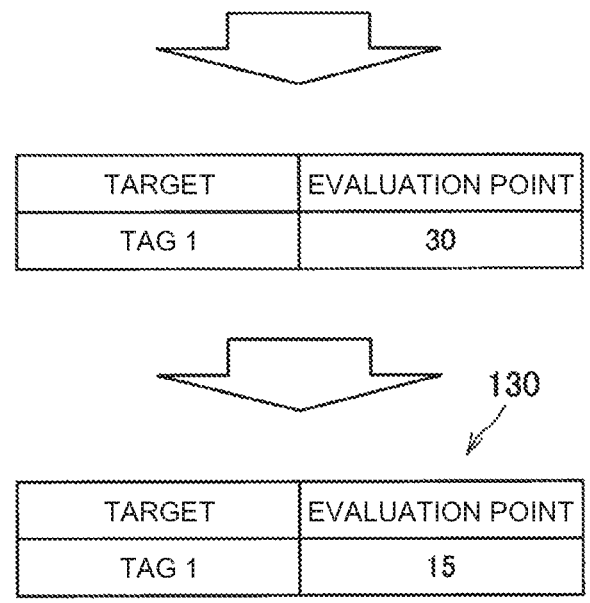
FIG. 22F is a diagram illustrating a part of the specific example according to the first application example of the present embodiment.

Thereafter, it is assumed that as illustrated in FIG. 22D, the same user 2a further utters "I think it is a very nice idea" within the predetermined time from the timing illustrated in FIG. 22A. In this case, the evaluation action detection unit 104 first specifies the utterance as the evaluation action on the object based on a predetermined utterance definition table and the word (evaluative adjective) "nice" included in the speech recognition result of the utterance. Next, the evaluation action detection unit 104 specifies the evaluation point corresponding to the utterance as "+20 points" based on a predetermined utterance definition table, the word ("+10 points") "nice", and an adverb ("×2.0") indicating a degree such as "very". Then, as shown by the dashed rounded rectangle in FIG. 22E, the evaluation action detection unit 104 adds the specified result (evaluation information) to the temporary storage area 128.

Thereafter, it is assumed that the predetermined time has elapsed from the timing illustrated in FIG. 22A. In this case, as illustrated in the upper diagram in FIG. 22F, the update unit 106 first aggregates the evaluation points of each object stored in the temporary storage area 128 for each object. In the example illustrated in FIG. 22F, the update unit 106 calculates the total of the evaluation points of the tag 30a ("tag 1") as "+30 points". Next, the update unit 106 determines the average value of the total of the evaluation points of the tag 30a as the evaluation point of the tag 30a within the predetermined time. Then, as illustrated in the lower diagram of FIG. 22F, the update unit 106 adds the determined evaluation point of the tag 30a to the evaluation information DB 130.

3-1-3. Effect

As described above, according to the first application example, when one user continuously evaluates the same object in a shorter time, the total of the evaluation results continuously evaluated is reduced based on predetermined criteria. Thereby, even when a specific user continuously performs the evaluation action, it is possible to suppress the evaluation points of each object from being largely biased.

3-2. Second Application Example

The first application example has been described above. Next, a second application example according to the present embodiment will be described. According to the second application example, for example, even when one user excessively evaluates a specific object, it is possible to suppress the evaluation points of each object from being largely biased.

Note that, in the second application example, in the scene where one user continuously performs utterances that can be recognized as an evaluation action one or more times, the situation where an interval between each utterance of the user is longer than in the first application example is assumed.

3-2-1. Update Unit 106

When an evaluation action on a specific object by a certain user is detected one or more times, the update unit 106 according to the second application example updates the registered contents of the evaluation information DB 130 by adding the total of the evaluation values corresponding to each of the evaluation actions detected one or more times and a value according to comparison with predetermined upper limit to the evaluation information of the object. For example, when the total of the evaluation values corresponding to each of the evaluation actions detected one or more times is greater than the predetermined upper limit, the update unit 106 adds the predetermined upper limit to the evaluation information of the object to update the registered contents of the evaluation information DB 130. Note that, when the total of the evaluation values corresponding to each of the evaluation actions detected one or more times is the predetermined lower limit or lower, the update unit 106 adds the total of the evaluation values to the evaluation information of the object to update the registered contents of the evaluation information DB 130.

Here, the predetermined upper limit may be, for example, an upper limit of an evaluation value for one object by one user in one discussion. As a modified example, the predetermined upper limit may be, for example, upper limits of evaluation values for each object by all users in one discussion, or upper limits of evaluation values for each object of each group composed of a plurality of users.

3-2-2. Specific Example

Next, a specific example of the second application example will be described with reference to FIGS. 23A, 23B, 23C, 23D, 23E, 23F, and 23G. Note that the initial state of this specific example can be similar to the initial state of the specific example of the first application example illustrated in FIG. 22A.

Figure 23A:
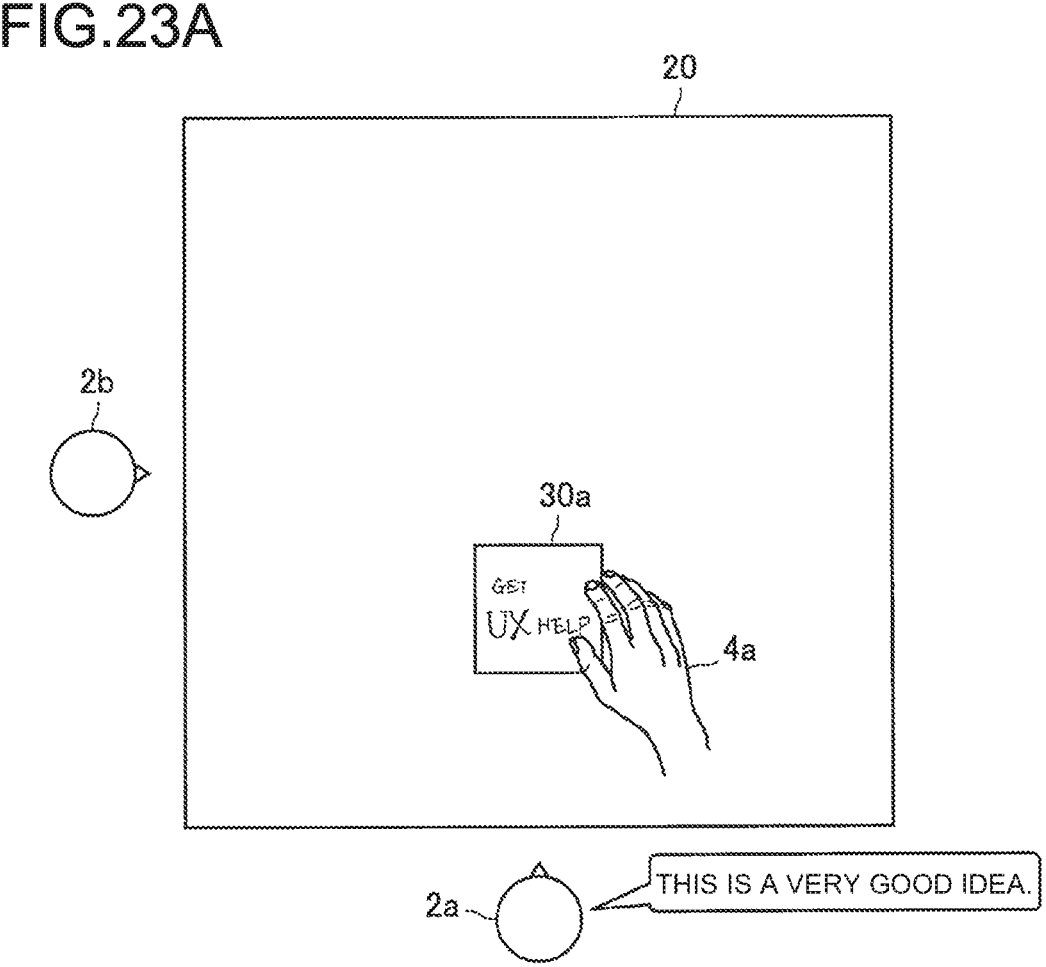
FIG. 23A is a diagram illustrating a part of a specific example according to a second application example of the present embodiment.

As illustrated in FIG. 23A, first, it is assumed that the user 2a utters "This is a really good idea" while arranging the tag 30a on the screen 20.

In this case, the pointing action detection unit 102 detects the utterance as the pointing action for specifying the tag 30a by the user 2a (similarly to the example illustrated in FIG. 22A). Further, the evaluation action detection unit 104 first specifies the utterance as the evaluation action on the target object of the detected pointing action based on a predetermined utterance definition table and the word (evaluative adjective) "good" included in the speech recognition result of the utterance. Next, the evaluation action detection unit 104 specifies the evaluation point corresponding to the utterance "+20 points" based on a predetermined utterance definition table, the word ("+10 points") "good", and an adverb ("×2.0") indicating a degree such as "very".

Figures 23B, 23C:
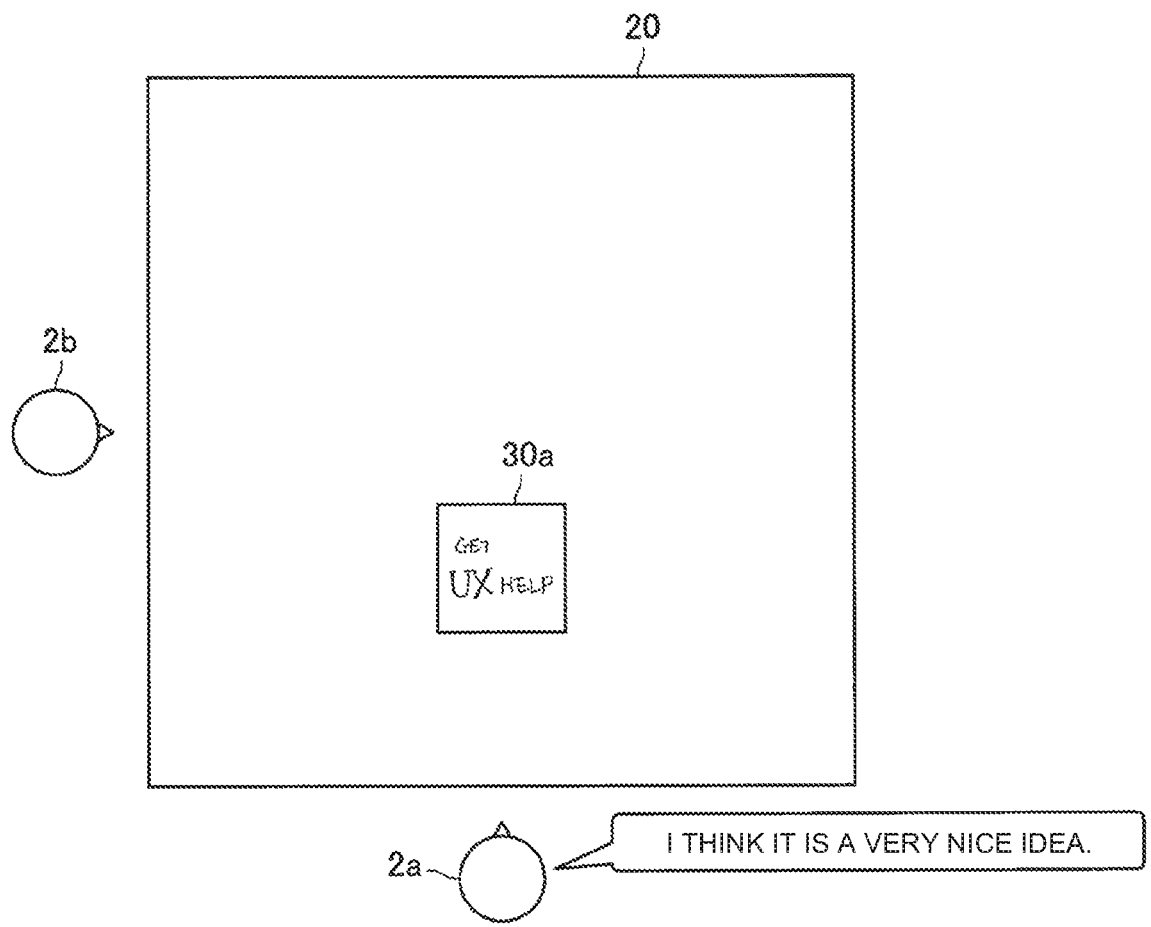
FIG. 23B is a diagram illustrating a part of the specific example according to the second application example of the present embodiment.
FIG. 23C is a diagram illustrating a part of the specific example according to the second application example of the present embodiment.
Figure 23D:
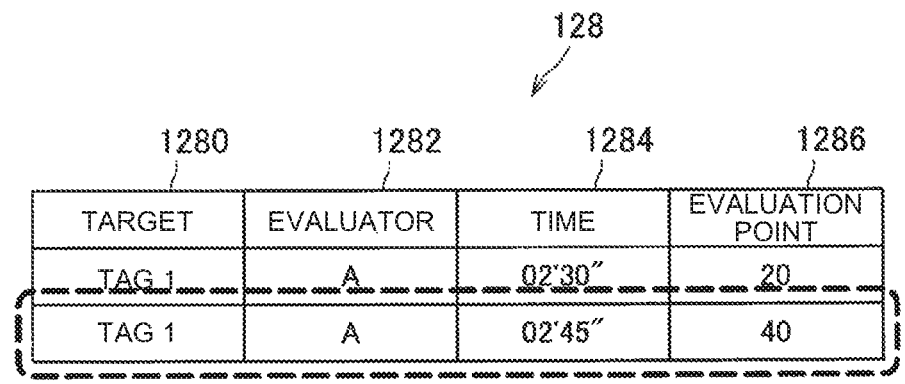
FIG. 23D is a diagram illustrating a part of the specific example according to the second application example of the present embodiment.

Then, as illustrated in FIG. 23B, the evaluation action detection unit 104 stores the specified result (evaluation information) in the temporary storage area 128.

Thereafter, as illustrated in FIG. 23C, it is assumed that the same user 2a utters "I think it is a very nice idea" loudly.

In this case, the evaluation action detection unit 104 first specifies the utterance as the evaluation action on the object based on a predetermined utterance definition table and the word (evaluative adjective) "nice" included in the speech recognition result of the utterance. Next, the evaluation action detection unit 104 specifies the evaluation point corresponding to the utterance as "+40 points" based on a predetermined utterance definition table, the word ("+10 points") "nice", an adverb ("×2.0") indicating a degree such as "very", and the utterance's volume "being loud (than normal volume)" ("×2.0"). Then, as shown by the dashed rounded rectangle in FIG. 23D, the evaluation action detection unit 104 adds the specified result (evaluation information) to the temporary storage area 128.

Figure 23E:
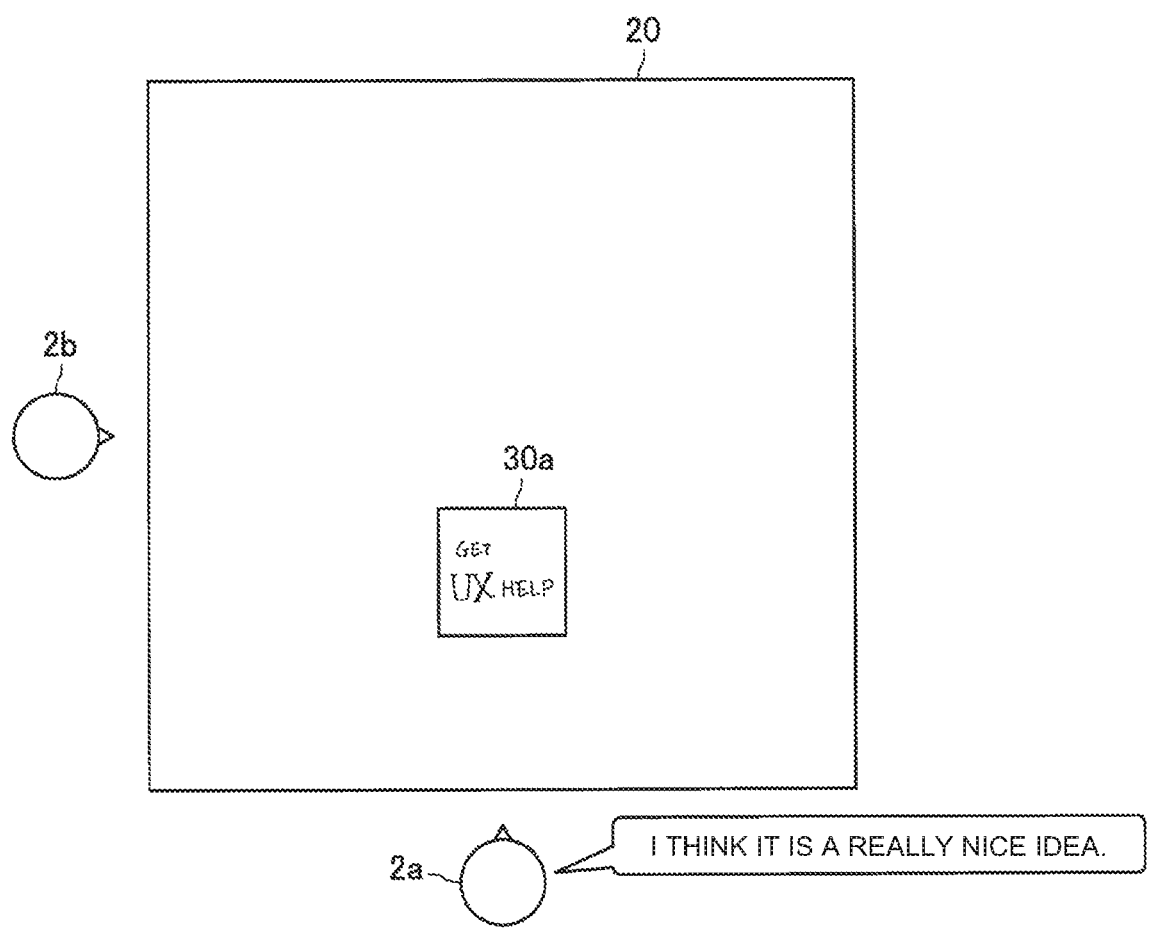
FIG. 23E is a diagram illustrating a part of the specific example according to the second application example of the present embodiment.

Thereafter, as illustrated in FIG. 23E, it is assumed that the same user 2a further utters "I think it is a really nice idea". In this case, the evaluation action detection unit 104 first specifies the utterance as the evaluation action based on a predetermined utterance definition table and the word (evaluative adjective) "nice" included in the speech recognition result of the utterance. Next, the evaluation action detection unit 104 specifies the evaluation point corresponding to the utterance as "+40 points" based on a predetermined utterance definition table, the word ("+10 points") "nice", an adverb ("×2.0") indicating the degree such as "really", and an adverb ("×2.0") indicating a degree such as "great". Then, as shown by the dashed rounded rectangle in FIG. 23F, the evaluation action detection unit 104 adds the specified result (evaluation information) to the temporary storage area 128.

Thereafter, it is assumed that the previous agenda between two users 2 has ended, such as the two users 2 starting a conversation on another agenda. In this case, as illustrated in the upper diagram in FIG. 23G, the update unit 106 first aggregates the evaluation points of each object stored in the temporary storage area 128 for each user and each object. In the example illustrated in FIG. 23G, the update unit 106 calculates the total of the evaluation points of the tag 30a ("tag 1") of the user 2a as "+100 points". This total point exceeds the above predetermined upper limit ("+50 points" in the example illustrated in FIG. 23G). Therefore, the update unit 106 determines the final evaluation point for the tag 30a of the user 2a as the upper limit. Then, as illustrated in the lower diagram of FIG. 23G, the update unit 106 adds the determined evaluation point of the tag 30a to the evaluation information DB 130.

3-2-3. Effect

As described above, in the second application example, for example, the upper limit of the evaluation value for one object by one user in one discussion is set. As a result, for example, even when one user excessively evaluates a specific object, it is possible to suppress the evaluation points of each object from being largely biased.

3-3. Third Application Example

The second application example has been described above. Next, a third application example according to the present embodiment will be described. According to the third application example, even when different users perform the same evaluation action, the evaluation point corresponding to the evaluation action can be different for each user.

3-3-1. Update Unit 106

The update unit 106 according to the third application example determines an evaluation value corresponding to an evaluation action on a certain object by each user according to the attribute information of the user. For example, in the information processing system 10, different coefficients are previously set for the attribute information of each user. In this case, the update unit 106 determines an evaluation value corresponding to an evaluation action on a certain object by each user using a coefficient corresponding to the attribute information of the user.

3-3-2. Specific Example

Next, a specific example of the third application example will be described with reference to FIGS. 24A, 24B, 24C, 24D, 24E, 24F, and 24G. Note that the initial state of this specific example can be similar to the initial state of the specific example of the first application example illustrated in FIG. 22A. In this specific example, it is assumed that "×1.0" is set as a coefficient corresponding to the user 2a who is a general participant, and "×5.0" is set as a coefficient corresponding to the user 2b who is an expert.

Figures 24A, 24B:
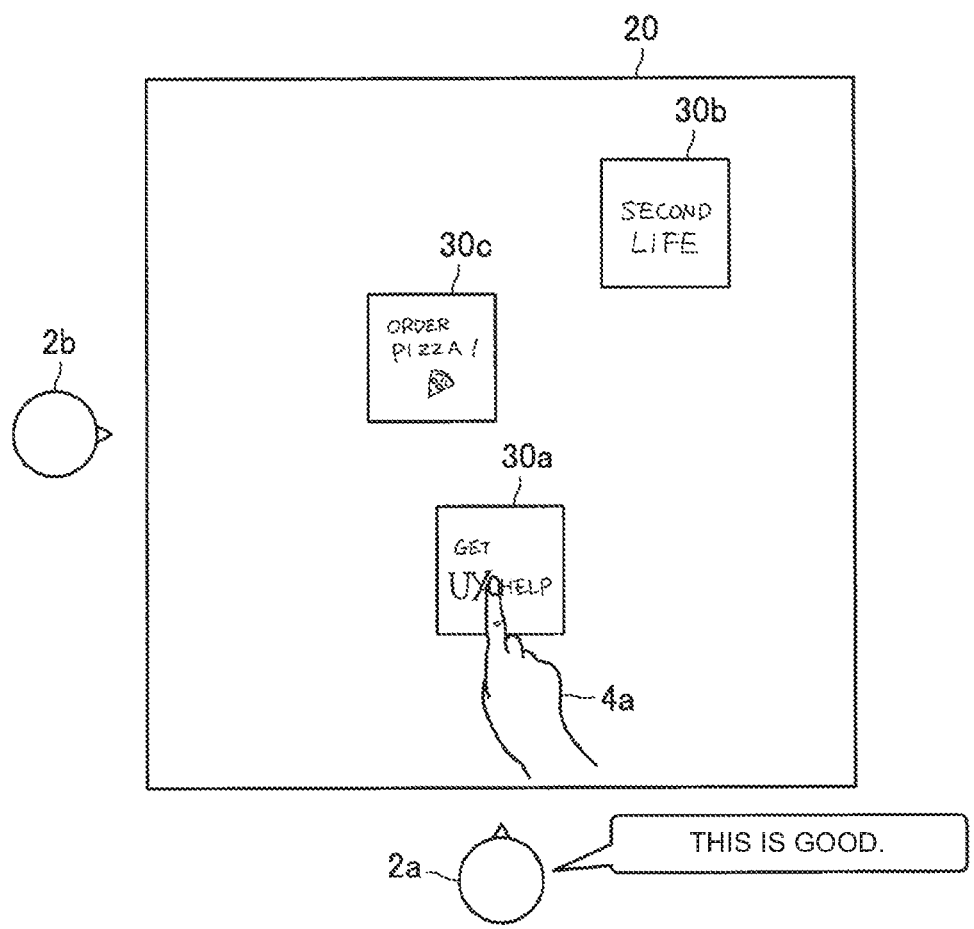
FIG. 24A is a diagram illustrating a part of a specific example according to a third application example of the present embodiment.
FIG. 24B is a diagram illustrating a part of the specific example according to the third application example of the present embodiment.

As illustrated in FIG. 24A, first, it is assumed that the user 2a utters "That's good" while pointing to the tag 30a.

In this case, the pointing action detection unit 102 detects the utterance as the pointing action for specifying the tag 30a by the user 2a (similarly to the example illustrated in FIG. 22A). Further, the evaluation action detection unit 104 first specifies the utterance as the evaluation action on the target object of the detected pointing action based on the word (evaluative adjective) "good" included in the speech recognition result of the utterance. Next, the evaluation action detection unit 104 specifies the evaluation point corresponding to the utterance as "+10 points" based on the word ("+10 points") "good". Then, as illustrated in FIG. 24B, the evaluation action detection unit 104 adds the specified result (evaluation information) to the temporary storage area 128.

Figures 24C, 24D:
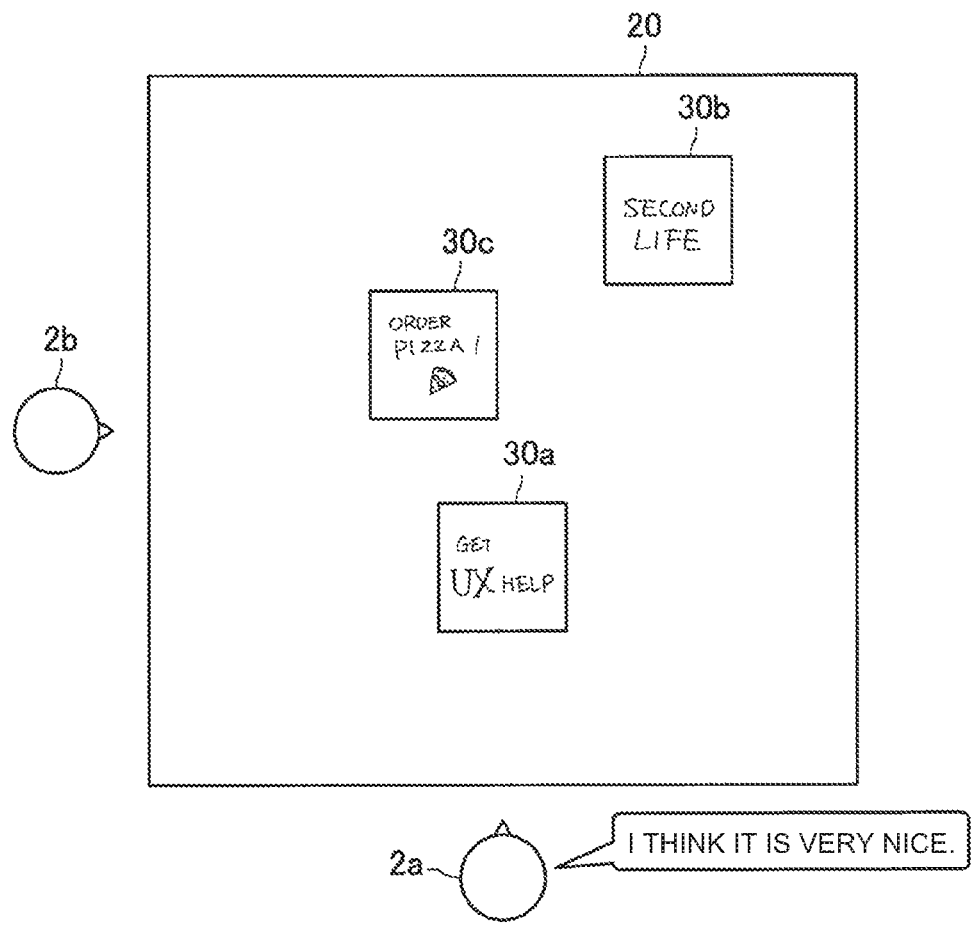
FIG. 24C is a diagram illustrating a part of the specific example according to the third application example of the present embodiment.
FIG. 24D is a diagram illustrating a part of the specific example according to the third application example of the present embodiment.

Thereafter, as illustrated in FIG. 24C, for example, it is assumed that the same user 2a utters "I think it is really good" within a predetermined time from the timing illustrated in FIG. 24A.

In this case, the evaluation action detection unit 104 first specifies the utterance as the evaluation action on the object based on the word (evaluative adjective) "good" included in the speech recognition result of the utterance. Next, the evaluation action detection unit 104 specifies the evaluation point corresponding to the utterance as "+20 points" based on the word ("+10 points") "good", and an adverb ("×2.0") indicating a degree such as "very". Then, as shown by the dashed rounded rectangle in FIG. 24D, the evaluation action detection unit 104 adds the specified result (evaluation information) to the temporary storage area 128.

Figures 24E, 24F:
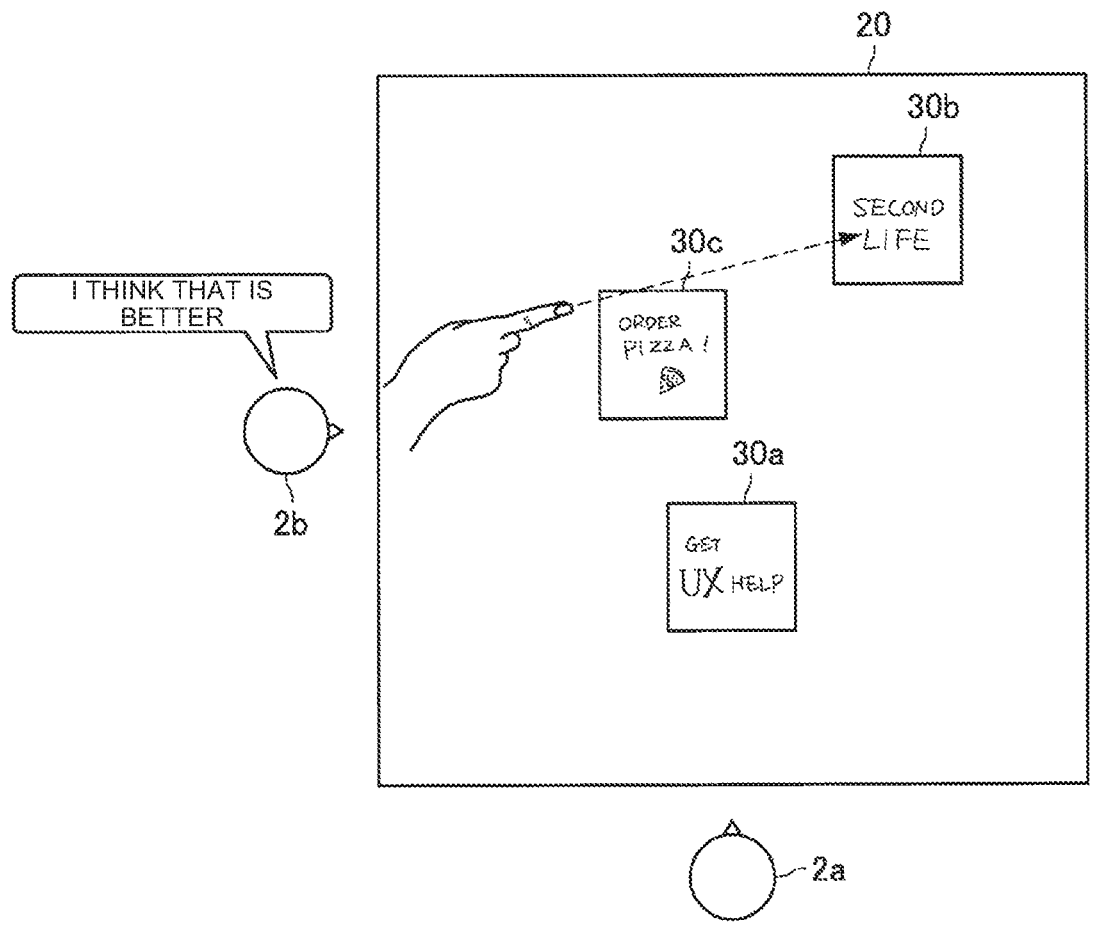
FIG. 24E is a diagram illustrating a part of the specific example according to the third application example of the present embodiment.
FIG. 24F is a diagram illustrating a part of the specific example according to the third application example of the present embodiment.

Thereafter, as illustrated in FIG. 24E, for example, it is assumed that the user 2b utters "I think that is better" while pointing to the tag 30b within a predetermined time from the timing illustrated in FIG. 24A. In this case, the pointing action detection unit 102 detects the utterance as the pointing action for the user 2b to specify the tag 30b. Further, the evaluation action detection unit 104 first specifies the utterance as the evaluation action based on the word (evaluative adjective) "good" included in the speech recognition result of the utterance. Next, the evaluation action detection unit 104 specifies the evaluation point corresponding to the utterance as "+10 points" based on the word ("+10 points") "good". Then, as shown by the dashed rounded rectangle in FIG. 24F, the evaluation action detection unit 104 adds the specified result (evaluation information) to the temporary storage area 128.

Thereafter, it is assumed that the predetermined time has elapsed from the timing illustrated in FIG. 24A, for example. In this case, as illustrated in the upper diagram in FIG. 24G, the update unit 106 first aggregates the evaluation points of each object stored in the temporary storage area 128 for each object. In the example illustrated in FIG. 24G, the update unit 106 calculates the total of the evaluation points of the tag 30a ("tag 1") as "+30 points", and calculates the total of the evaluation points of the tag 30b ("tag 2") as "+10 points".

Next, for each object, the update unit 106 determines each of the final evaluation points of the objects by multiplying the total of the evaluation points corresponding to the object by a coefficient corresponding to a user who has evaluated the object. Specifically, the update unit 106 first multiplies the total of the evaluation points corresponding to the tag 30a by a coefficient corresponding to the user 2a who has evaluated the tag 30a, thereby determining the final evaluation point of the tag 30a as "+30 points" (="+30 points"× "1.0"). Further, the update unit 106 multiplies the total of the evaluation points corresponding to the tag 30b by the coefficient corresponding to the user 2b who has evaluated the tag 30b, thereby determining the final evaluation point of the tag 30b as "+50 points" (="+10 points"×"5.0").

Then, as illustrated in the lower diagram of FIG. 24G, the update unit 106 adds the evaluation points of these two tags 30 to the evaluation information DB 130.

3-3-3. Effect

As described above, according to the third application example, even when different users perform the same evaluation action, the evaluation point corresponding to the evaluation action can be different for each user. For this reason, for example, it is possible to automatically perform the aggregation such that one comment made by an expert has a higher importance than a plurality of comments made by a general user.

3-4. Fourth Application Example

The third application example has been described above. Next, a fourth application example according to the present embodiment will be described. According to the fourth application example, each object can be appropriately classified and displayed according to the evaluation information of each object stored in the evaluation information DB 130.

In the information processing system 10 according to the fourth application example, it is assumed that a normal mode that detects the pointing actions of each user or the evaluation actions of each user, and a classification mode that automatically classifies each object stored in the evaluation information DB 130 and displays a classification result on a predetermined display surface (for example, another screen 40 or the like) are defined. Then, one or more users in the real space can switch the running mode between the normal mode and the classification mode by using a predetermined operation (for example, a predetermined operation on the input device 160 that can be included in the input unit 120, a predetermined gesture operation, a predetermined voice command, a predetermined line-of-sight operation, or the like). Alternatively, the processing unit 100 may switch the running mode between the normal mode and the classification mode based on predetermined conditions (for example, detection of starting or ending of a discussion between a plurality of users in the real space, passage of a predetermined time from the start of the discussion between the plurality of users, or the like). Here, the normal mode is an example of a first mode according to the present disclosure. In addition, the classification mode is an example of a second mode according to the present disclosure.

3-4-1. Evaluation Action Detection Unit 104

When the evaluation action of the user is detected, the evaluation action detection unit 104 according to the fourth application example can specify not only the evaluation points related to the target object (for example, the target object of the just before detected pointing action, and the like) of the evaluation action, but also auxiliary information of the object based on the detection result of the evaluation action. For example, when the speech recognition result of the detected utterance of the user includes words such as "good" and "bad", the evaluation action detection unit 104 specifies the evaluation point corresponding to the utterance based on these words (similar to the above-described embodiment) and the predetermined utterance definition table. Further, when the speech recognition result of the utterance includes words such as "high" and "cheap", the evaluation action detection unit 104 can specify information indicated by these words as auxiliary information of an object related to a price. Further, when the speech recognition result of the utterance includes words such as "Japanese style", "American style", and "German style", the evaluation action detection unit 104 converts the information indicated by these words into auxiliary information of an object related to a region. For example, when the speech recognition result includes the word "Japanese style", the evaluation action detection unit 104 specifies auxiliary information indicating that an area (for example, country) corresponding to the object is "Japan".

Further, the evaluation action detection unit 104 can specify the identification information of the object, the specified evaluation point, and the specified auxiliary information of the object as the evaluation information corresponding to the evaluation action.

3-4-2. Display Control Unit 108

3-4-2-1. Addition of Image

The display control unit 108 according to the fourth application example can display, on the object, an image (such as a mark) corresponding to the evaluation information of each object stored in the evaluation information DB 130. For example, like the tag 30*b* (object 30*b*) illustrated in FIG. 25, the display control unit 108 displays one or more heart marks 300 in the tag 30*b* according to the size of the evaluation point corresponding to the evaluation information of the tag 30. As an example, the display control unit 108 displays a larger number of heart marks 300 in the tag 30*b* as the evaluation point corresponding to the evaluation information of the tag 30 is larger. As a modified example, when not only the target 1300 and the evaluation point 1302 but also the evaluator 1306 are associated in the evaluation information DB 130 (as described above), the display control unit 108 may use image having different types or colors for each evaluator as an image corresponding to the evaluation information of each object stored in the evaluation information DB 130.

Figure 25:
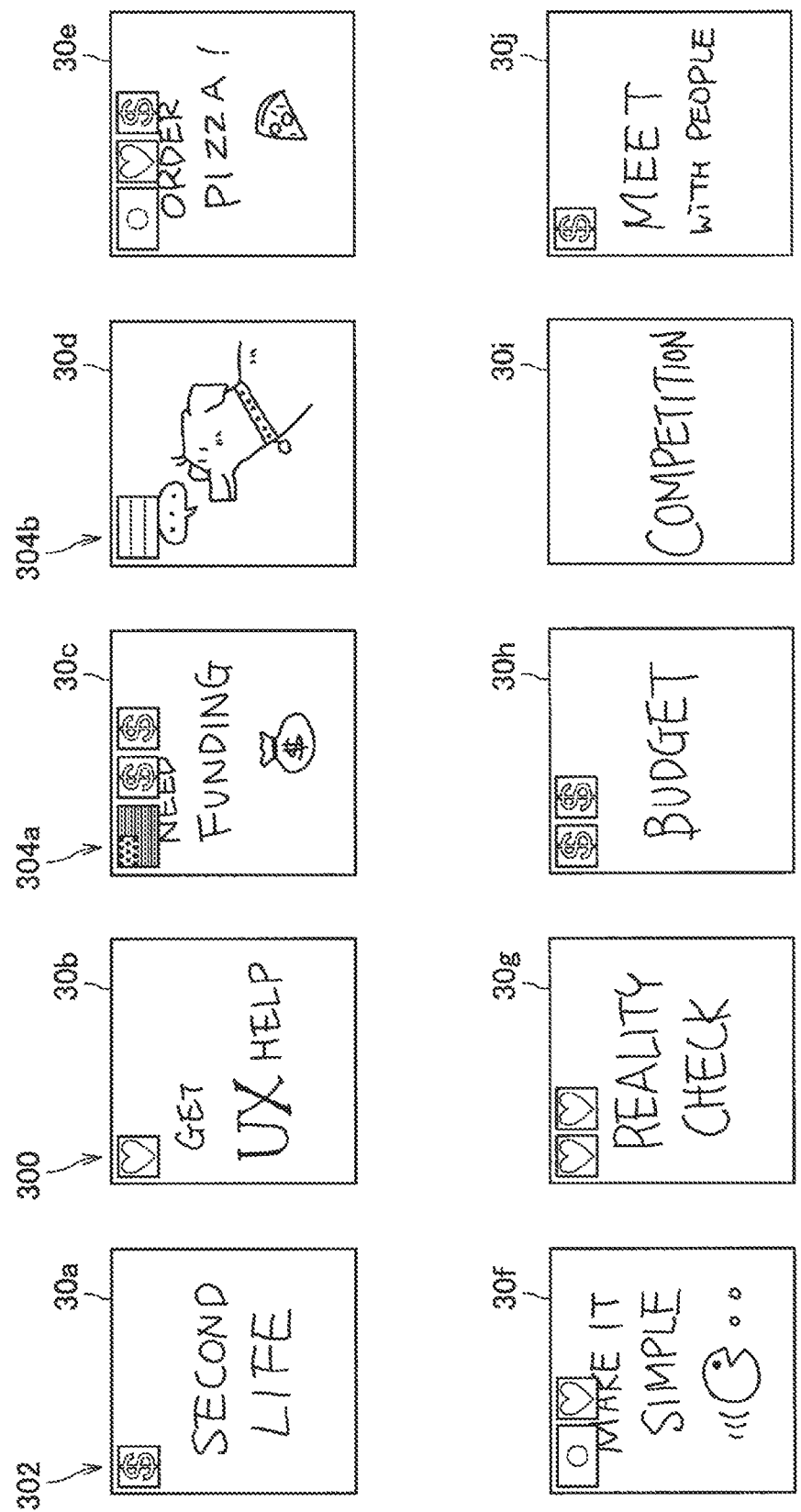
FIG. 25 is a diagram illustrating an example in which an image corresponding to evaluation information of each tag 30 is displayed in each tag 30 according to a fourth application example of the present embodiment.

Further, when the auxiliary information related to the price is included in the evaluation information of the tag 30, as in the tag 30*a* illustrated in FIG. 25, the display control unit 108 displays one or more dollar marks 302 in the tag 30 according to a price indicated by the auxiliary information. For example, the display control unit 108 may display a larger number of dollar marks 302 in the tag 30 as the price indicated by the auxiliary information related to the price included in the evaluation information of the tag 30 increases.

Further, when the auxiliary information related to the area is included in the evaluation information of the tag 30, as in the tag 30*c*, the tag 30*d*, or the like illustrated in FIG. 25, the display control unit 108 displays, in the tag 30, a national flag mark 304 indicating a country corresponding to an area indicated by the auxiliary information.

3-4-2-2. Classification Display

Further, the display control unit 108 controls the display corresponding to each of the plurality of objects located on the screen 20, for example, based on the fact that the running mode is changed from the normal mode to the classification mode. For example, when the running mode is changed from the normal mode to the classification mode, for each of the plurality of objects located on the screen 20, the display control unit 108 can display an image corresponding to the object at a location corresponding to the evaluation information of the object on another screen 40. Alternatively, in this case, the display control unit 108 may change display locations of each of the plurality of objects (display objects) displayed on the screen 20 to display locations corresponding to the evaluation information of the objects on the screen 20.

For example, in another screen 40 and/or screen 20, at least two types of axes having different directions may be defined. Then, the at least two types of axes, the evaluation points of the objects (which can be included in the evaluation information of each object), and various types of auxiliary information related to the objects can be associated in advance. In this case, when the mode being run is changed from the normal mode to the classification mode, for each of the at least two types of axes defined on another screen 40 (or the screen 20), the display control unit 108 first arranges each of the plurality of objects on coordinates (display locations) corresponding to values indicated by the evaluation points of the objects or one or more pieces of auxiliary information of the objects which correspond to the axes. Then, the display control unit 108 may display each of the plurality of objects on another screen 40 (or the screen 20).

First Display Example

Figure 26:
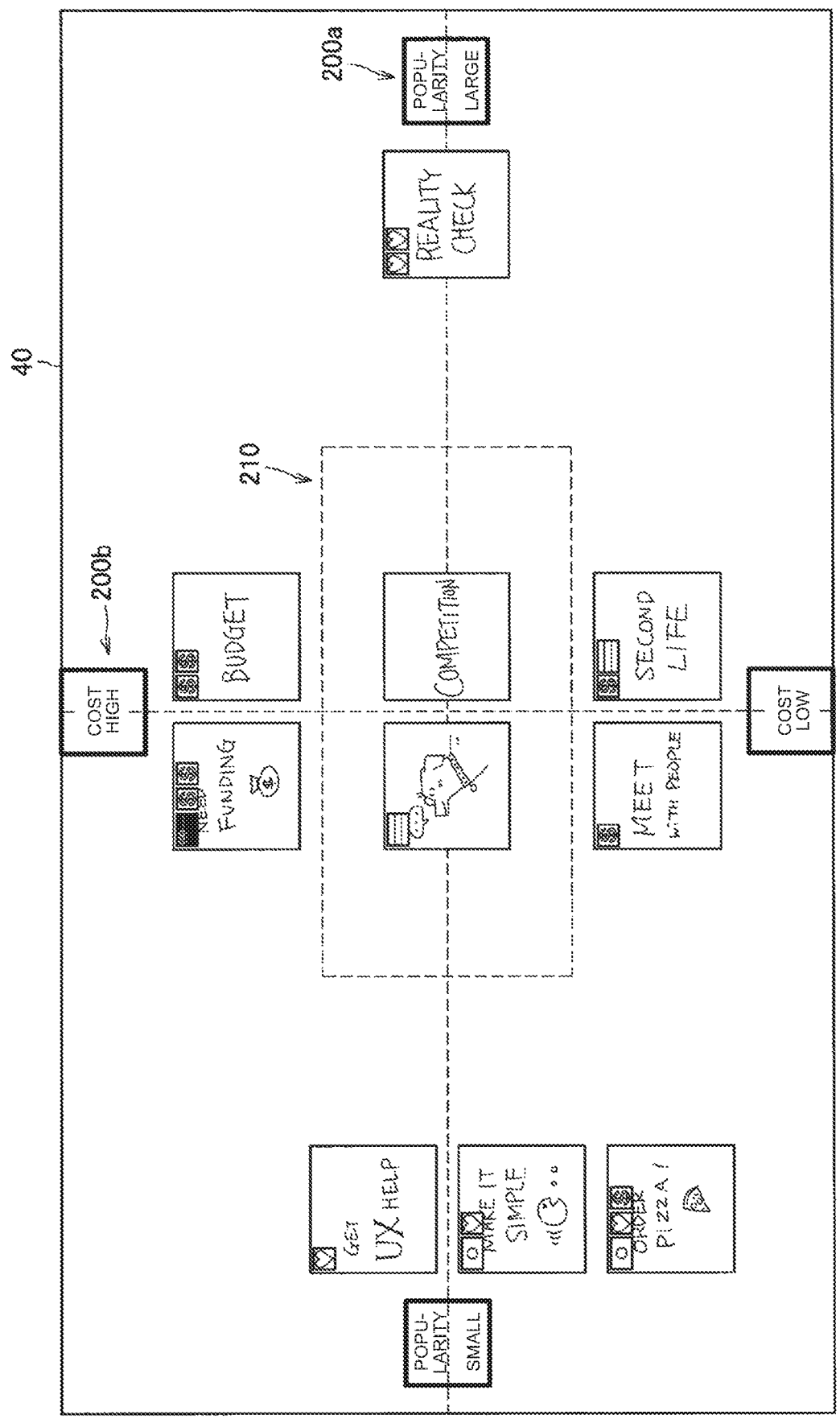
FIG. 26 is a diagram illustrating an example in which a plurality of tags 30 are classified and displayed on a screen 40 based on two axes defined on the screen 40 according to the fourth application example.

Here, the above functions will be described in more detail with reference to FIGS. 26 to 28. FIG. 26 is a diagram illustrating an example in which the plurality of tags 30 illustrated in FIG. 25 are classified and displayed on the screen 40 based on two axes defined on the screen 40. FIG. 26 shows an example in which "popularity" is set on a horizontal axis of the screen 40 and "cost" is set on a vertical axis of the screen 40.

In the example illustrated in FIG. 26, the display control unit 108 first determines the coordinates of the horizontal axis (that is, axis corresponding to "popularity") of each tag 30 according to the size (for example, the number of heart marks 300 added to each tag 30, and the like) of the evaluation points included in the evaluation information of each tag 30 illustrated in FIG. 25. Next, the display control unit 108 determines the coordinates of the vertical axis (that is, axis corresponding to "cost") of each tag 30 according to a size (for example, the number of dollar marks 302 which is added to each tag 30, and the like) of a price indicated by the auxiliary information related to the price included in the evaluation information of each tag 30. Then, as illustrated in FIG. 26, the display control unit 108 displays the tag 30 at the display locations on the screen 40 corresponding to the coordinates of each axis determined for the tag 30 for each tag 30.

As illustrated in FIG. 26, for example, a neutral region 210 for arranging the tag 30 in which the coordinates of each axis cannot be determined may be defined in the screen 40. For example, the display control unit 108 arranges, in the neutral region 210, all the tags 30 on which the evaluation action is not performed or all the tags 30 for which the auxiliary information related to the price is not included in the evaluation information, among the plurality of tags 30.

As a modified example, while the running mode is the classification mode (in other words, while each tag 30 is classified and displayed), a user may change items (in the example illustrated in FIG. 26, "popularity" and "cost") corresponding to each axis of the screen 40. In this case, the display control unit 108 may automatically change the display locations of each tag 30 displayed on the screen 40 in response to the user changing the items corresponding to each axis.

Second Display Example

Figure 27:
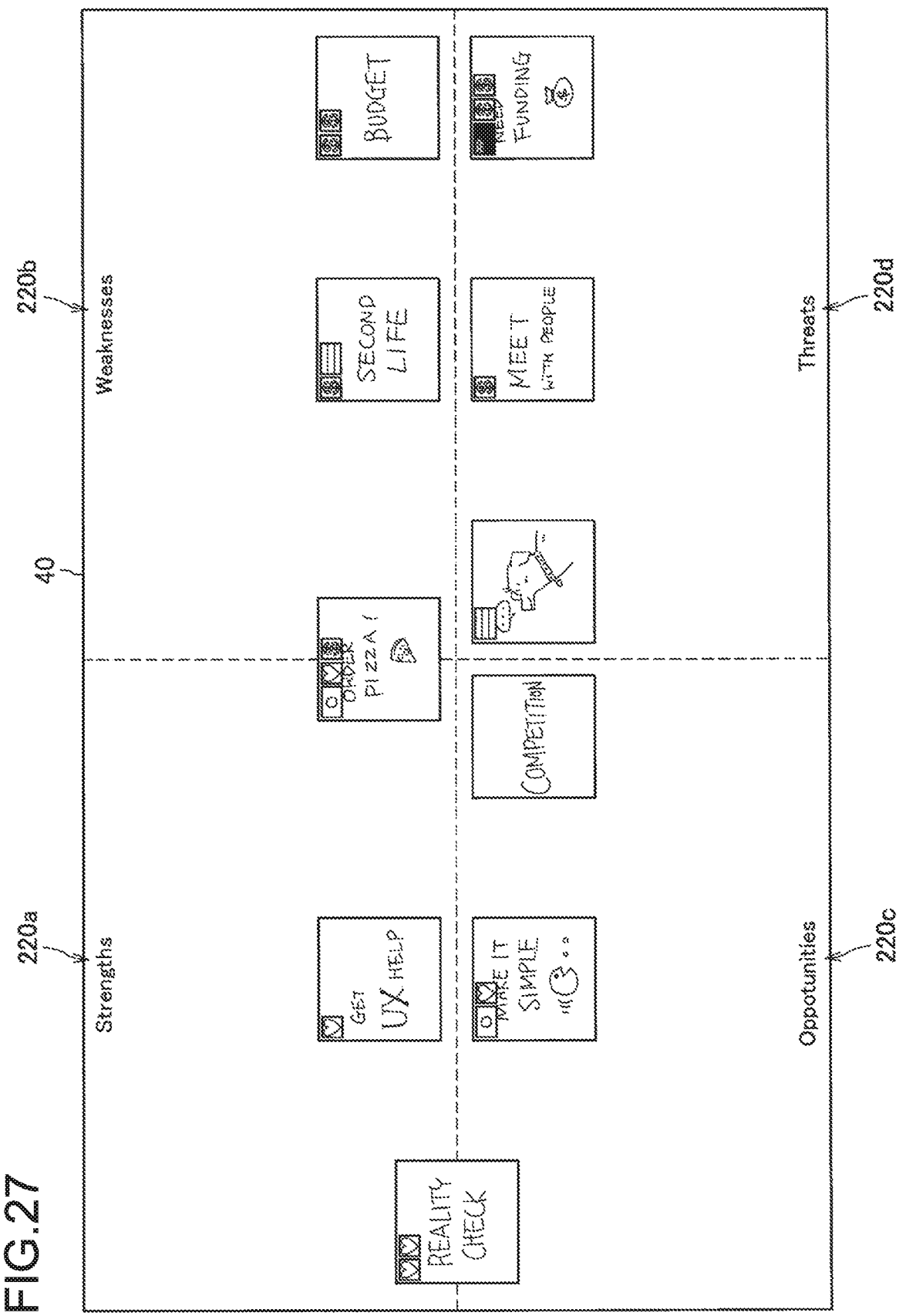
FIG. 27 is a diagram illustrating an example in which the plurality of tags 30 are classified by SWOT and displayed on the screen 40 according to the fourth application example.

FIG. 27 is a diagram illustrating an example in which each tag 30 is classified into SWOT and displayed on the screen 40. In the example illustrated in FIG. 27, the display control unit 108 first classifies each tag 30 into the SWOT using the evaluation information (specifically, evaluation points and various types of auxiliary information) of each tag 30. Then, based on the result of the SWOT classification of each tag 30, the display control unit 108 displays each tag 30 to any one of four categories 220 (strengths 220*a*, weaknesses 220*b*, opportunities 220*c*, and threats 220*d*) set on the screen 40.

As a modified example, the display control unit 108 may use information (for example, a character string (such as "GET UX HELP" in the example illustrated in FIG. 27) or an illustration) drawn in each tag 30 together with the evaluation information of each tag 30, thereby classifying each tag 30 into the SWOT. For example, a weight of "evaluation information of tag 30" can be set to be a larger value than a weight of "information drawn on the tag 30". Then, the display control unit 108 may classify each tag 30 into the SWOT based on the evaluation information of each tag 30, the information drawn on each tag 30, and the weight associated with each of these pieces of information.

Third Display Example

Figure 28:
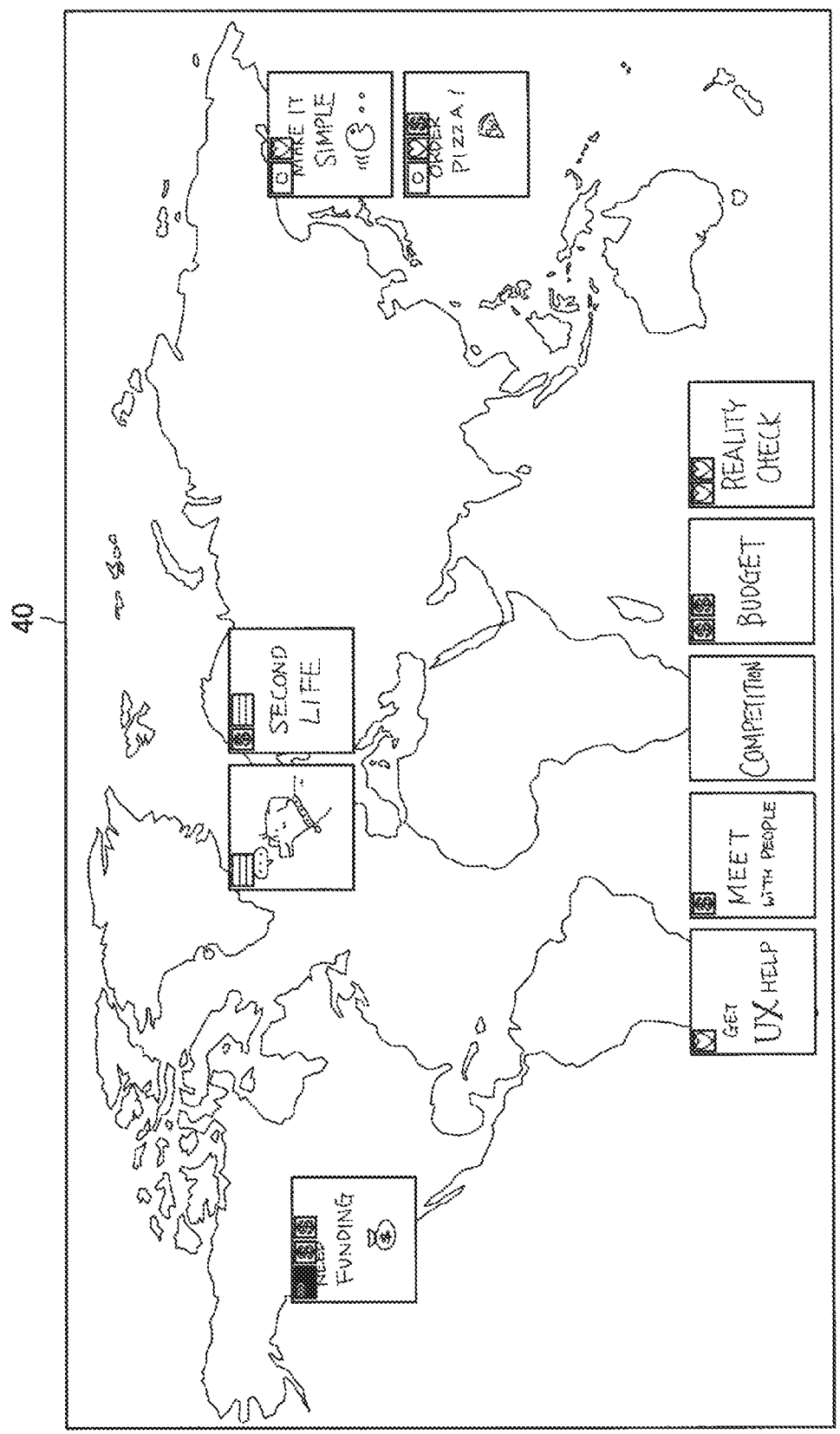
FIG. 28 is a diagram illustrating an example in which each tag 30 is classified and displayed according to a map displayed on the screen 40 according to the fourth application example.

FIG. 28 is a diagram illustrating an example in which each tag 30 is classified according to a world map displayed on the screen 40 and displayed on the screen 40. As illustrated in FIG. 28, when the auxiliary information related to the area is included in the evaluation information of each tag 30, the display control unit 108 may display the national flag mark 304 indicating the country corresponding to the area indicated by the auxiliary information in the tag 30 and display the tag 30 at the location of the country in the world map which is being displayed.

3-4-3. Effect

As described above, according to the fourth application example, each object can be automatically and appropriately classified and displayed on the screen 20 or the screen 40 according to the evaluation information of each object stored in the evaluation information DB 130.

3-5. Fifth Application Example

The fourth application example has been described above. Next, a fifth application example according to the present embodiment will be described. According to the fifth application example, the evaluation information of each object can be visualized in a list.

3-5-1. Display Control Unit 108

3-5-1-1. Tag Cloud

For example, as illustrated in FIG. 29, the display control unit 108 according to the fifth application example can simultaneously display each image indicating the relationship between the evaluation value corresponding to the evaluation action and the evaluation target object corresponding to the evaluation action on the output unit 124, for each of one or more evaluation actions performed by a plurality of users in the real space within a predetermined period.

FIG. 29 is a diagram illustrating an example in which a character string described in each tag 30 stored in the evaluation information DB 130 is displayed on the screen 40 in a list in association with the evaluation points indicated by the evaluation information of each tag 30. As illustrated in FIG. 29, the display control unit 108 displays each character string described in each tag 30 on the screen 40 while increasing sizes of each character included in the character strings described in each tag 30 as the evaluation points indicated by the evaluation information of each tag 30 increase. Further, the display control unit 108 may make display colors of the character strings described in each tag 30 the same as colors of each tag 30 itself. According to this display example, the evaluation information of each tag 30 can be displayed in a list and in an easy-to-understand manner like a tag cloud.

3-5-1-2. Graphic Recording

Figure 30:
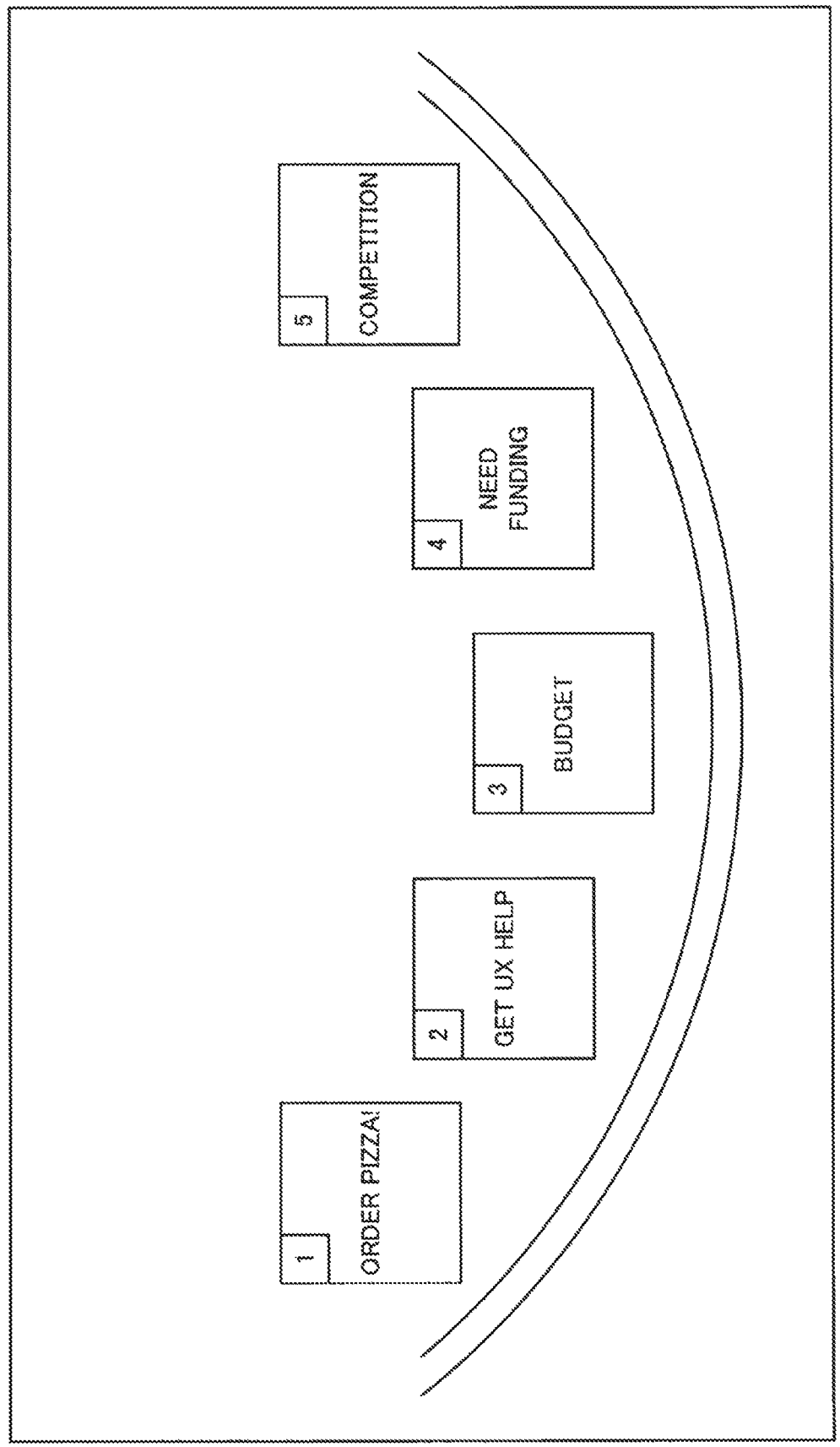
FIG. 30 is a diagram illustrating an example in which the information described in each tag 30 is displayed in a time series of evaluation actions performed on each tag 30 according to the fifth application example.

Alternatively, for example, as illustrated in FIG. 30, the display control unit 108 according to the fifth application example can display, on the output unit 124, images corresponding to a time series of one or more evaluation actions performed by a plurality of users in the real space within a predetermined period based on the predetermined conditions (for example, whether or not a user performs a predetermined operation).

FIG. 30 is a diagram illustrating an example in which information (such as a character string) described in each tag 30 is displayed in a time series of evaluation actions performed on each tag 30. As illustrated in FIG. 30, the display control unit 108 may display the character strings described in each tag 30 in parallel along a predetermined route displayed on, for example, a display screen in the order of the time when the evaluation actions for each tag 30 stored in the evaluation information DB 130 are performed. According to this display example, the contents of the discussion performed between the plurality of users can be displayed like "graphic recording".

3-6. Sixth Application Example

The fifth application example has been described above. Next, a sixth application example according to the present embodiment will be described. In the sixth application example, a scene where a plurality of groups to which a plurality of users each belong are located in the real space, and communication such as active learning is performed for each group is assumed. As will be described below, according to the sixth application example, in such a scene, a state of progress of the communication of each group can be displayed in a list.

3-6-1. Display Control Unit 108

Figure 31B:
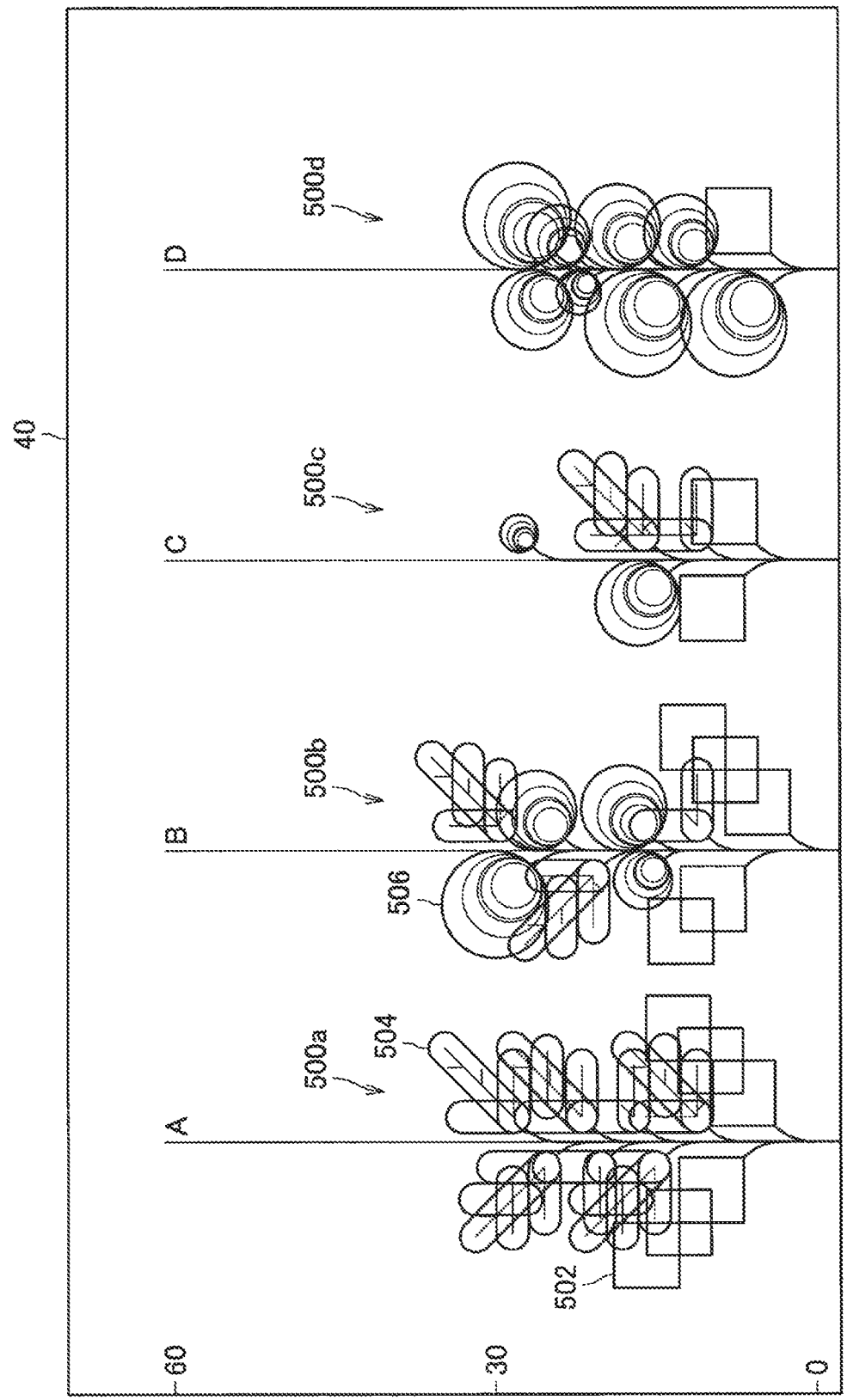
FIG. 31B is a diagram illustrating the display example of the state of progress of the active learning performed by each group according to the sixth application example.
Figure 31C:
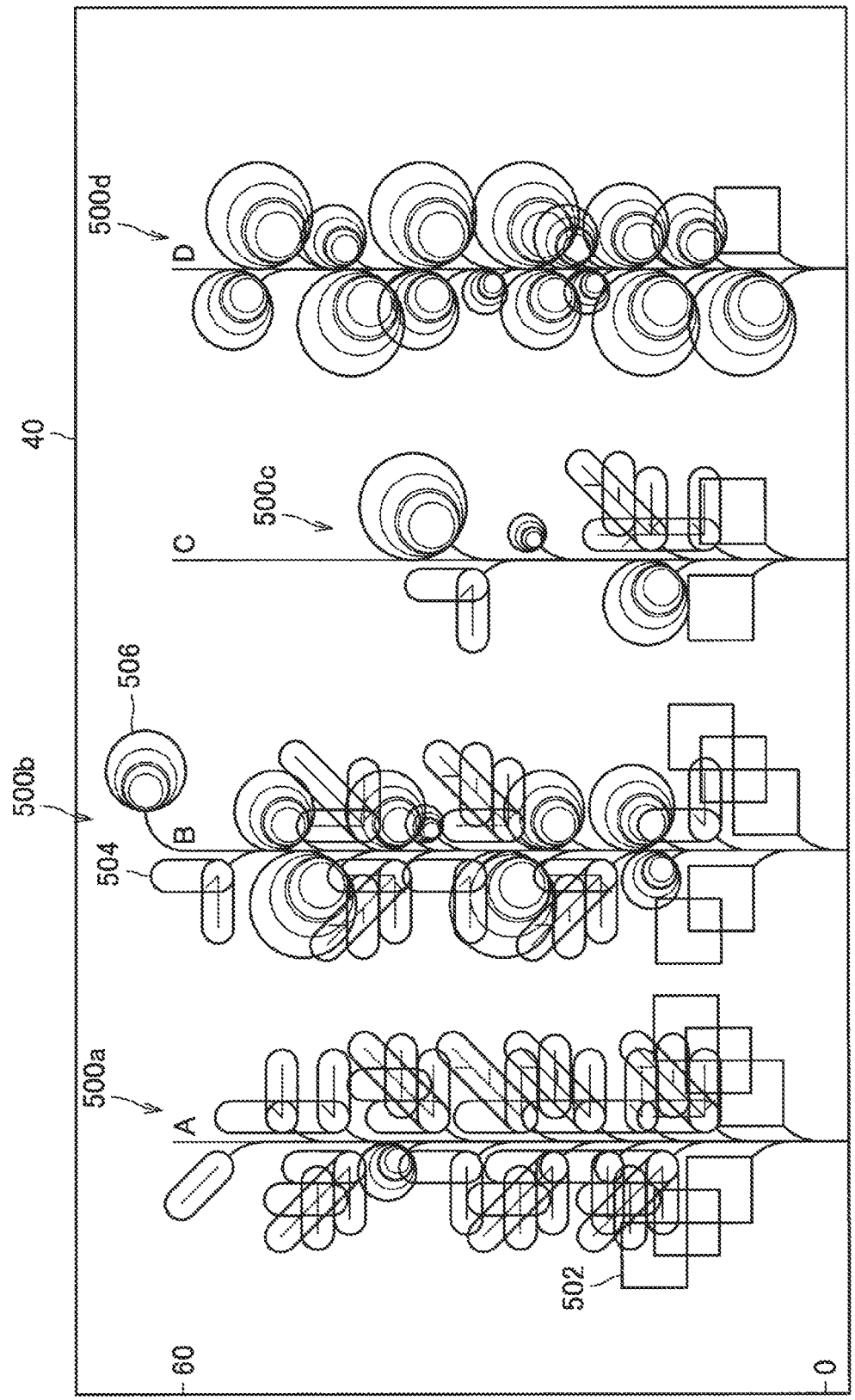
FIG. 31C is a diagram illustrating the display example of the state of progress of the active learning performed by each group according to the sixth application example.

For example, as illustrated in FIGS. 31A, 31B, and 31C, the display control unit 108 according to the sixth application example displays, on a certain screen 40 within a predetermined period, first time-series information indicating a time series of one or more evaluation actions performed by a plurality of users included in a certain group among the plurality of groups within the predetermined period and second time-series information indicating a time series of one or more evaluation actions performed by a plurality of users included in another group among the plurality of groups within the predetermined period. For example, the display control unit 108 may display, on the screen 40 within the predetermined period, individual time-series information indicating the time series of each of the one or more evaluation actions performed by each of the plurality of groups within the predetermined period. Further, the display control unit 108 may sequentially update the display of the individual time-series information according to the evaluation action newly performed by each group with the passage of time.

3-6-2. Specific Example

FIGS. 31A, 31B, and 31C are diagrams illustrating an example in which the state of progress of the active learning simultaneously performed by four groups ("group A", "group B", "group C", and "group D") within a predetermined period is displayed by simulating a growth of a plant. FIG. 31A is a diagram illustrating a situation at the passage of 15 minutes from the start of the active learning. In addition, FIG. 31B is a diagram illustrating a situation at the passage of 30 minutes from the start of the active learning. In addition, FIG. 31C is a diagram illustrating a situation at the passage of 60 minutes from the start of the active learning.

In the examples illustrated in FIGS. 31A, 31B, and 31C, the utterance detected as the evaluation action is indicated by a circle 506. For example, the display control unit 108 may determine a hue of the circle 506 corresponding to the utterance according to a positive degree corresponding to the utterance, and determine a size of the circle 506 corresponding to the utterance according to the volume of the utterance. More specifically, when the evaluation point corresponding to the utterance is positive, the display control unit 108 may make the display color of the circle 506 corresponding to the utterance closer to red as the evaluation point is larger. In addition, when the evaluation point corresponding to the utterance is negative, the display control unit 108 may make the display color of the circle 506 corresponding to the utterance closer to blue as the evaluation point is smaller. Further, the display control unit 108 may increase the size of the circle 506 corresponding to the utterance as the volume of the utterance increases.

In addition, in the example illustrated in FIGS. 31A, 31B, and 31C, one leaf image 504 indicates that each group has performed a survey such as a search at least once using a terminal. In addition, one rectangle 502 indicates that each group has answered at least once to a teacher's question using, for example, a clicker.

As illustrated in FIGS. 31A, 31B, and 31C, the display control unit 108 displays, on the screen 40, a display 500 (combination of the circle 506, the leaf image 504, and the rectangle 502) indicating the implementation result of the active learning of each group. Further, the display control unit 108 sequentially changes the shape of the display 500 corresponding to each group according to the state of progress of the active learning of each group.

3-6-2-1. Effect

According to this display example, for example, the teacher can grasp the implementation status (discussion status and the like) of the active learning of each group in time series. For example, as illustrated in FIG. 31C, at the end time of the active learning, the implementation results of the active learning of each group can be checked at a glance.

In addition, the teacher can know the implementation status of the active learning in each group during the active learning. For this reason, the teacher can determine, whether or not to perform, for example, special guidance or special support on each group every time. For example, at the timing illustrated in FIG. 31B, the teacher can grasp at a glance that the "group A" indicates that only the search is performed and the discussion is not performed much, the "group D" indicates that only talk is performed, and the "group C" is not intense in the discussion.

4. Hardware Configuration

Figure 32:
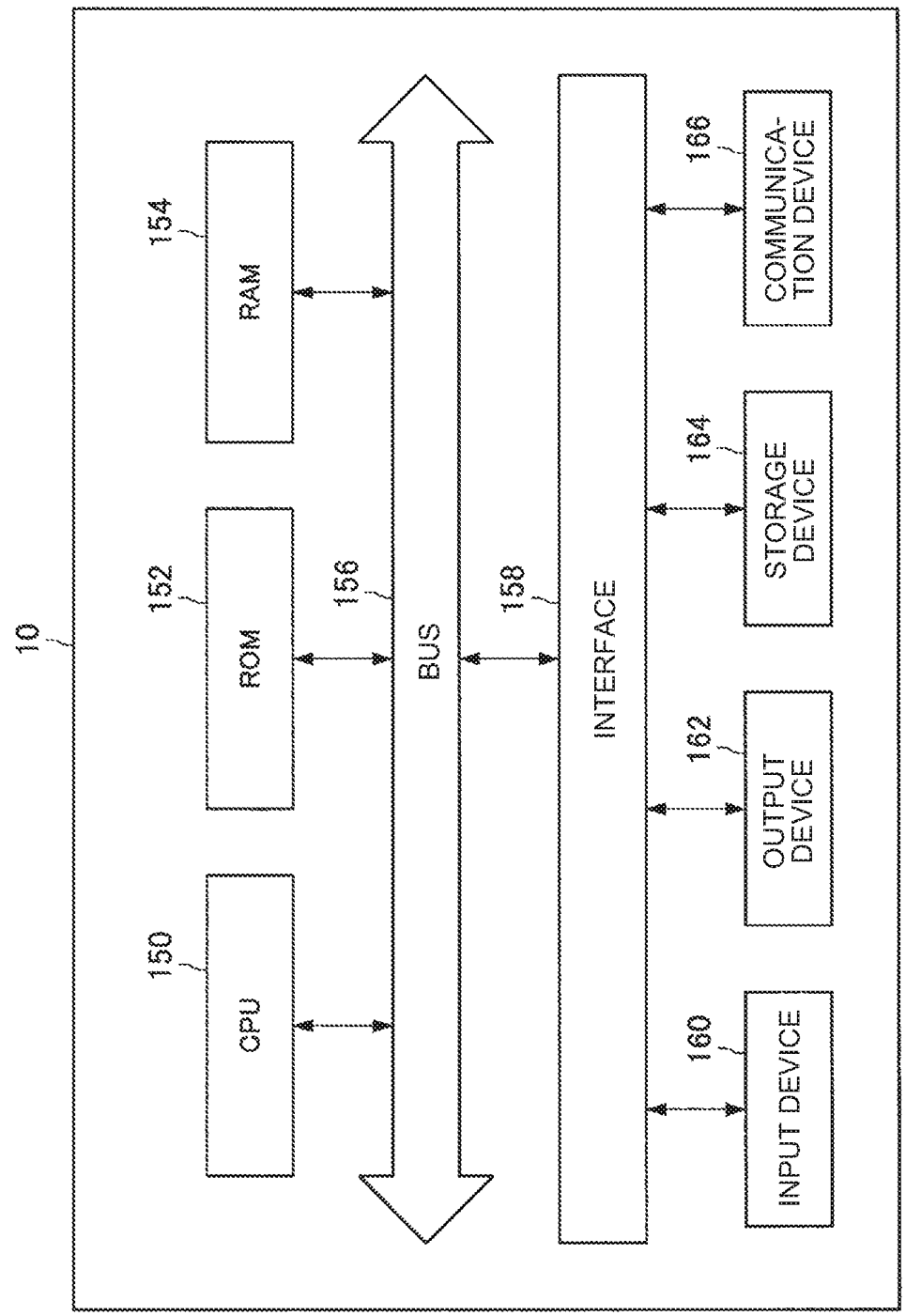
FIG. 32 is an explanatory diagram illustrating a hardware configuration example of the information processing system 10 according to the present embodiment.

The application example of the present embodiment has been described above. Next, a hardware configuration of the information processing system 10 according to the present embodiment will be described with reference to FIG. 32. As illustrated in FIG. 32, the information processing system 10 includes a CPU 150, a read only memory (ROM) 152, a random access memory (RAM) 154, a bus 156, an interface 158, an input device 160, an output device 162, the storage device 164, and a communication device 166.

The CPU 150 functions as an arithmetic processing device and a control device, and controls the overall operation of the information processing system 10 according to various programs. Further, the CPU 150 can realize the functions of the processing unit 100 and the display processing unit 122 in the information processing system 10. The CPU 150 may be configured by a processor such as a microprocessor.

The ROM 152 stores programs used by the CPU 150, control data such as operation parameters, or the like.

The RAM 154 temporarily stores programs and the like executed by the CPU 150, for example.

The bus 156 includes a CPU bus and the like. The bus 156 connects the CPU 150, the ROM 152, and the RAM 154 to each other.

The interface 158 connects the input device 160, the output device 162, the storage device 164, and the communication device 166 to the bus 156.

The input device 160 includes input means (for example, a touch panel, a button, a switch, a dial, a lever, a microphone, or the like) for a user to input information. Further, the input device 160 includes an input control circuit that generates an input signal based on an input by a user and outputs the input signal to the CPU 150. The input device 160 can realize the function of the input unit 120 in the information processing system 10.

The output device 162 includes, for example, a display device such as a projector, a liquid crystal display device, an organic light emitting diode (OLED) device, or a lamp. In addition, the output device 162 includes a voice output device such as a speaker. The output device 162 can realize the function of the output unit 124 in the information processing system 10.

The storage device 164 is a device for storing data. The storage device 164 includes, for example, a storage medium, a recording device that records data on the storage medium, a reading device that reads data from the storage medium, a deletion device that deletes data recorded on the storage medium, and the like. The storage device 164 can realize the function of the storage unit 126 in the information processing system 10.

The communication device 166 is a communication interface including a communication device that is connected to a communication network such as the Internet or a local area network (LAN). In addition, the communication device 166 may be a wireless LAN-compatible communication device, a long term evolution (LTE)-compatible communication device, or a wire communication device that performs wired communication.

5. Modified Example

As described above, the preferred embodiments of the present disclosure have been described in detail with reference to the accompanying drawings, but the present disclosure is not limited to such examples. It will be apparent to those skilled in the art to which the present disclosure belongs that various changes or modifications can be conceived within the scope of the technical idea described in the claims, and it is naturally understood that these changes or modifications fall within the technical scope of the present disclosure.

5-1. First Modified Example

For example, FIG. 5 shows an example in which the display processing unit 122 and the processing unit 100 are separately provided, but the present embodiment is not limited to this example. As a modified example, the display processing unit 122 and the processing unit 100 may be integrally configured.

5-2. Second Modified Example

Figure 33:
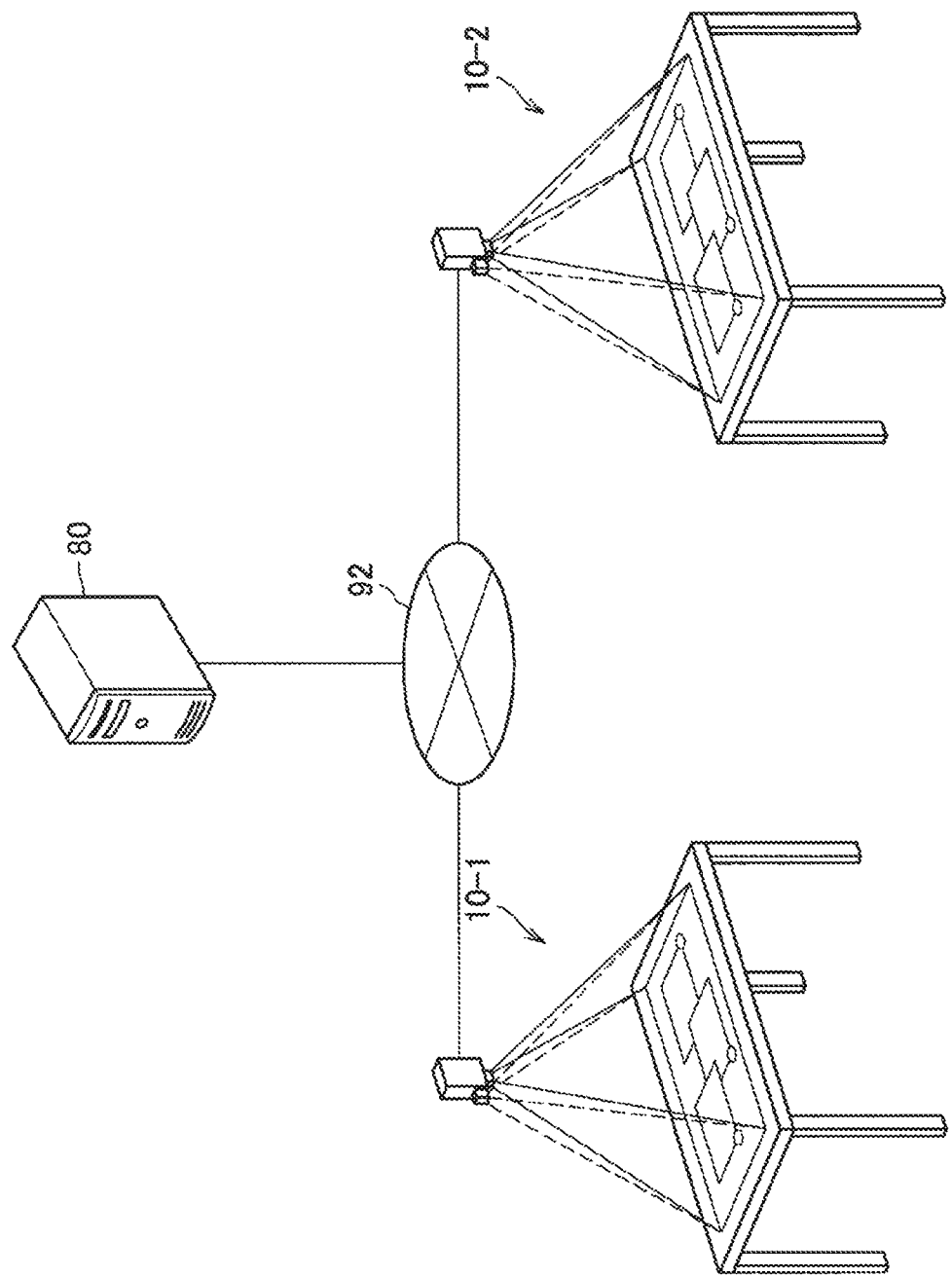
FIG. 33 is a diagram illustrating a configuration example of an information processing system according to a modified example of the present embodiment.

As another modified example, for example, as illustrated in FIG. 33, the information processing systems 10 may each be arranged at different locations. These information processing systems 10 can be communicably connected to each other via a communication network 92 including, for example, the Internet, the LAN, and the like. Further, for example, a server 80 having the processing unit 100 according to the present embodiment is connected to the communication network 92, and the server 80 can communicate with each of these information processing systems 10 via the communication network 92. Here, the server 80 is an example of an information processing device according to the present disclosure.

In this modified example, the server 80 may be able to control the processing performed by these information processing systems 10. For example, an information processing system 10-1 located at location A may detect an evaluation action of a user within the location A for any object arranged on the screen 20 located at the location A. In this case, the server 80 may receive the detection result from the information processing system 10-1, and update, for example, the evaluation information of the corresponding object in the evaluation information DB 130 stored by the server 80 based on the detection result.

Further, the server 80 may perform display control on the screen 40 included in an information processing system 10-2 arranged in location B in response to the evaluation information of each object updated based on the detection result of the evaluation action of the user in the location A. For example, the server 80 may perform the display control on the screen 40 included in the information processing system 10-2 in substantially the same manner as the contents described in the above embodiment and each application example.

5-3. Third Modified Example

As another modified example, an apparatus (information processing apparatus) including the processing unit 100 according to the present embodiment may be an apparatus including one or more of the input unit 120, the display processing unit 122, or the output unit 124 described above. For example, the information processing apparatus may be a projector including the processing unit 100, the display processing unit 122, and the output unit 124.

Alternatively, the information processing apparatus may be configured integrally with the table 90. Alternatively, the information processing apparatus may be connected to at least one of the input unit 120, the display processing unit 122, and the output unit 124 via the communication network. For example, the information processing apparatus may be a server, a general-purpose personal computer (PC), a tablet terminal, a game machine, a mobile phone such as a smartphone, a portable music player, a television receiver, a wearable device such as a head mounted display (HMD) or a smart watch, or a robot (for example, a humanoid robot, a self-driving car, or the like).

5-4. Fourth Modified Example

Each step in the above-described processing flow may not be necessarily processed in the order described. For example, each step may be processed in an appropriately changed order. Further, each step may be partially concurrently or individually processed instead of being processed in time series. In addition, some of the described steps may be omitted, or another step may be further added.

In addition, according to each of the above-described embodiments, a computer program that causes hardware such as the CPU 150, the ROM 152, and the RAM 154 to perform functions equivalent to those of each component of the information processing system 10 (in particular, the processing unit 100) according to the above-described embodiment can also be provided. In addition, a storage medium on which the computer program is recorded is also provided.

In addition, the effects described in this specification are merely illustrative or exemplary, and are not limited to those described in this specification. That is, the technology according to the present disclosure can exhibit other effects apparent to those skilled in the art from the description of this specification, in addition to or instead of the effects described above.

Note that the following configurations are also within the technical scope of the present disclosure.

(1)
An information processing system, comprising:
a processing unit that detects a pointing action for a first user in a real space to specify a first object and an evaluation action on the first object by the first user based on a signal output from a sensor that senses an action in the real space, and
updates evaluation information of the first object specified by a detection result of the pointing action based on a detection result of the evaluation action.

(2)
The information processing system according to (1), wherein the first object is a real object arranged on a first operation surface in the real space or a display object displayed on the first operation surface.

(3)
The information processing system according to (2), wherein the processing unit further determines whether an evaluation target of the evaluation action is a predetermined group including the first object and a second object, or is the first single object based on the detection result of the pointing action, and
when it is determined that the evaluation target of the evaluation action is the predetermined group, the processing unit updates each evaluation information of all objects included in the predetermined group based on the detection result of the evaluation action.

(4)
The information processing system according to (3), wherein when it is determined that the evaluation target of the evaluation action is the first single object, the processing unit updates only the evaluation information of the first object based on the detection result of the evaluation action.

(5)
The information processing system according to any one of (2) to (4), wherein the processing unit detects the pointing action and the evaluation action based on the signal output from the sensor during communication between the first user and a second user in the real space via the first operation surface.

(6)
The information processing system according to (5), wherein the evaluation action includes a gesture of the first user, and
the processing unit updates the evaluation information of the first object by adding an evaluation value corresponding to a type of gesture detected as performed by the first user to an evaluation value corresponding to the evaluation information of the first object.

(7)
The information processing system according to (5) or (6), wherein the evaluation action includes an utterance of the first user, and
the processing unit updates the evaluation information of the first object by adding an evaluation value corresponding to a speech recognition result of an utterance related to the first object of the first user to an evaluation value corresponding to the evaluation information of the first object.

(8)
The information processing system according to any one of (5) to (7), wherein the processing unit further displays a display indicating the evaluation information of the first object on a display unit in association with the first object, and
each time the evaluation information of the first object is updated, a display mode of the display indicating the evaluation information of the first object is sequentially changed according to an evaluation value corresponding to the updated evaluation information of the first object.

(9)
The information processing system according to any one of (5) to (8), wherein when a mode is changed from a first mode to a second mode for classifying a plurality of objects, the processing unit further displays an image corresponding to the object at a location corresponding to evaluation information of the object on a second operation surface, for each of the plurality of objects including the first object.

(10)
The information processing system according to any one of (5) to (9), wherein each of the plurality of objects including the first object is a display object,
the plurality of objects are displayed on the first operation surface, and
when a mode is changed from a first mode to a second mode for classifying the plurality of objects, the processing unit changes display locations of each of the plurality of objects on the first operation surface to a display location corresponding to the evaluation information of the object.

(11)
The information processing system according to (10), wherein the evaluation information of each of the plurality of objects including the first object includes an evaluation point of the object and auxiliary information of one or more objects, respectively,
in the second operation surface, at least two types of axes having different directions are defined, and
when the mode is changed from the first mode to the second mode for classifying the plurality of objects, the processing unit further arranges each of the plurality of objects at a display location corresponding to a value indicated by at least one of the evaluation point of the object and the auxiliary information of the one or more objects corresponding to each of the at least two types of axes to display the object on the second operation surface.

(12) The information processing system according to any one of (5) to (11), wherein the processing unit further detects the evaluation action on the first object by the second user in the real space based on the signal output from the sensor, and the evaluation information of the first object is further updated based on the detection result of the evaluation action on the first object by the second user.

(13) The information processing system according to any one of (5) to (12), wherein when the evaluation action on the first object by the first user is detected plural times within a predetermined period, the processing unit adds a value obtained by reducing a total of evaluation values corresponding to each of the evaluation actions detected plural times based on the predetermined criterion to the evaluation information of the first object to update the evaluation information of the first object.

(14) The information processing system according to any one of (5) to (13), wherein when the evaluation action on the first object by the first user is detected one or more times within a predetermined period and a total of evaluation values corresponding to each of the evaluation actions detected one or more times exceeds a predetermined upper limit, the processing unit adds the predetermined upper limit to the evaluation information of the first object to update the evaluation information of the first object.

(15) The information processing system according to any one of (5) to (14), wherein the processing unit determines an evaluation value corresponding to the evaluation action of the first object by the first user according to attribute information of the first user.

(16) The information processing system according to any one of (5) to (15), wherein the processing unit further simultaneously displays, on a second operation surface, each image indicating a relationship between an evaluation target object corresponding to the evaluation action and an evaluation value corresponding to the evaluation action, for each of one or more evaluation actions performed on a plurality of objects including the first object by a plurality of users in the real space including the first user within a predetermined period.

(17) The information processing system according to any one of (5) to (16), wherein the processing unit further displays, on a second operation surface, based on a predetermined condition, an image indicating a time series of one or more evaluation actions performed on a plurality of objects including the first object by a plurality of users in the real space including the first user within a predetermined period.

(18) The information processing system according to any one of (5) to (17), wherein a first group including a plurality of users including the first user and a second group different from the first group are at least located in the real space, the processing unit displays first time-series information indicating a time series of one or more evaluation actions performed by a plurality of users included in the first group within a predetermined period and second time-series information indicating a time series of one or more evaluation actions performed by a plurality of users included in the second group within the predetermined period on a second operation surface within the predetermined period, and a display mode of the first time-series information and a display mode of the second time-series information are sequentially updated according to as the passage of time within the predetermined period.

(19) An information processing method, comprising:

detecting a pointing action for a first user in a real space to specify a first object and an evaluation action on the first object by the first user based on a signal output from a sensor that senses an action in the real space; and updating, by a processor, evaluation information of the first object specified by a detection result of the pointing action based on a detection result of the evaluation action.

(20) A program making a computer function as a processing unit performing the following operations:

detecting a pointing action for a first user in a real space to specify a first object and an evaluation action on the first object by the first user based on a signal output from a sensor that senses an action in the real space, and updating evaluation information of the first object specified by a detection result of the pointing action based on a detection result of the evaluation action.

(21) The information processing system according to any one of (5) to (7), in which the pointing action includes a gesture of the first user, and the processing unit specifies at least one object corresponding to the detection result of the gesture of the first user among one or more objects arranged on the first operation surface as a target object of the pointing action.

(22) The information processing system according to any one of (5) to (8), in which the pointing action includes an utterance of the first user, and the processing unit specifies at least one object corresponding to a speech recognition result of the detected utterance of the first user among one or more objects arranged on the first operation surface as the target object of the pointing action.

(23) The information processing system according to any one of (5) to (10), in which the processing unit further performs display control such that the higher the evaluation value corresponding to the evaluation information of the first object, the higher the visibility of the information described in the first object.

REFERENCE SIGNS LIST

10 INFORMATION PROCESSING SYSTEM
20, 40 SCREEN
30 TAG
90 TABLE
100 PROCESSING UNIT
102 POINTING ACTION DETECTION UNIT
104 EVALUATION ACTION DETECTION UNIT
106 UPDATE UNIT
108 DISPLAY CONTROL UNIT
120 INPUT UNIT
122 DISPLAY PROCESSING UNIT
124 OUTPUT UNIT
126 STORAGE UNIT
128 TEMPORARY STORAGE AREA
130 EVALUATION INFORMATION DB

The invention claimed is:

1. An information processing system, comprising:
a processing unit configured to:
receive a signal from a sensor, wherein the sensor detects an action in a real space;
detect a pointing action for a first user in the real space to specify a first object of a plurality of objects, wherein
the pointing action is detected based on the received signal, and
the first object is one of a real object on a first operation surface or a display object displayed on the first operation surface;
detect an evaluation action on the first object by the first user based on the received signal, wherein the pointing action and the evaluation action are detected based on the received signal during a communication between the first user and a second user;
update evaluation information of the first object specified by a detection result of the pointing action based on a detection result of the evaluation action; and
in a case where a mode of the information processing system is changed from a first mode to a second mode for classification of the plurality of objects, control, for each object of the plurality of objects, display of an image corresponding to a respective object of the plurality of objects at a location corresponding to the evaluation information of the respective object on a second operation surface.

2. The information processing system according to claim 1, wherein the processing unit is further configured to:
determine whether an evaluation target of the evaluation action is part of a determined group including the first object and a second object based on the detection result of the pointing action; and
update the evaluation information of each object of the plurality of objects based on the determination that the evaluation target of the evaluation action is part of the determined group.

3. The information processing system according to claim 1, wherein
the evaluation action includes a gesture of the first user, and
the processing unit is further configured to:
control addition of an evaluation value corresponding to a type of the gesture by the first user to an evaluation value corresponding to the evaluation information of the first object; and
update the evaluation information of the first object based on the addition.

4. The information processing system according to claim 1, wherein
the evaluation action includes an utterance of the first user, and
the processing unit is further configured to:
control addition of an evaluation value corresponding to a speech recognition result of the utterance related to the first object by the first user to an evaluation value corresponding to the evaluation information of the first object; and
update the evaluation information of the first object based on the addition.

5. The information processing system according to claim 1, wherein the processing unit is further configured to sequentially change a display mode of the first object each time the evaluation information of the first object is updated.

6. The information processing system according to claim 1, wherein
each of the plurality of objects including the first object is the display object,
the plurality of objects is displayed on the first operation surface, and
in a case where the mode of the information processing system is changed from the first mode to the second mode for the classification of the plurality of objects, the processing unit is further configured to change display locations of each object of the plurality of objects on the first operation surface to a display location corresponding to the evaluation information of the respective object.

7. The information processing system according to claim 6, wherein the evaluation information of each object of the plurality of objects includes an evaluation point of the respective object and auxiliary information of at least one object of the plurality of objects, respectively,
in the second operation surface, at least two types of axes having different directions are defined, and
in a case where the mode is changed from the first mode to the second mode, the processing unit is further configured to arrange each object of the plurality of objects at a display location corresponding to a value indicated by at least one of the evaluation point of the respective object and the auxiliary information of the at least one object corresponding to each of the at least two types of axes to display the respective object on the second operation surface.

8. The information processing system according to claim 1, wherein the processing unit is further configured to:
detect the evaluation action on the first object by the second user in the real space based on the received signal from the sensor; and
update the evaluation information of the first object based on the detection result of the evaluation action on the first object by the second user.

9. The information processing system according to claim 1, wherein in a case where the evaluation action on the first object by the first user is detected plural times within a determined period, the processing unit is further configured to:
reduce a total of evaluation values corresponding to the evaluation action, detected plural times, based on a determined criterion; and
add a value obtained by the reduction to the evaluation information of the first object to update the evaluation information of the first object.

10. The information processing system according to claim 1, wherein in a case where the evaluation action on the first object by the first user is detected one or more times within a determined period and a total of evaluation values corresponding to the evaluation action, detected one or more times, exceeds an upper limit, the processing unit is further configured to add upper limit to the evaluation information of the first object to update the evaluation information of the first object.

11. The information processing system according to claim 1, wherein the processing unit is further configured to determine an evaluation value corresponding to the evaluation action of the first object by the first user according to attribute information of the first user.

12. The information processing system according to claim 1, wherein the processing unit is further configured to simultaneously display, on the second operation surface, each image indicating a relationship between an evaluation target object corresponding to the evaluation action and an evaluation value corresponding to the evaluation action, for each of a plurality of evaluation actions performed on the plurality of objects including by a plurality of users in the real space including the first user within a determined period.

13. The information processing system according to claim 1, wherein the processing unit is further configured to control, based on a determined condition, display of a specific image on a second operation surface, and the specific image indicates a time series of one or more evaluation actions performed on the plurality of objects by a plurality of users in the real space including the first user within a determined period.

14. The information processing system according to claim 1, wherein a first group including a plurality of users and a second group different from the first group are at least located in the real space, the plurality of users includes the first user, and the processing unit is further configured to:

control display of first time-series information on the second operation surface, wherein the first time-series information indicates a time series of one or more evaluation actions performed by a first plurality of users included in the first group within a determined period;

control display of second time-series information on the second operation surface, wherein the second time-series information indicates the time series of the one or more evaluation actions performed by a second plurality of users included in the second group within the determined period; and sequentially update a display mode of the first time-series information and a display mode of the second time-series information according to a passage of time within the determined period.

15. An information processing method, comprising:

in an information processing system:

receiving a signal from a sensor, wherein the sensor detects an action in a real space;

detecting a pointing action for a first user in the real space to specify a first object of a plurality of objects, wherein the pointing action is detected based on the received signal, and the first object is one of a real object on a first operation surface or a display object displayed on the first operation surface;

detecting an evaluation action on the first object by the first user based on the received signal, wherein the pointing action and the evaluation action are detected based on the received signal during a communication between the first user and a second user;

updating evaluation information of the first object specified by a detection result of the pointing action based on a detection result of the evaluation action; and in a case where a mode of the information processing system is changed from a first mode to a second mode for classification of the plurality of objects, controlling, for each object of the plurality of objects, display of an image corresponding to a respective object of the plurality of objects at a location corresponding to the evaluation information of the respective object on a second operation surface.

16. A non-transitory computer-readable medium having stored thereon, computer executable-instructions that, when executed by a processor of an information processing system, cause the processor to execute operations, the operations comprising:

receiving a signal from a sensor, wherein the sensor detects an action in a real space;

detecting a pointing action for a first user in the real space to specify a first object of a plurality of objects, wherein the pointing action is detected based on the received signal, and the first object is one of a real object on a first operation surface or a display object displayed on the first operation surface;

detecting an evaluation action on the first object by the first user based on the received signal, wherein the pointing action and the evaluation action are detected based on the received signal during a communication between the first user and a second user;

updating evaluation information of the first object specified by a detection result of the pointing action based on a detection result of the evaluation action; and in a case where a mode of the information processing system is changed from a first mode to a second mode for classification of the plurality of objects, controlling, for each object of the plurality of objects, display of an image corresponding to a respective object of the plurality of objects at a location corresponding to the evaluation information of the respective object on a second operation surface.

17. An information processing system, comprising:

a processing unit configured to:

receive a signal from a sensor, wherein the sensor detects an action in a real space;

detect a pointing action for a first user in the real space to specify an object of a plurality of objects, wherein the pointing action is detected based on the received signal, and the object is one of a real object on a first operation surface or a display object displayed on the first operation surface;

detect an evaluation action on the object by the first user based on the received signal, wherein the pointing action and the evaluation action are detected based on the received signal during a communication between the first user and a second user;

update evaluation information of the object specified by a detection result of the pointing action based on a detection result of the evaluation action; and in a case where a mode of the information processing system is changed from a first mode to a second mode for classification of the plurality of objects, change display locations of each object of the plurality of objects on the first operation surface to a display location corresponding to the evaluation information of a respective object, wherein each object of the plurality of objects is the display object, and the plurality of objects is displayed on the first operation surface.

18. An information processing system, comprising:

a processing unit configured to:

receive a signal from a sensor, wherein the sensor detects an action in a real space;

detect a pointing action for a first user in the real space to specify an object of a plurality of objects, wherein the pointing action is detected based on the received signal, and
 the object is one of a real object on a first operation surface or a display object displayed on the first operation surface;
detect an evaluation action on the object by the first user based on the received signal, wherein the pointing action and the evaluation action are detected based on the received signal during a communication between the first user and a second user;
update evaluation information of the object specified by a detection result of the pointing action based on a detection result of the evaluation action; and
control, based on a determined condition, display of an image on a second operation surface, wherein the image indicates a time series of one or more evaluation actions performed on the plurality of objects by a plurality of users in the real space including the first user within a determined period.

\* \* \* \* \*